United States Patent [19]
Cline

[11] 3,899,916
[45] Aug. 19, 1975

[54] RECORDER AND COMPUTER TYPE BRAKE ANALYZER AND METHOD

[75] Inventor: Edwin Lee Cline, Pasadena, Calif.

[73] Assignee: Clayton Manufacturing Company, El Monte, Calif.

[22] Filed: July 25, 1973

[21] Appl. No.: 382,538

Related U.S. Application Data

[63] Continuation-in-part of Ser. No. 811,168, March 27, 1969, abandoned.

[52] U.S. Cl. .................................................. 73/126
[51] Int. Cl. ............................................... G01l 1/28
[58] Field of Search .............................. 73/126, 117

[56] References Cited
UNITED STATES PATENTS

| | | | |
|---|---|---|---|
| 1,987,706 | 1/1935 | Prentiss | 73/126 |
| 3,439,534 | 4/1969 | Pilgrim | 73/117 |
| 3,554,023 | 1/1971 | Geul | 73/126 X |

OTHER PUBLICATIONS

Maxwell, L. R.; New Techniques with the Electric Chassis Dynamometer, 1964, from SAE Transactions, Vol. 72, TL 1 S62, pp. 711 and 712.

Primary Examiner—Jerry W. Myracle

[57] ABSTRACT

A method and apparatus for analyzing the performance of wheeled, land vehicle brake systems wherein means are provided for driving the vehicle wheels at a predetermined speed and the operator or computer controlled brake actuator selectively applies the brakes in a series of simple successive steps comprising the test sequence. The pedal pressure, or other actuating force, the brake effort exerted by each wheel, and the imbalance between the braking effort of opposite wheels is measured and recorded on a strip chart or fed to a computer, to determine if the measured values fall outside of a predetermined range of values representing acceptable deviations from standard values. Any deviation of the brake effort from the acceptable values, or excessive imbalance between opposite wheels at any point in the test sequence, may be used as a basis for diagnosing and identifying a specific brake malfunction. The system can be enlarged to simultaneously test the brakes on all wheels of a land vehicle.

147 Claims, 45 Drawing Figures

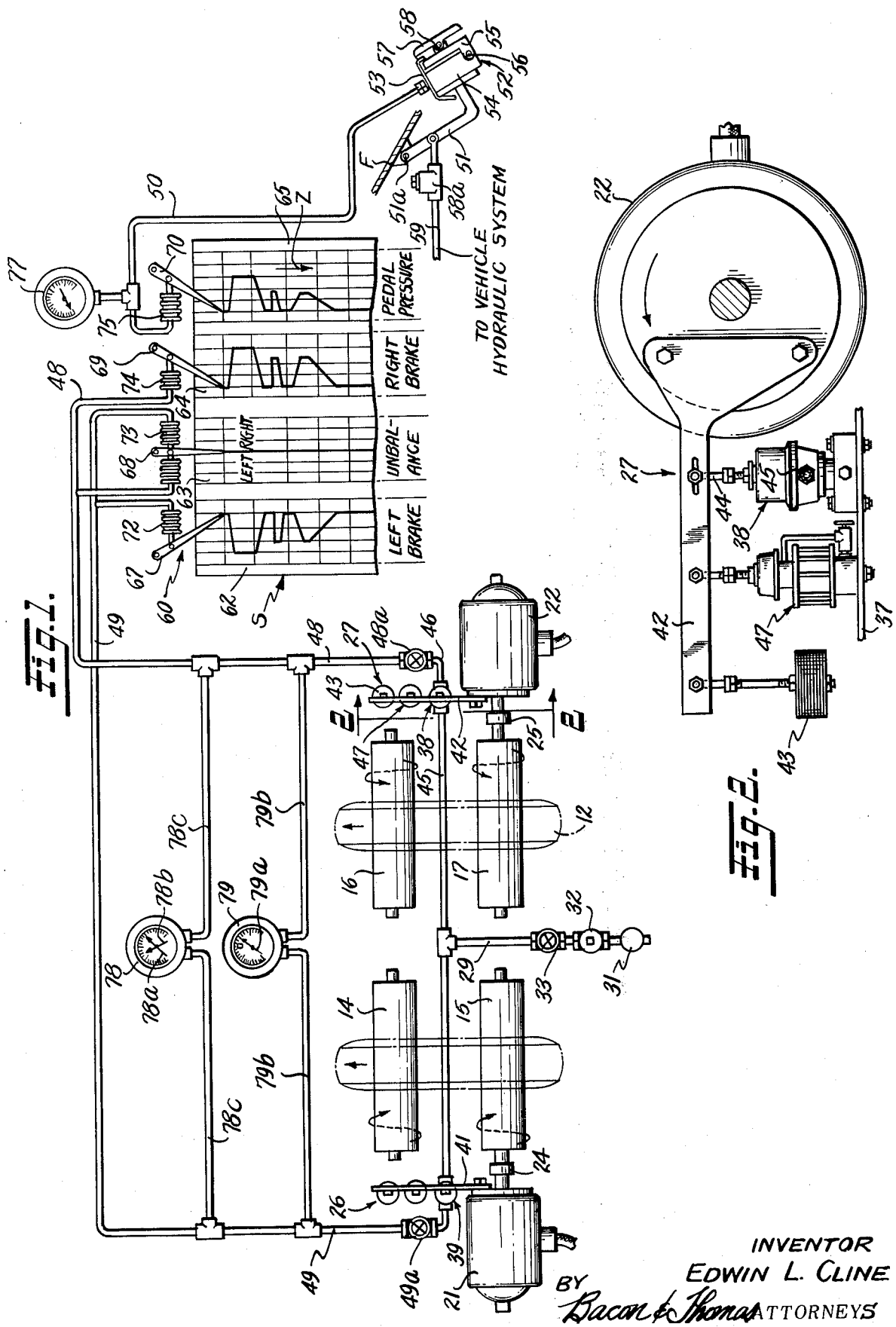

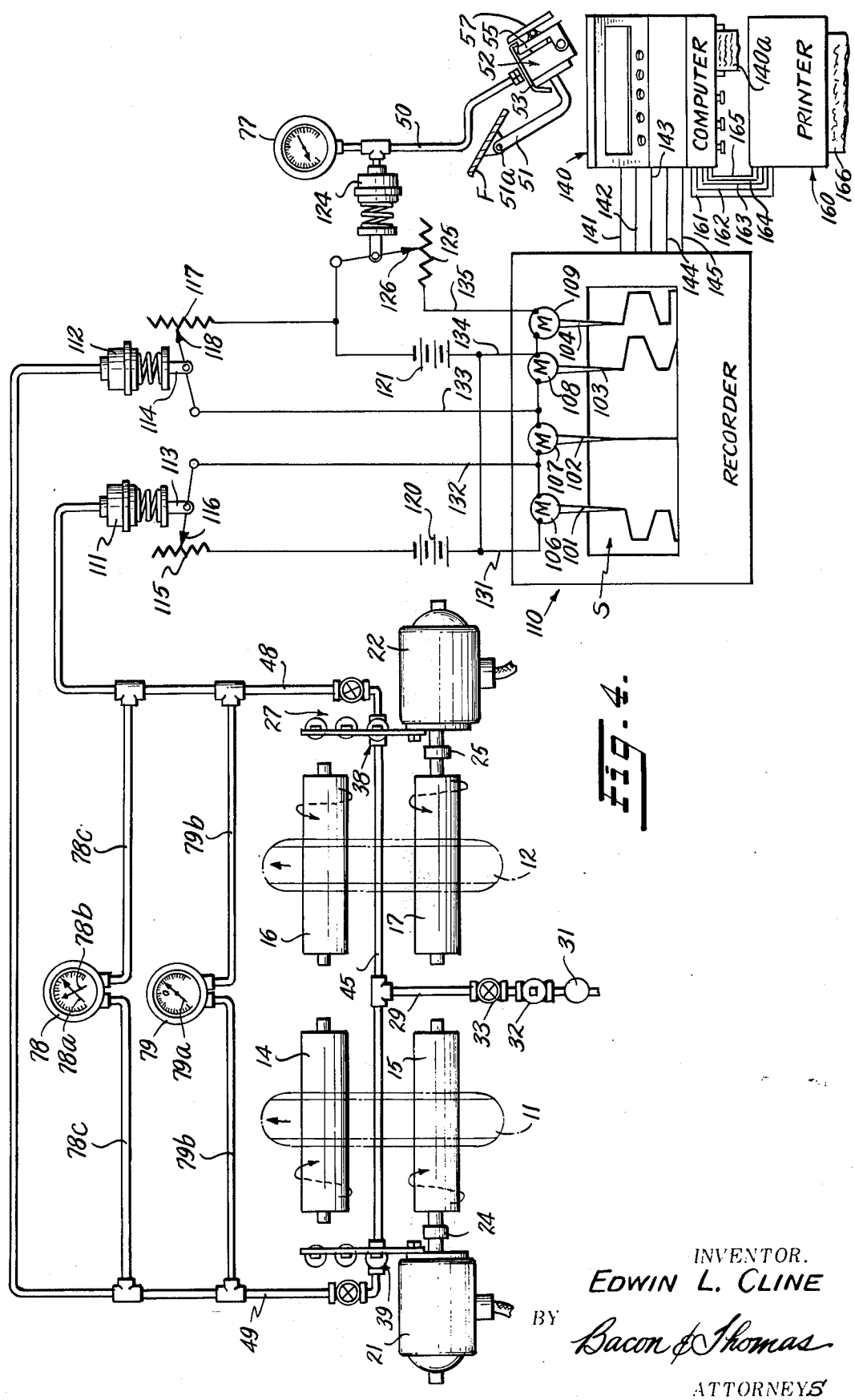

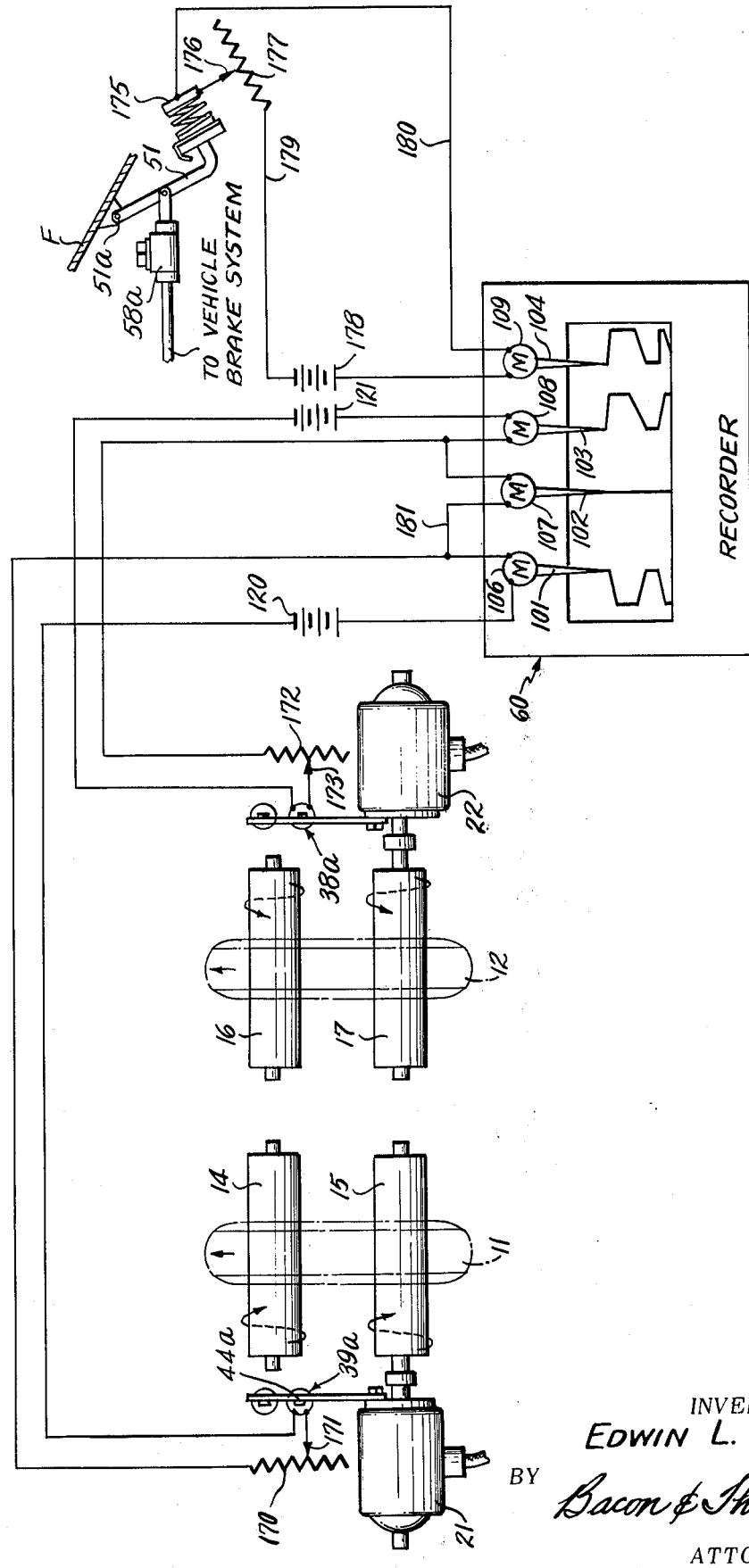

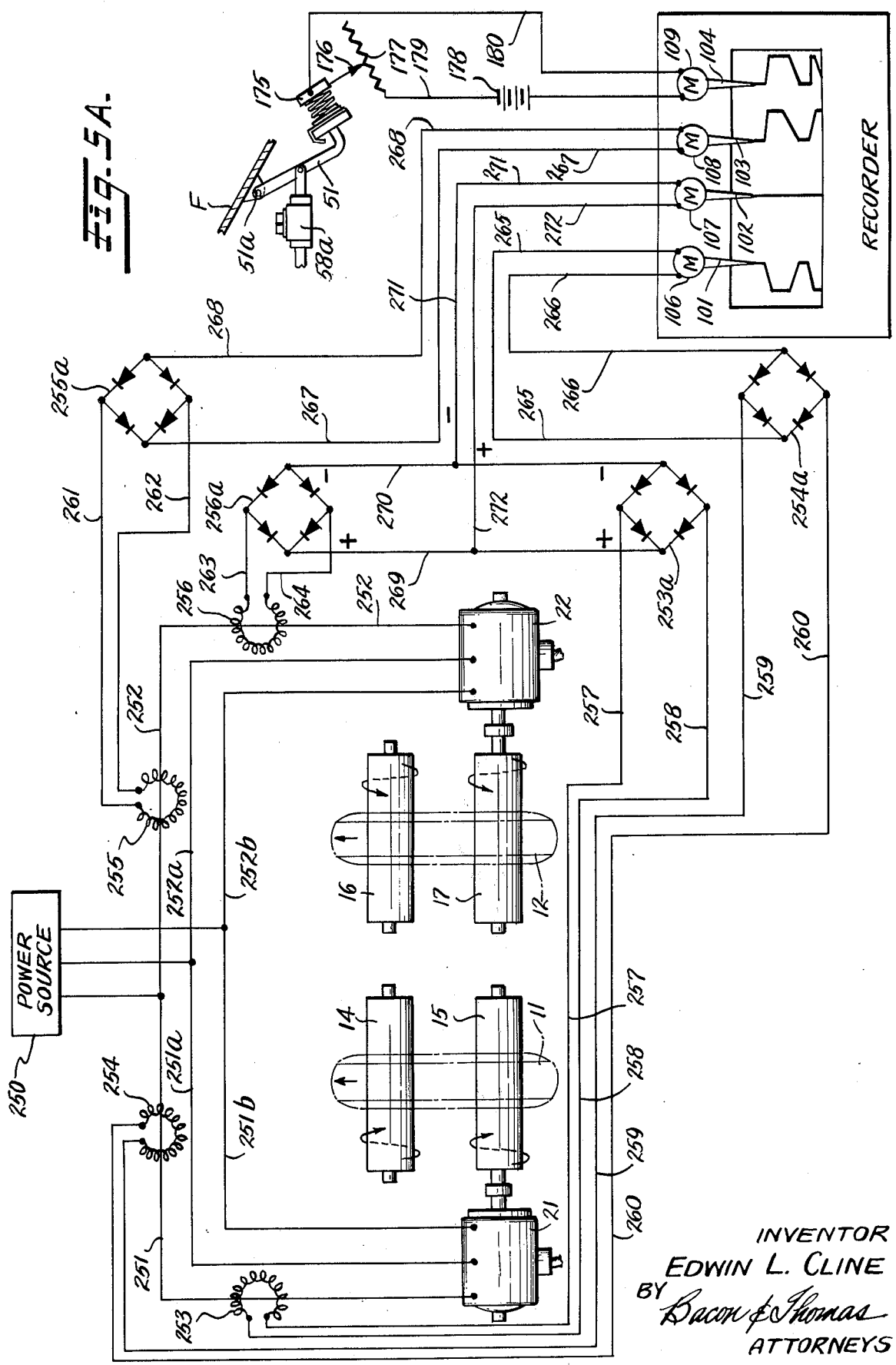

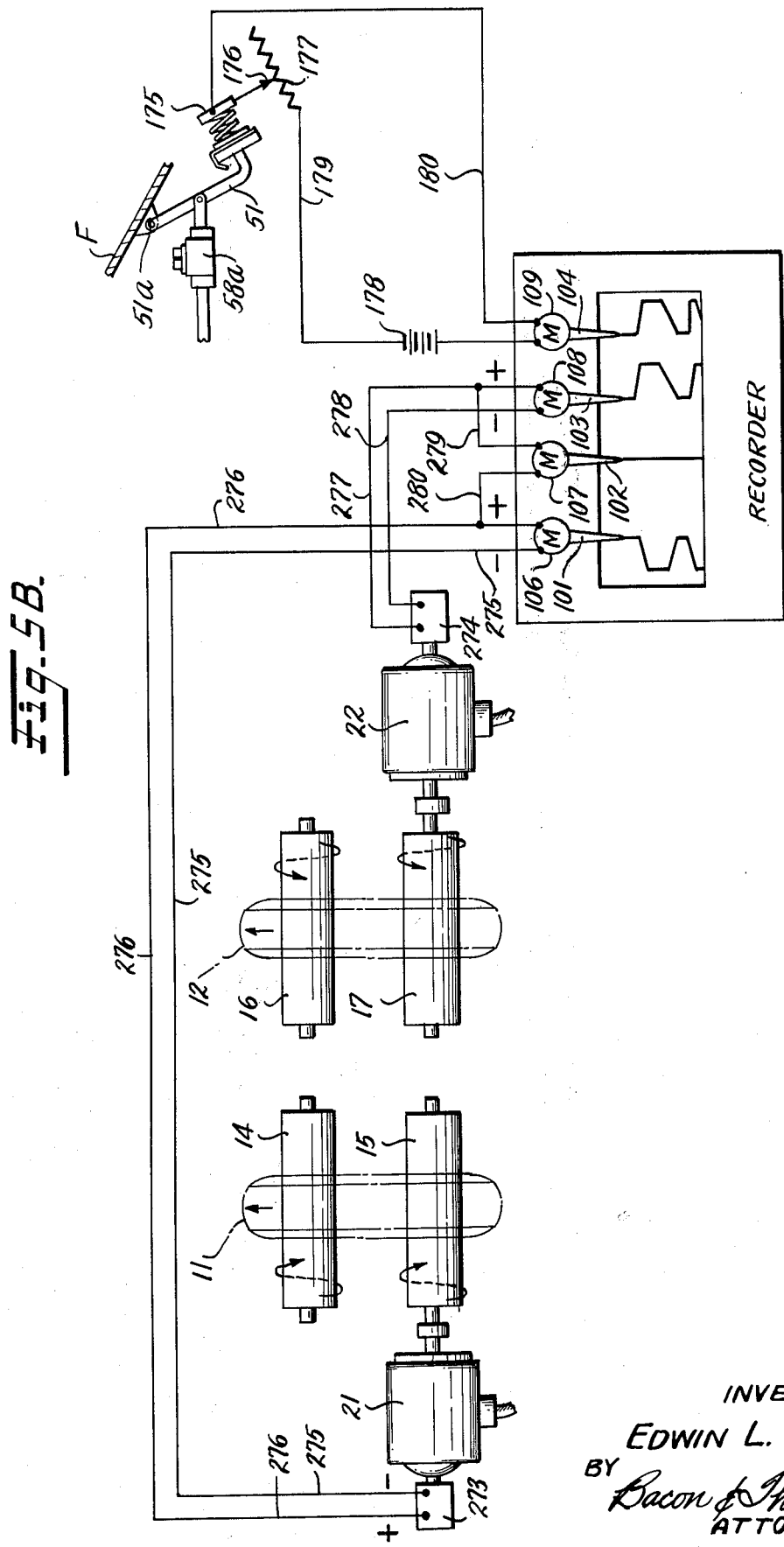

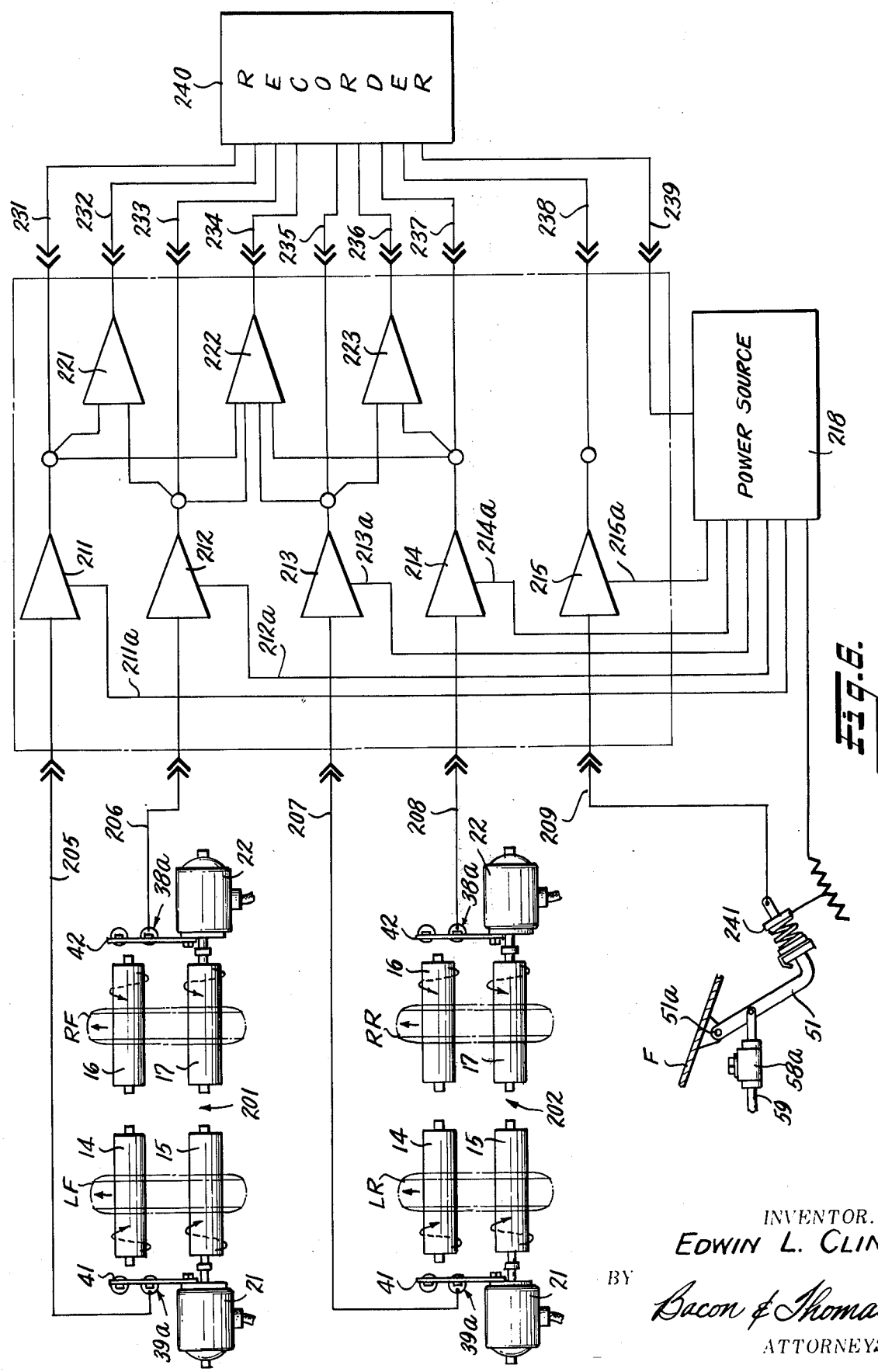

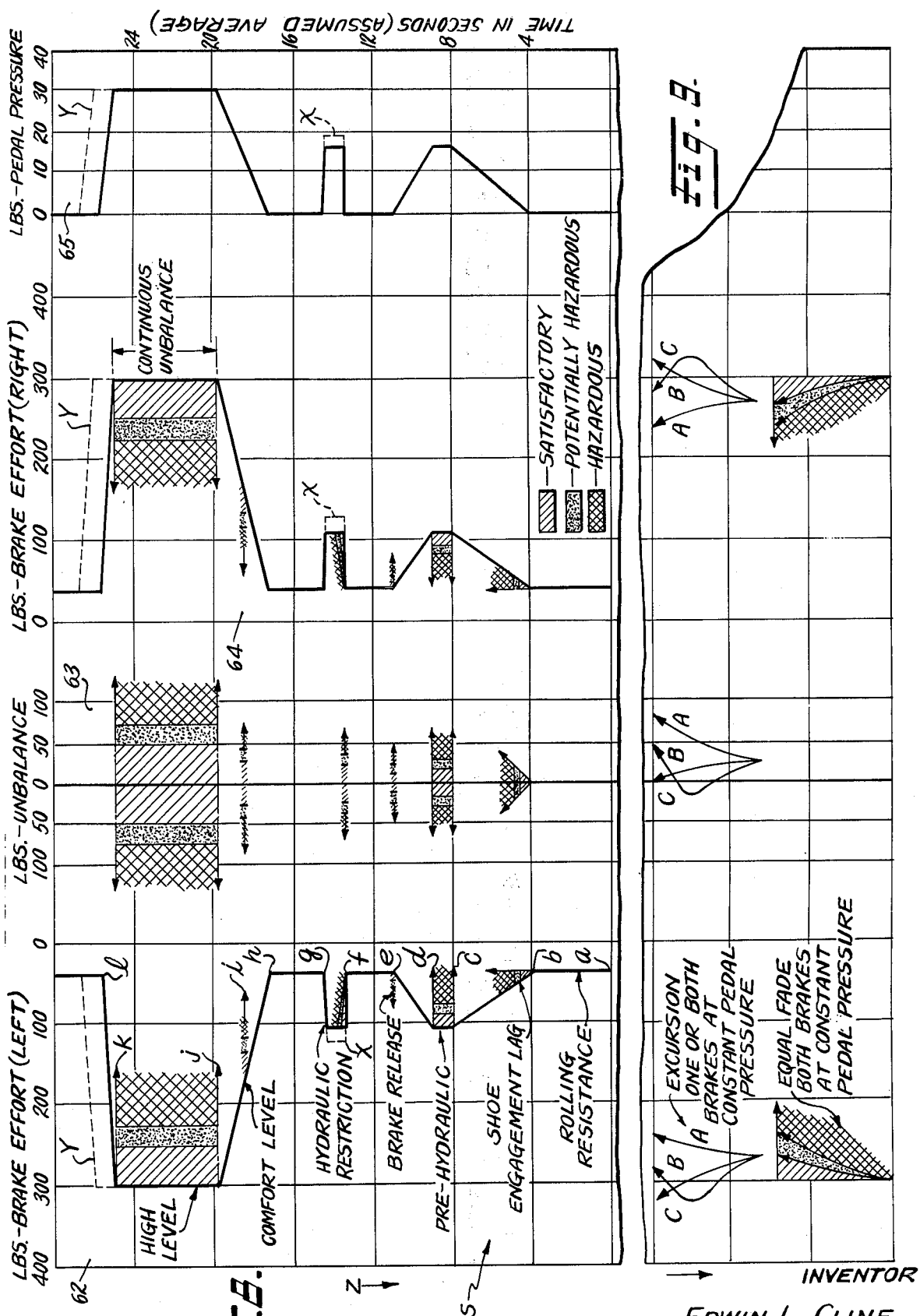

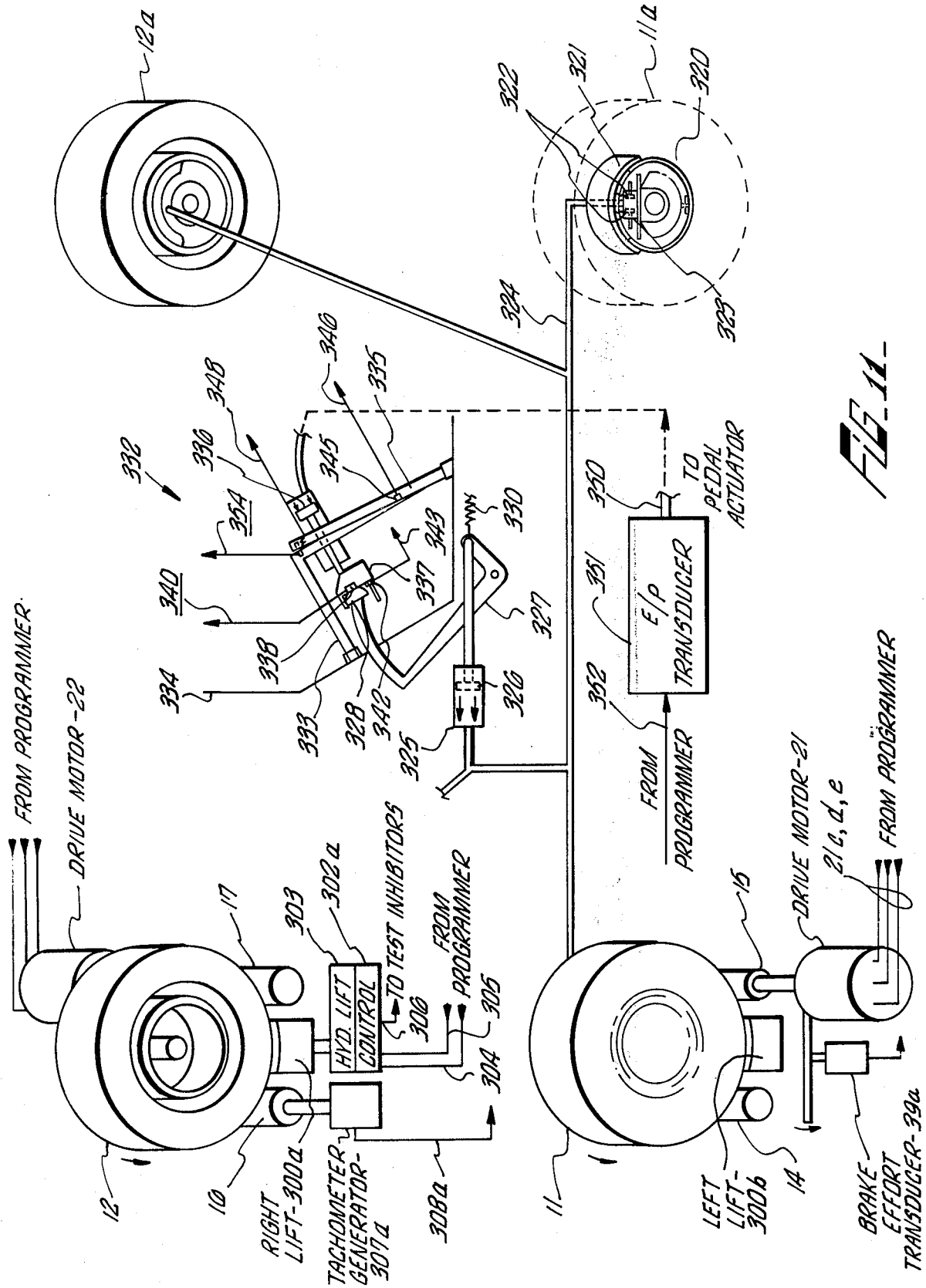

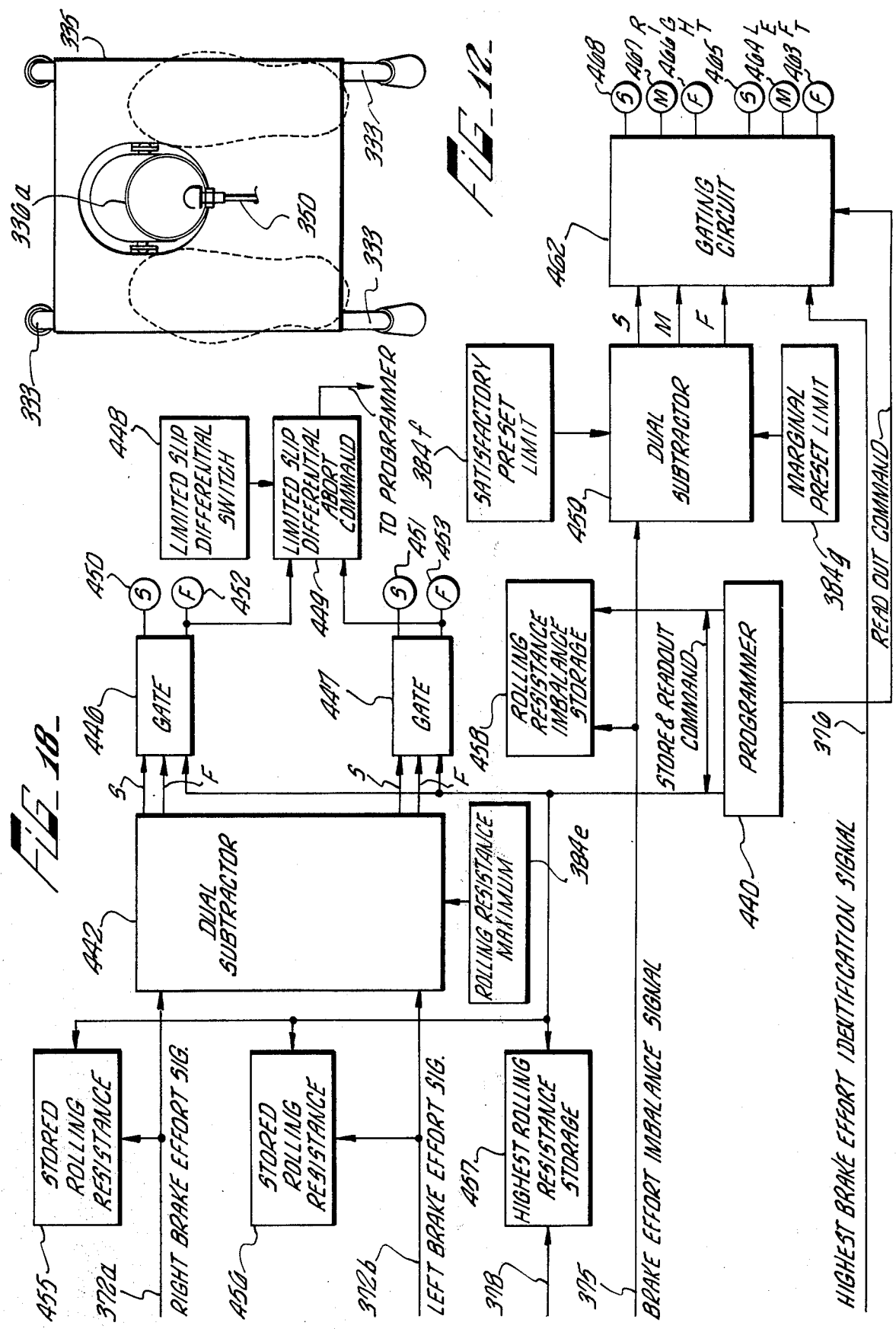

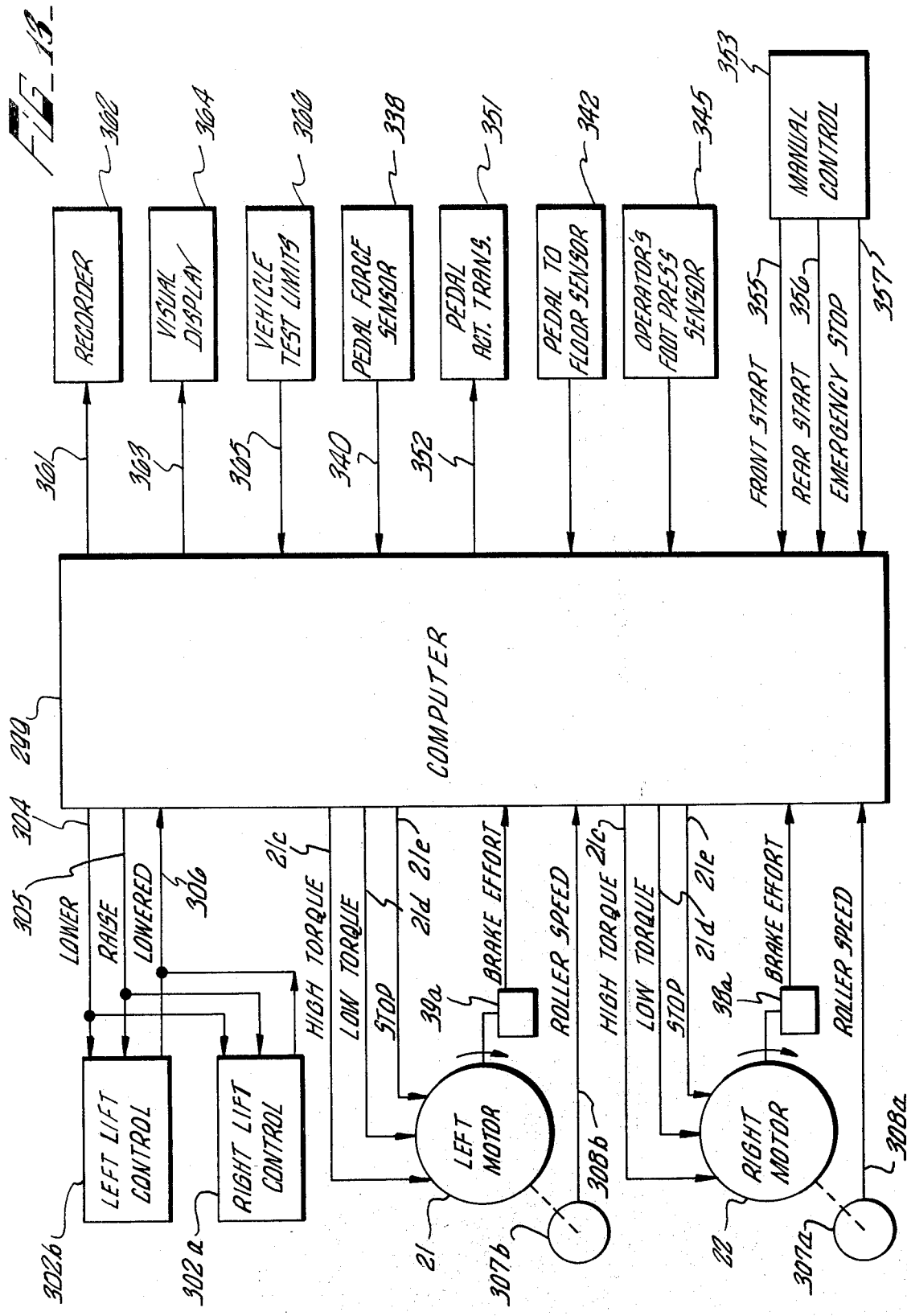

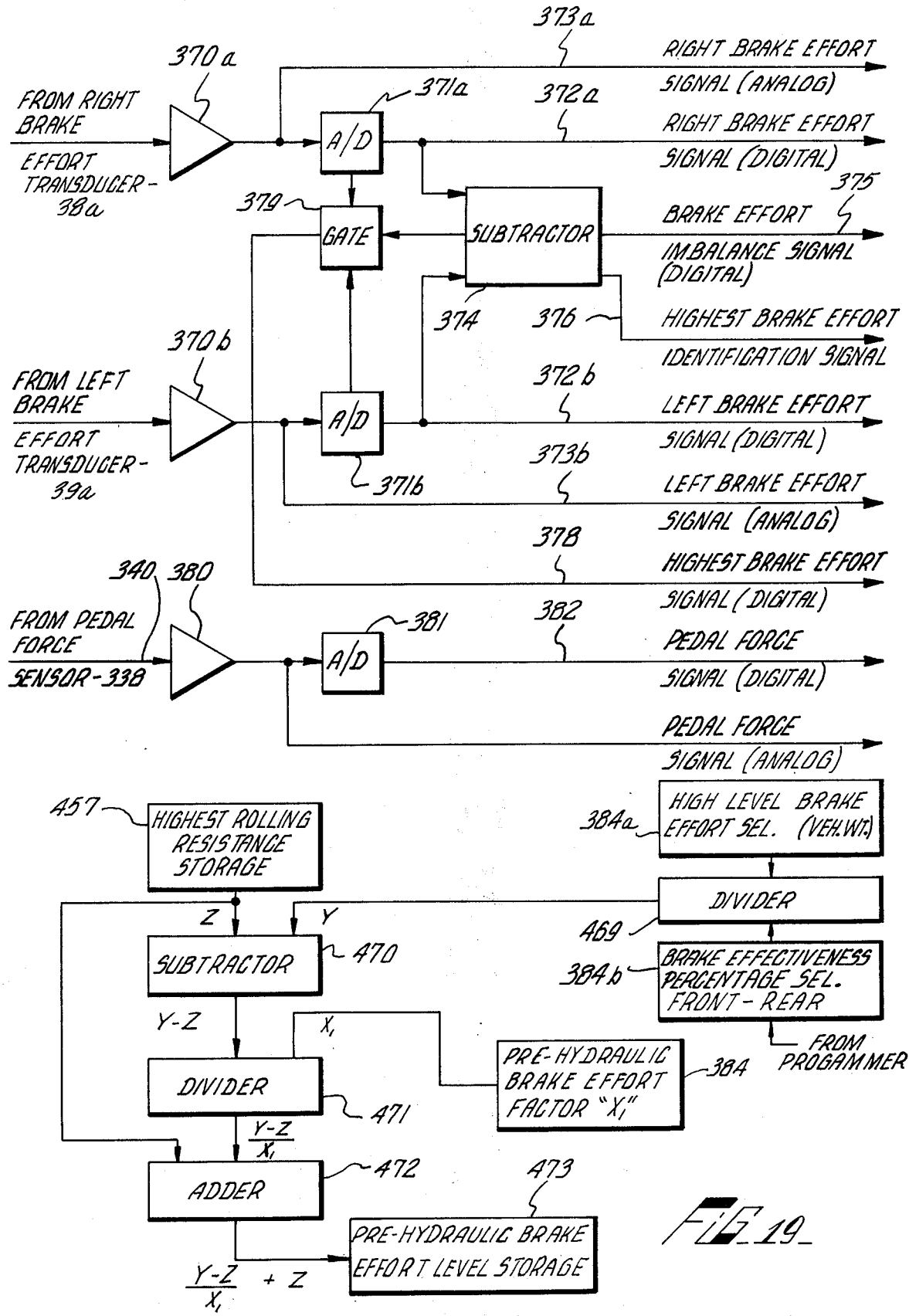

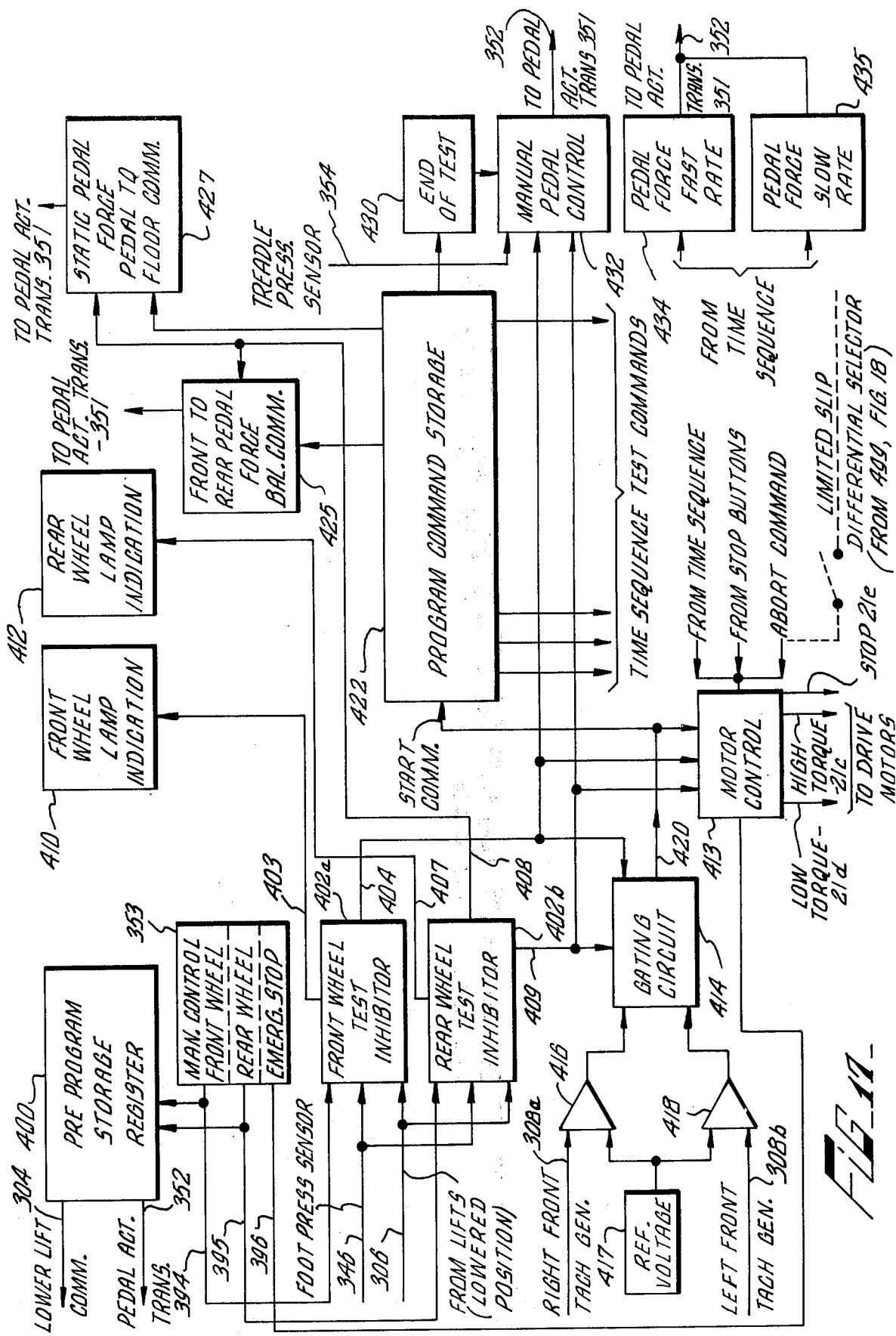

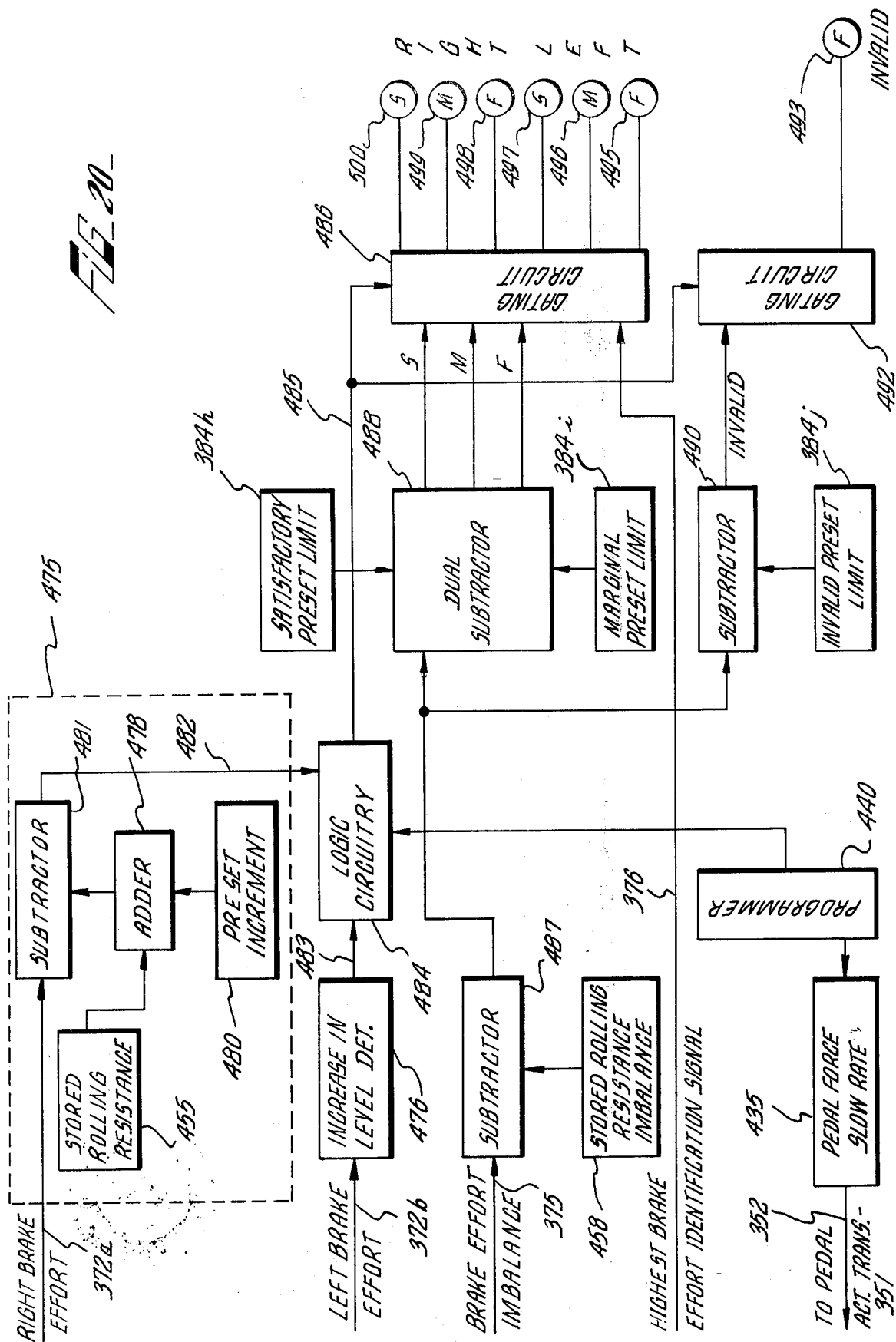

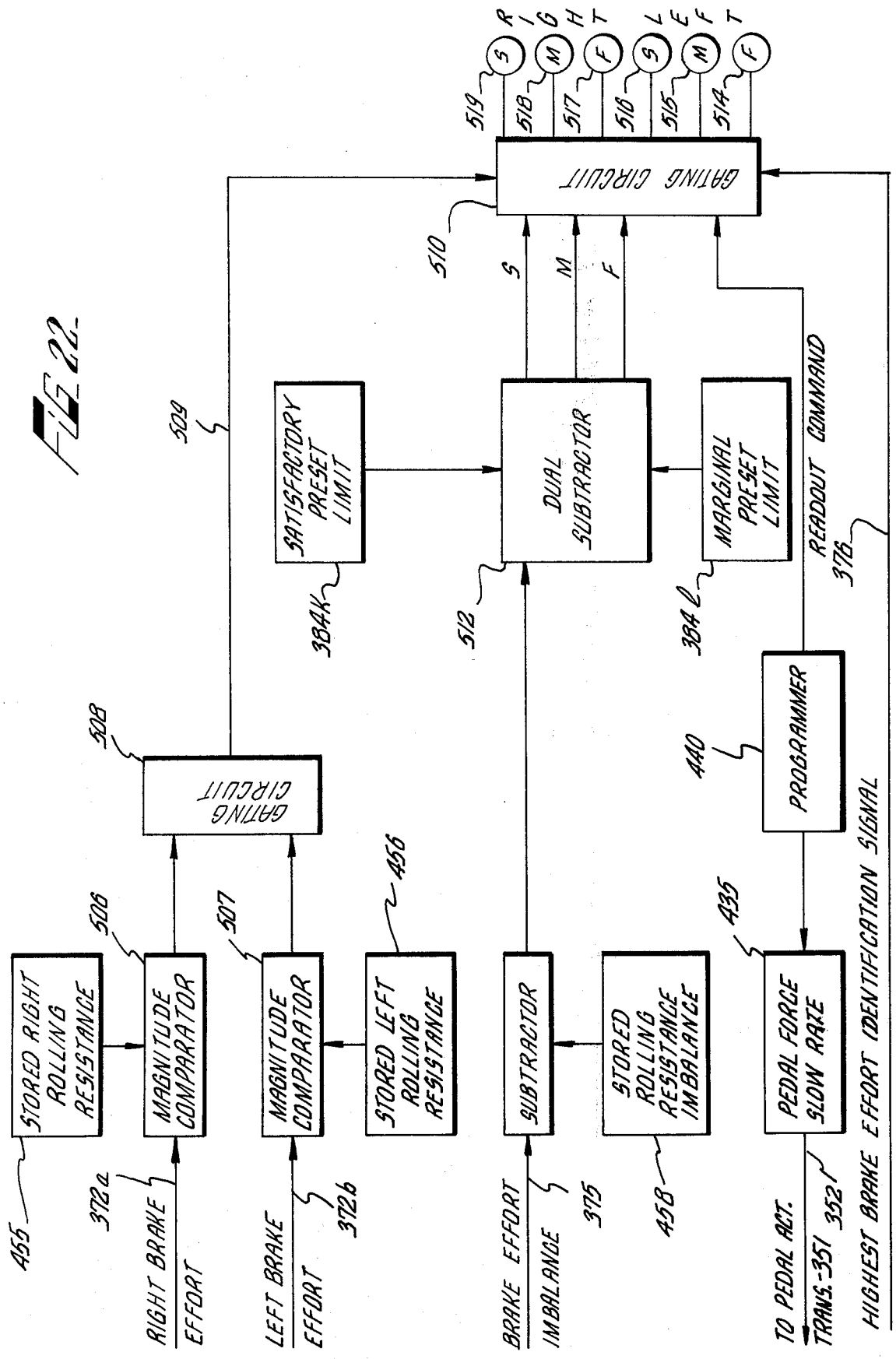

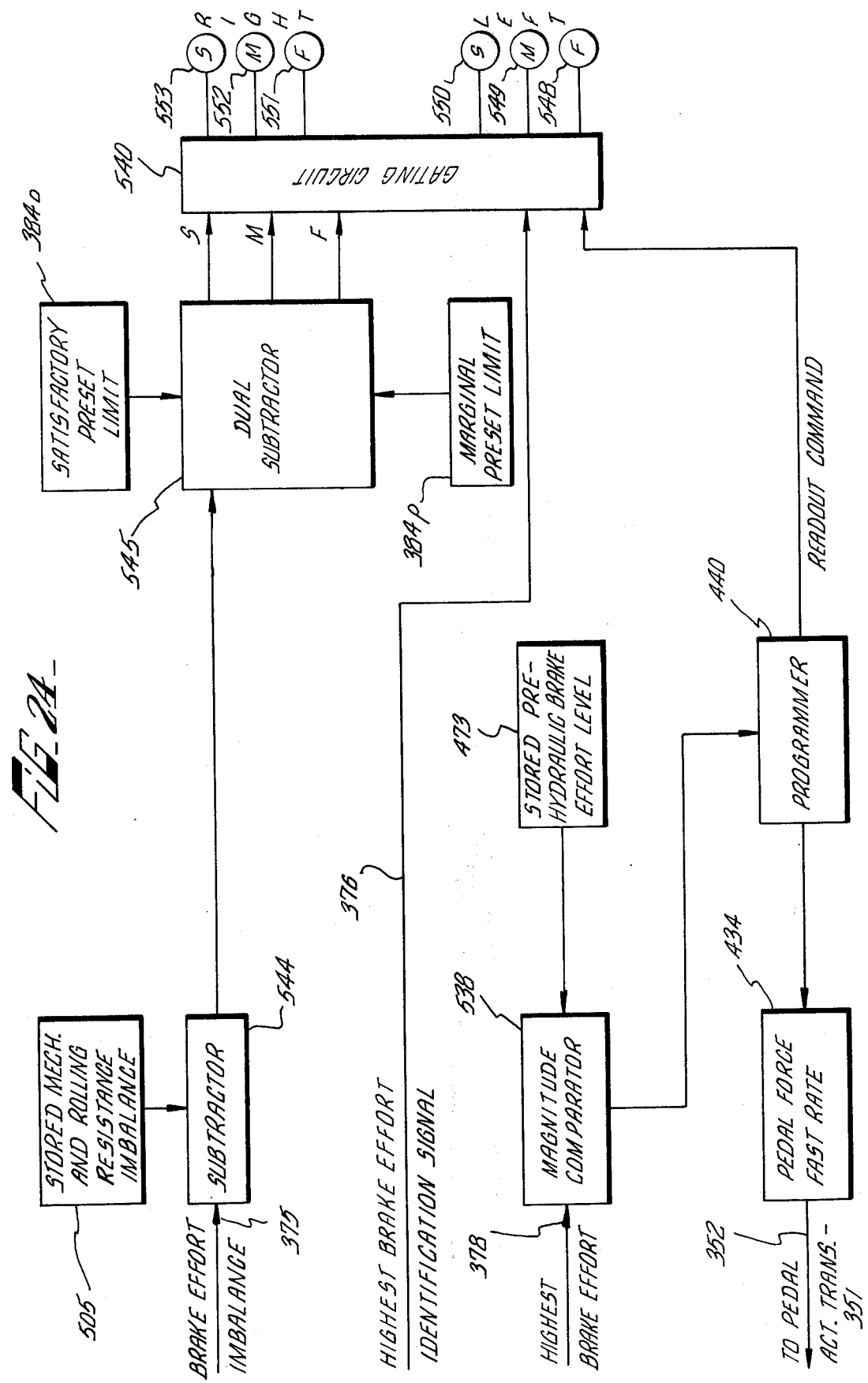

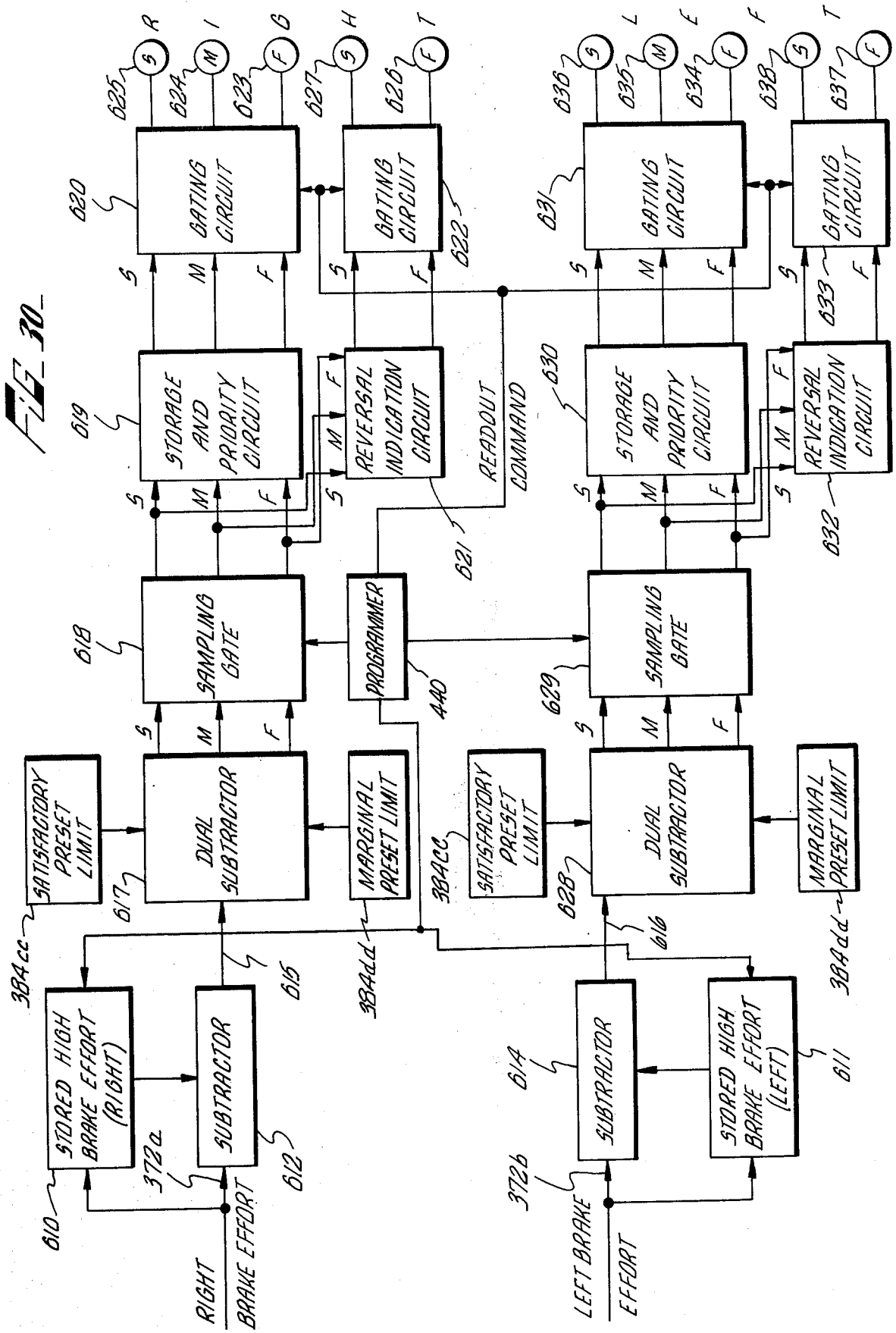

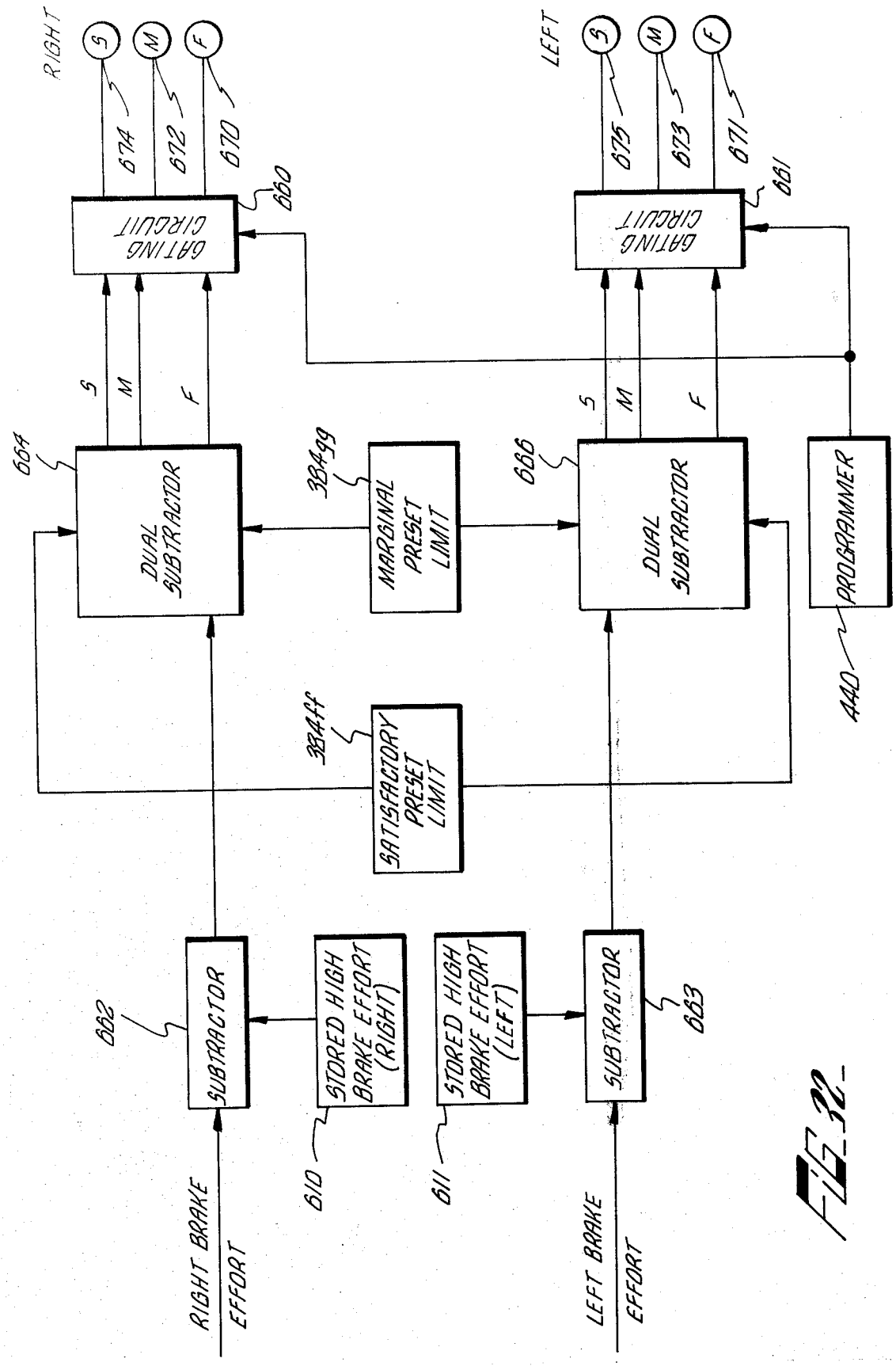

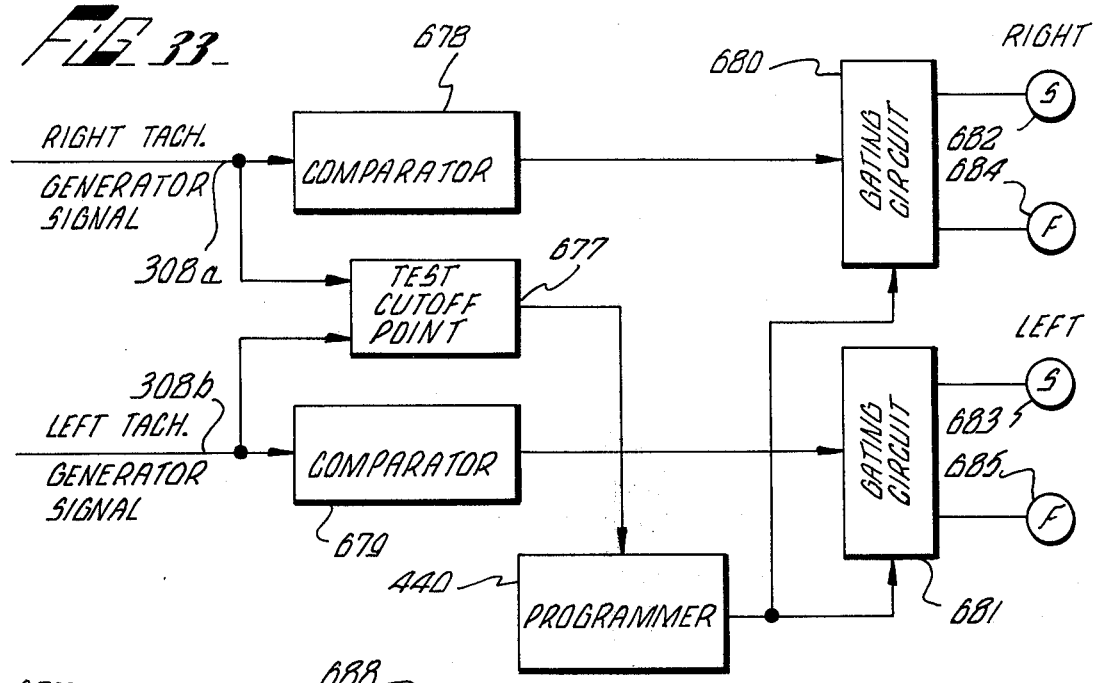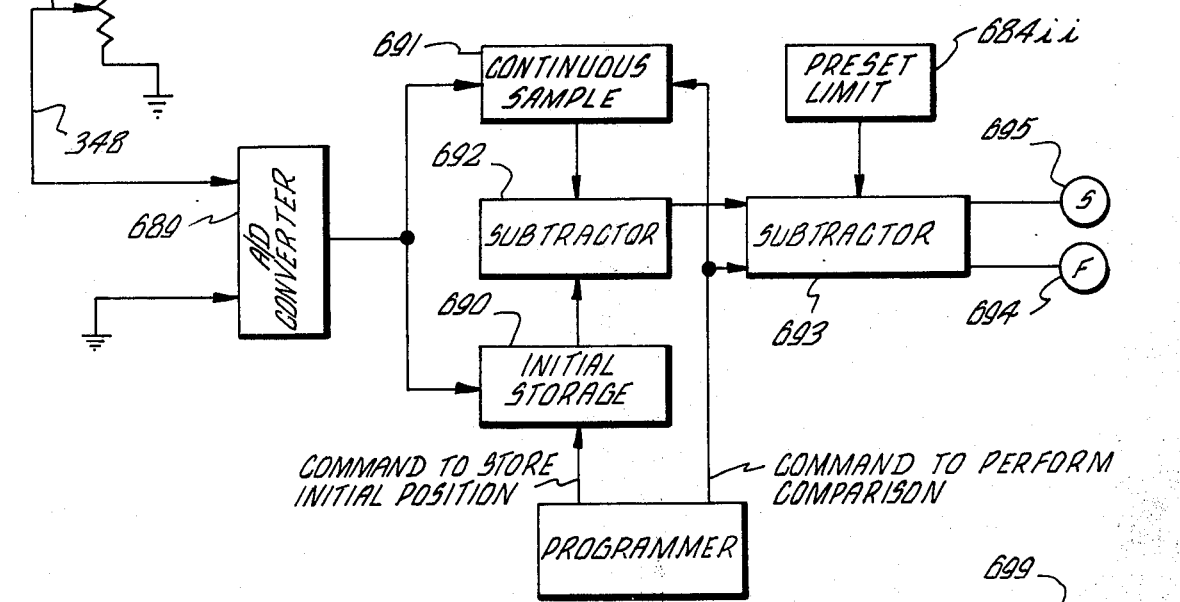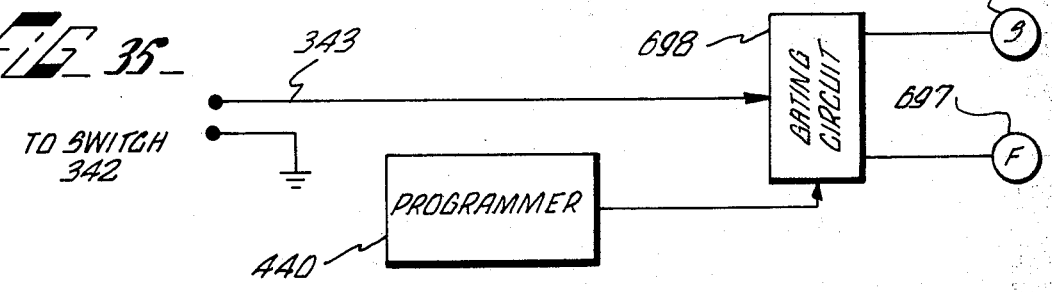

Fig. 36.

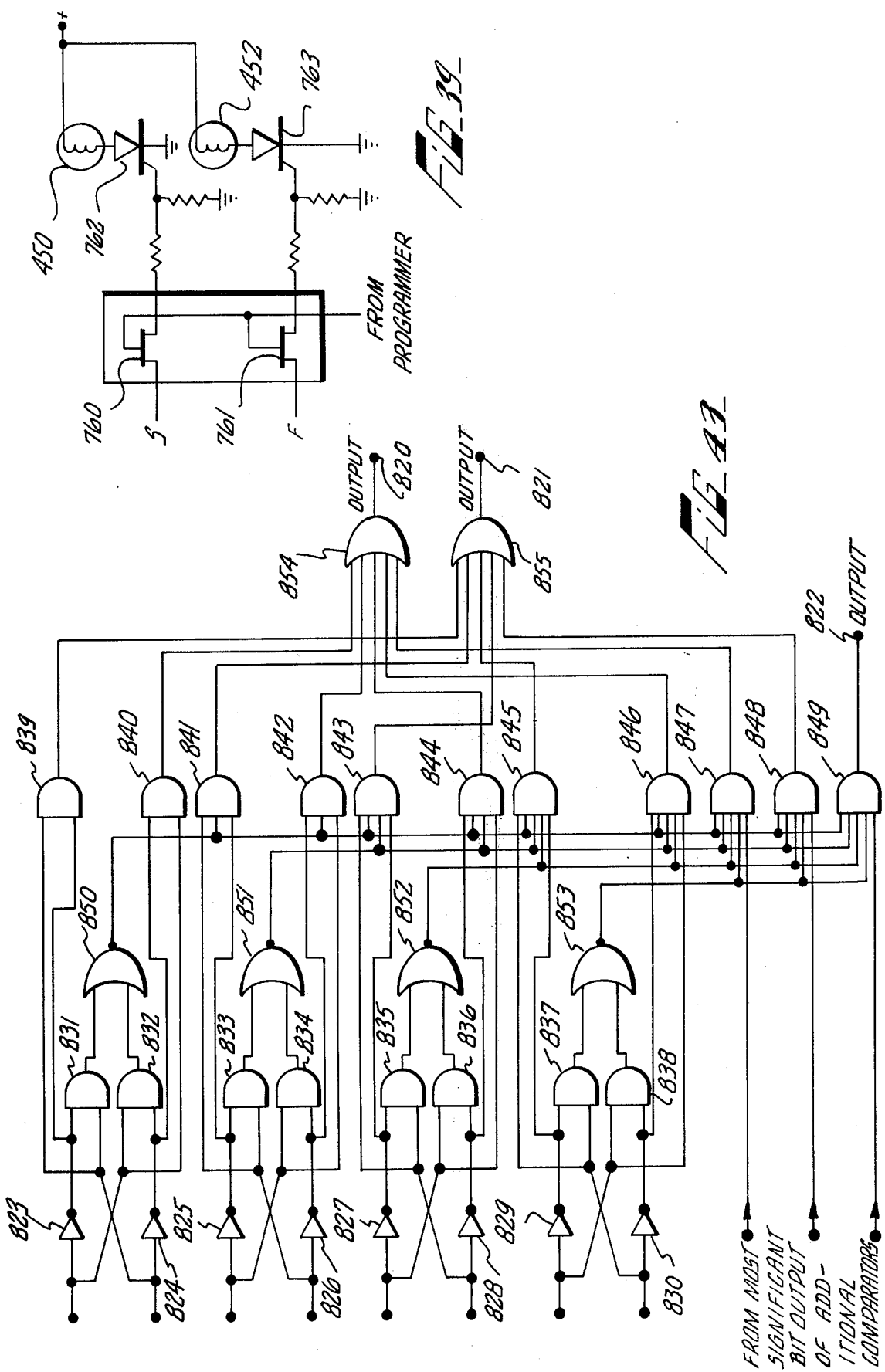

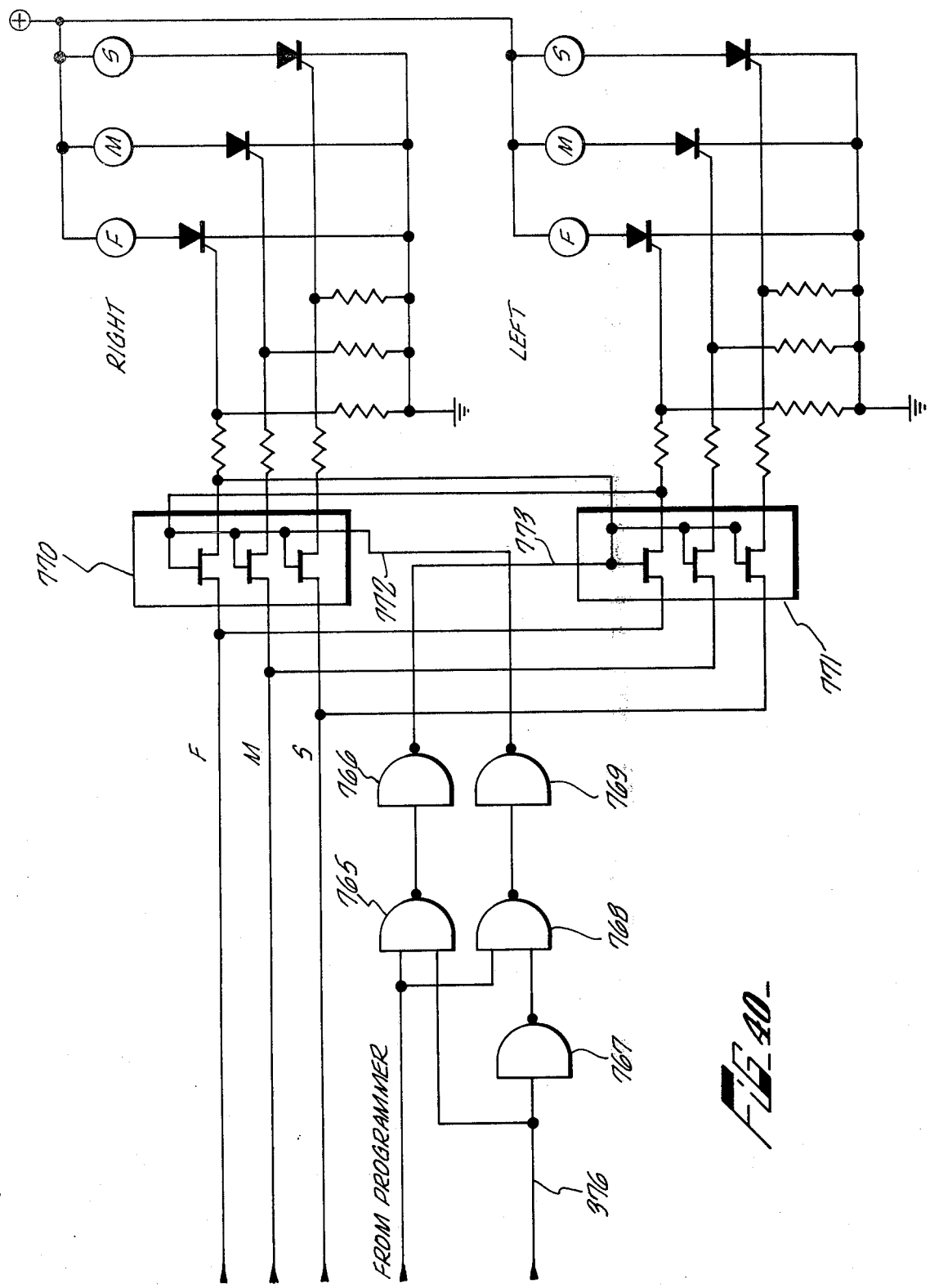

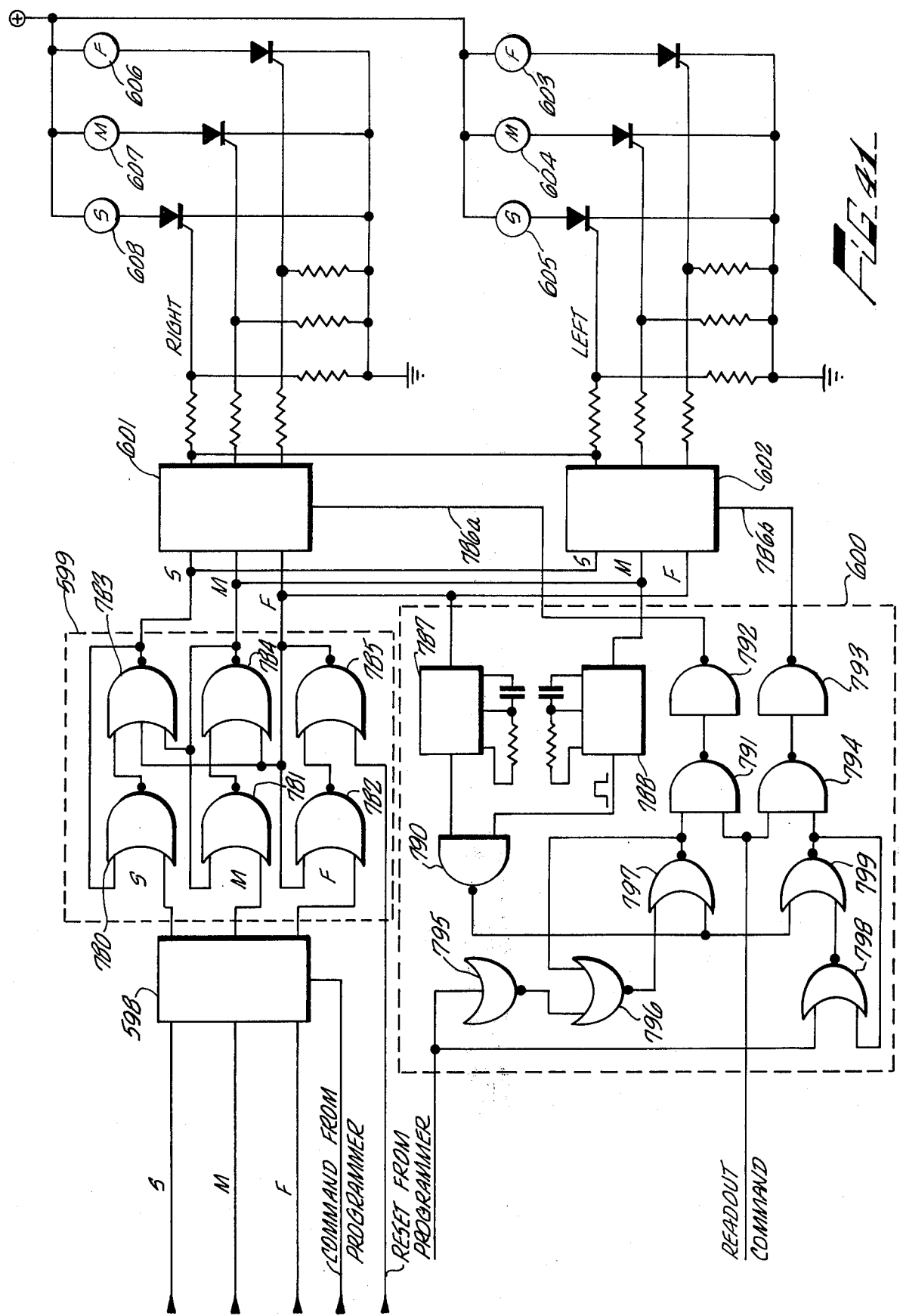

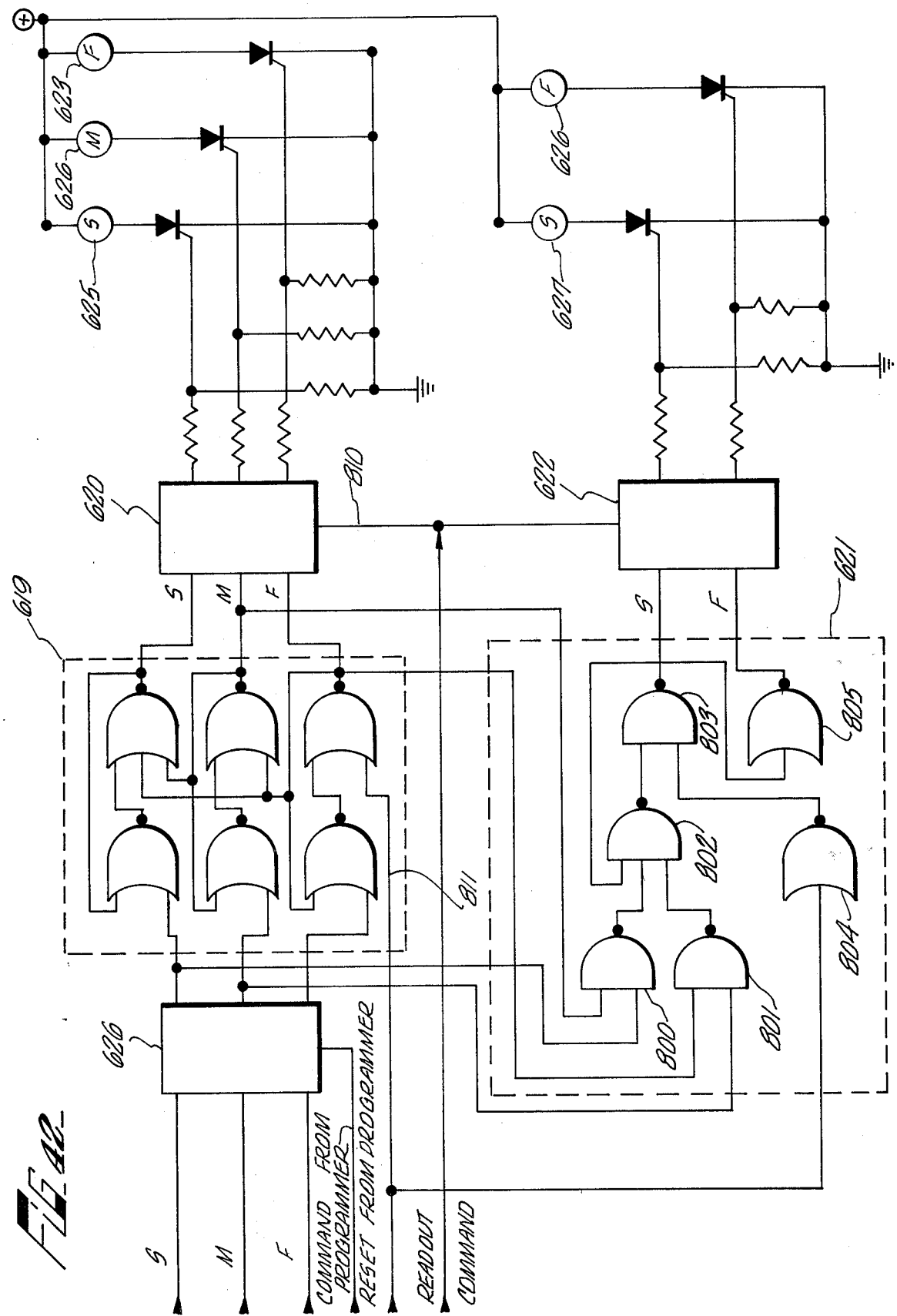

RECORDER AND COMPUTER TYPE BRAKE ANALYZER AND METHOD

REFERENCE TO COPENDING APPLICATION

This is a continuation-in-part application of copending application Ser. No. 811,168, filed Mar. 27, 1969, now abandoned.

BACKGROUND OF THE INVENTION

Field of the Invention

The present invention relates to improved apparatus and systems for testing and diagnosing faults in wheeled, land vehicle brake systems. The invention particularly relates to a method of performance-analysis of brake systems in order to facilitate repair or to enable a quality audit of newly manufactured lining materials for vehicle brakes.

The present invention is of great importance and practical value because faulty or inadequate vehicle brakes are one of the significant contributing causes to the everincreasing number of automobile accidents. It is well known that brake malfunctions caused by neglect, rather than poor brake design, are responsible for essentially all instances of faulty or inadequate vehicle brakes. Furthermore, in a majority of instances, the neglect of vehicle brakes is not intentional. Rather, the owner simply is not aware of the existence of potentially hazardous conditions.

It is frightening to discover that faulty vehicle brakes frequently respond normally under average driving conditions. Consequently, the driver is lulled into a sense of false security concerning the adequacy of his brakes, and, therefore, does not have them inspected, and is completely surprised when a malfunction occurs during emergency deceleration or sudden stops. It is perhaps more unfortunate that a significant number of potentially hazardous, but easily repairable, brake malfunctions are not discovered during routine inspection solely because prior existing inspection methods and equipment do not expose them.

It has been ascertained that brakes must be tested under conditions simulating as closely as possible normal operating conditions in order for meaningful results to be obtained. While brake testing devices of different types have been used in the automotive service industry for many years, methods involving high speed testing were considered to be impractical because of the high power required to be absorbed by brakes even when applied momentarily at speeds above 60 MPH. Accordingly, low speed systems were used which have produces questionable results; lending to the false sense of security in the driver whose brakes were pronounced satisfactory when, in reality, they were not fit for the road. For example, known brake testing systems which drive the individual wheels at different speeds during the test, or in which the rolls engaged with the tire are interconnected by a chain drive or the like, do not permit normal brake function to be accurately simulated and therefore produce results of little value.

Likewise, adequate vehicle brake capability cannot be judged by the distance in which a vehicle can be stopped from a low speed. Such tests, and other low speed tests, made by prior systems utilizing skid plate or roll equipment, disclose very little about how the vehicle brake will perform at high speeds. Present day high driving speeds, coupled with dense traffic conditions, necessitate testing of the quality stop, as well, in order to achieve test integrity. The necessity of testing for quality stop can best be pointed up by the fact that few vehicles equipped with conventional brakes, or even test vehicles equipped with unlined brakes will fail to pass a stopping test or other low speed tests unless the brake pedal "bottoms" on the vehicle floor and is thus prevented from applying the required pressure. Yet, a number of these same vehicles are not capable of making a straight ahead stop from 60 or 70 MPH under emergency conditions. In any high integrity brake testing method it is of utmost importance to determine whether a vehicle is capable of making such a straight ahead stop.

Assume, for example, that a vehicle has a brake imbalance which causes only a two degree steering angle deviation from straight ahead and is subjected to a brake retarding force of 0.5 times vehicle weight. This is the equivalent of a 16.1 ft./sec./sec. deceleration rate, which means a condition of maximum tire coefficient before skid at high speed. It could otherwise be termed "panic" deceleration and is a rate that all vehicle brakes should at least meet. A vehicle being braked from 20 MPH under the conditions outlined above will move sideways 0.7 feet in the first ½ second after the brakes are applied; 1.5 feet in 1 second; or 2.14 feet in the normal 26.7 foot distance required to bring the vehicle to a halt. The same vehicle being braked from 60 MPH will move sideways 4.7 feet in ½ second; 13.8 feet in 1 second; or 103 feet in the normal 241 foot distance required to halt the vehicle. It will be apparent that, even should the operator be alert, and the vehicle be on a dry road, application of brakes under the above conditions may cause loss of control resulting in head-on collision, sideswipe or crash into bridge abutments or highway barriers, or the vehicle leaving the road and possibly going over an embankment, etc.. On wet pavement, where the normal tire-to-road coefficient may be reduced by as much as one-half, an even smaller brake imbalance will seriously impair the braking capability of a vehicle before skidding occurs. It is such previously undetected malfunctions or brake imbalance which the improved apparatus and method of the present invention are especially designed to detect and evaluate.

SUMMARY OF THE INVENTION

The present invention relates to a brake testing apparatus and method of high integrity, which will detect nearly all types of brake malfunction, identity which brake is subjet to the malfunction, and further indicate whether the factor causing the malfunction is mechanical, hydraulic or frictional. In many cases an even more specific cause of the detected malfunction can be readily determined and an accurate repair ticket immediately prepared. Furthermore, the present invention relieves the test operator of the task of reading output instruments or manually recording indicated values during the test procedure and thereby reduces test time while greatly increasing accuracy and reliability.

The brake analyzing apparatus of the present invention includes means for selectively driving the wheels of the test vehicle. Thus, each wheel of the vehicle is cradled between a separate pair of rolls rotatably supported by bearings mounted on a frame assembly. A cradle-mounted electric motor is provided as a prime mover for each set of rolls and arranged to drive only the rear rolls of the set through a flexible coupling.

Other forms of prime mover can be used, such as a hydraulic or pneumatic motor, or an internal combustion engine. All of these are particularly suitable for portable brake testing apparatus. The rolls are driven at equal controlled speeds up to 45 MPH or more and in the preferred form of apparatus, the brake effort is proportional to the reaction force upon each motor housing and is individually measured for each wheel by a pneumatic weighing unit, or force transducer.

In performing a test, the operator or a computer controlled brake actuator applies predetermined forces to the brake pedal, or other brake actuating means, of the test vehicle in a predetermined testing sequence. When the vehicle brakes are actuated, the braking effort produced at each wheel is proportional to the reaction force upon the corresponding motor housing and is measured by the pneumatic weighing unit or other suitable transducer. Alternatively, the load current, torque or speed change of each driving motor can be measured as an indication of the braking effort being applied to its associated wheel. In the case of hydraulic or pneumatic motors, the pressure will increase with load and provide an indication of torque output.

Recording means may be provided to continuously monitor the braking effort signals from the weighing units of the respective wheels under test. For example, a plural channel recorder of the strip chart type having an adjustable time base may be used to continuously record the analog test signals of a complete testing sequence for later inspection and analysis by the operator. The operator may then read the values of the test output signals from the calibrated strip chart for comparison with standard values, or may overlap a transparent or preformed mask on the chart, or place the chart over an illuminated grid, to expose only those test values which deviate from an acceptable standard.

An embodiment designed to analyze the brakes on a single pair of wheels at a time is provided with a four channel recorder. In that case, two of the channels record, respectively, the braking effort signals of the right and left wheels, while the third channel records the balance or difference between the braking efforts of the right and left wheels, and the fourth channel records a signal proportional to the pedal force, or other actuating force, applied by the operator, or through a special brake pedal pressure sending unit attached to the conventional brake pedal.

An embodiment for simultaneously analyzing the brakes on two pairs of wheels is provided with an eight channel recorder. With that equipment, three of the channels record the left, right and balance signals for the front pair of the wheels; three additional channels record the left, right and balance signals for the rear set of wheels; a seventh channel records the difference or balance between the brake effort of the front pair of wheels and the rear pair of wheels; and the eighth channel records a signal proportional to pedal or other actuating force. Satisfactory diagnosis can be made in some instances by recording the braking effort signal of only one wheel of a pair of wheels, along with the recording of the difference in the braking effort of both wheels of the pair.

Alternatively, the recording and comparing means can comprise a special purpose analog or multiple step digital computer designed to receive the test values, compare them with stored standard values and produce output signals in response to an unacceptable deviation of any of the test values from the standard values. Means are provided for storing standard values for different weight classes of vehicles in the computer memory, which may be made available at the election of the operator in order to allow interchangeable testing of vehicles of different weights. The output signals from the computer take the form of a lighted display, punched cards or tape, or a printed sheet itemizing the necessary brake repairs.

An evaluation of the test results obtained is made against a set of realistic standard values previously determined through a careful program of testing the behavior of vehicles equipped with brakes having malfunctions, repairing the malfunctions, and again testing the behavior of the vehicles with corrected brake systems. The standard values selected enable the behavior of the brakes of each vehicle tested to be classified as satisfactory, potentially hazardous, or hazardous. Evaluation of the test results is relatively simple and will identify nearly all conceivable brake malfunctions. In most cases, an exact cause of the malfunction can be identified by a specific symptom of the brake analyzer operation, and in all cases the cause or causes of the malfunction can be categorized as either mechanical, hydraulic, or frictional, or a combination of two or more of these factors.

In general, the brake analysis includes an examination of the rolling resistance of the wheels at high speed with the brakes released; an examination for abnormal mechanical action causing one brake to engage before the other; an examination for hydraulic restriction causing momentary imbalance; an examination of brake balance at modest brake effort; and a high effort test to examine individual brake capability and compare the capability of one brake with another when highway friction surface temperatures are produced.

The test procedure used with the present brake analyzer is generally applicable to various types of vehicles, but for illustrative purposes will be described as applied to passenger cars. Such procedure comprises a carefully designed series of simple, discrete steps which may be easily followed by an operator through a complete test sequence in less than one minute per pair of wheels. Basically, the sequence for each pair of wheels, for example, includes an initial sequential recordation of rolling resistance with brakes released; a gradual application of the brakes to 50-70 pounds brake effort above rolling resistance, followed by a gradual release; then a rapid application of the brakes to approximately the above effort followed by a quick release; and then a normal application of the brakes to an appropriate high level effort held for five to six seconds and released normally. The results attained from the above examinations through use of the instant sequence are sufficient to diagnose nearly all brake problems and have been found to constitute satisfactory working guide lines for operators to write accurate repair job and pricing estimates.

BRIEF DESCRIPTION OF THE DRAWINGS

The construction and operation of the invention, as well as additional objects and advantages thereof, will become apparent when the following description is read in conjunction with the accompanying drawings, in which:

FIG. 2 is an enlarged vertical sectional view taken on the line 2 — 2 of FIG. 1 showing the control components that are associated with the torque arm of one of the wheel-driving motors;

FIG. 4 is a diagrammatic view of another modified form of the brake testing system in which an electrically controlled recording device and/or a computer is used as an output device;

FIG. 5 is a diagrammatic view of a further modification of the brake testing system wherein an electrical signal is produced by the torque arm of the wheel-driving motors, together with a conventional hydraulic brake system of a vehicle to make a record of the test;

FIG. 5A is a diagrammatic view of a brake testing system somewhat similar to that shown in FIG. 5, but wherein the recorder is actuated in accordance with variations in amperage drawn by the driving motors;

FIG. 5B illustrates a further and simplified modification in which the recorder is actuated in accordance with variations in the current or voltage generated by a tachometer generator connected with the driving motors;

FIG. 6 is a diagrammatic view of yet another modification of the brake testing system, illustrating a method and apparatus for simultaneously recording the results of a brake test on all four wheels of a vehicle;

FIG. 7 is a chart of the standards used in evaluating the condition of the vehicle brakes tested;

FIG. 8 is a fragmentary view of a test record chart illustrating the condition of an exemplary set of vehicle brakes as measured by the successive steps involved in the test;

FIG. 9 is a fragmentary view of a further chart used to illustrate other patterns the test record chart may assume for various brake malfunctions;

FIG. 11 is a diagrammatic view of a brake testing apparatus which may be used in an automatic or computer controlled brake analyzer system;

FIG. 12 is a plan view of the brake pedal control unit 332 of FIG. 11 illustrating the placement of the operator's feet thereon in dotted lines;

FIG. 13 is a block diagram of a computer, control and sensor units for use with the apparatus of FIG. 11;

FIG. 14 is a block diagram of analog to digital converters for converting the analog brake effort and pedal force signals to digital format;

FIG. 15 is a block diagram of certain vehicle test limit storage elements for use in the circuit of FIG. 13;

FIG. 17 is a block diagram of a programmer for use in the computer of FIG. 13;

FIG. 18 is a block diagram of certain computer components for providing rolling resistance test data;

FIG. 19 is a block diagram of certain computer components for calculating and storing the pre-hydraulic brake effort level;

FIG. 20 is a block diagram of certain computer components for providing brake engagement lag test data;

FIG. 22 is a block diagram of certain computer components for providing brake disengagement lag test data;

FIG. 24 is a block diagram of certain computer components for providing brake fluid restriction test data;

FIG. 30 is a block diagram of certain computer components for providing brake excursion test data;

FIG. 32 is a block diagram of certain computer components for providing brake fade test data;

FIG. 33 is a block diagram of certain computer components for providing anti-skid test data;

FIG. 34 is a block diagram of certain computer components for providing static brake pedal force test data;

FIG. 35 is a block diagram of certain computer components for providing minimum brake pedal to floor distance test data;

FIG. 36 is a schematic diagram of a display and main switch panel which may be used in the computer of FIG. 13;

FIG. 37 is a block diagram of a logic circuit that may be used as a single subtractor, for example in FIG. 14;

FIG. 39 is a schematic circuit diagram of a readout gating and indicating lamp circuit;

FIG. 40 is a schematic and logic circuit diagram of another readout gating and indicating lamp circuit;

FIG. 41 is a logic diagram of a sampling gate storage and priority circuit and readout gating circuit which may be used in the circuit of FIG. 29;

FIG. 42 is a logic diagram of a sampling gate, storage and priority circuit and reversal indication circuit which may be employed in FIG. 42; and FIG. 43 is a logic diagram of a magnitude comparator.

DETAILED DESCRIPTION OF THE MEASURING AND RECORDING INSTRUMENTATION

Figure 1:
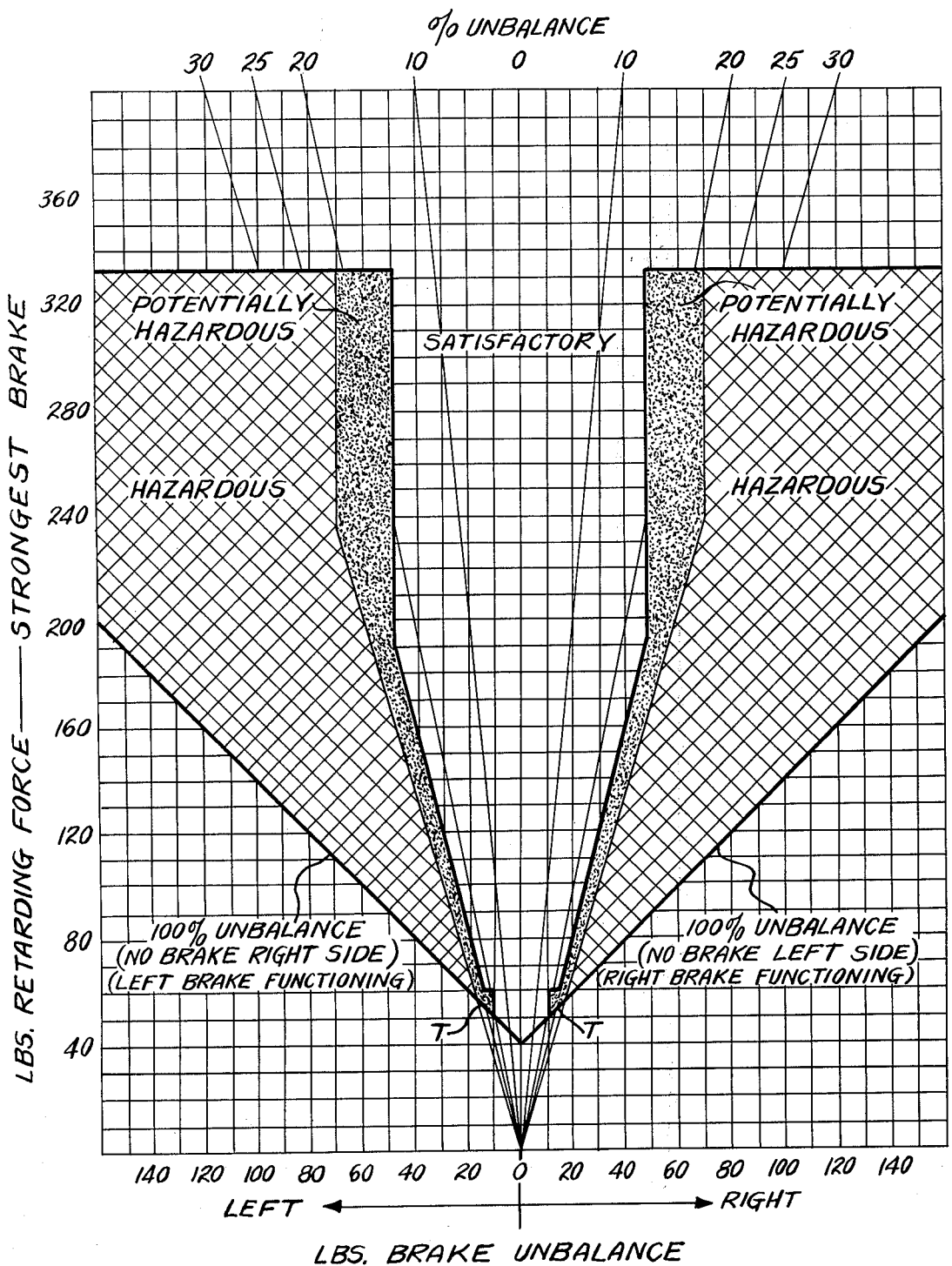
FIG. 1 is a diagrammatic view of a brake testing system embodying the principles of the present invention.

Referring now to FIG. 1, a testing system designed in accordance with the present invention is shown. A pair of tires 11, 12 on wheels of a vehicle where brakes are to be tested are cradled between pairs of rolls 14, 15 and 16, 17, respectively. The rolls 15 and 17 drive the wheels during the test, as will appear later. The rolls 14, 15 and 16, 17 are rotatably supported by bearings mounted in a conventional frame assembly, not shown.

The rolls and frame assembly may be arranged in any convenient manner to permit the wheels of the test vehicle to be easily stationed thereon. In an exemplary installation the frame assembly may be mounted in a pit with the rolls at the floor level so that the test vehicle may be readily driven on and off the rolls. The rolls 15 and 17 are oriented so that they are farthest from the front end of the vehicle during a test.

A cradle-mounted electric motor 21 is provided as a driving means for the left roll 15. In the embodiment shown, the shaft of motor 21 is directly coupled to the shaft of rear or drive roll 15 by a flexible coupling 24, while front roll 14 is permitted to idle. A similar motor 22 is provided with a flexible coupling 25 connecting the main shaft thereof to the right rear roll 17, while the right front roll 16 is permitted to idle.

A careful balance of motor power and roll spacing is necessary in the described apparatus in order to permit accurate simulation of on-highway speeds and braking conditions. Thus, it has been found that the brake heat produced in stopping a vehicle traveling 60 MPH is about nine times higher than that produced in stopping from 20 MPH. A high integrity testing system must have sufficient power to produce such heat at the brake friction surfaces in the time consumed in a normal highway stop. Thus, neglecting vehicle wind resistance as a retarding force, a 0.5 G deceleration of a 4000 lb. vehicle from 60 MPH to 0 MPH results in an average brake heating rate of 113 btu/sec over a stopping time of 5.48 sec. This power requirement can be met by application of 40 horsepower at each wheel to be tested.

Although on-highway brake friction surface rubbing velocities decrease as the vehicle decelerates, it has been found that test integrity is affected only at extremely high speeds resulting in low brake application forces for a given heating rate and at speeds below the critical rubbing velocity of the friction surfaces. Thus, integrity may be retained when tests are performed at one speed so long as the speed selected falls within the wide limits set forth above.

Selection of a particular speed is also dependent upon the tractive effort between the driving rolls 15 and 17 and the tire tread. When a vehicle tire is cradled between two rolls as shown in FIG. 1, pressure less than road contact pressures are present between the tires and each roll. The pressure normal to the roll surface is dependent upon both the roll spacing and the particular roll from which the turning force is applied to the tire. Thus, it should be apparent that as the brakes are applied against rotating drive rolls 15 and 17, the vehicle will tend to move backward. This will reduce the tire contact pressure against the forward idle rolls 14 and 16 and increase the tire contact pressure against the rear drive rolls 15 and 17. Accordingly, application of power to the tires through the rear drive rolls 15 and 17, as shown in the preferred embodiment, has the advantage of increasing the tire-to-roll contact pressure as the brakes are increasingly applied.

In the preferred embodiment, a test speed of 45 MPH has been found to be most suitable in view of the above factors. A roll spacing which separated the tire-to-roll contact points by sixty degrees or more along the tire circumference was used. For a 15 inch rolling radius on passenger cars, the angle can vary from 52° to 63°. However, due to various rolling radii of tires, the angle range can be 50°- 81° for passenger cars. For average highway truck tires, the angle can be as low as 40°. The power requirement was economically met by providing for each wheel, a 20 HP motor having a free running speed of 1800 RPM. For the short periods necessary during the test procedures, the 20 HP motor is operated above rated capacity in order to deliver the above-mentioned 40 HP requirement. Motors having high torque versus slip characteristics are used to compel both the right and left tires to rotate at substantially the same speed even though large brake unbalance may exist. Consequently, the desired on-road heat balance between both brakes is assured.

It should be apparent, however, that any other suitable means for driving the rolls, as well as other suitable roll spacings, could be used without departing from the principles of the present invention.

Each motor 21, 22 is cradled as in a dynamometer so that a force reaction can be measured from its housing, which is equal to the input force to the rolls and tires. Consequently, as the brakes are applied, their torque resistance to wheel rotation is proportional to motor housing reaction. Since the right and left rolls are not interconnected, the retarding force from each brake can be independently measured by any suitable weighing device, for example, a pneumatic weighing unit. The measured values of right and left wheel brake effort are automatically recorded, by means described hereinafter, in order that they may be interpreted by the operator or exhibited to a customer at a later time.

Conventional pneumatic weighing systems 26, 27 are provided for each motor 21 and 22; with both units 38 and 39 being supplied with air pressure from a source, not shown, via air supply line 29. An air filter and water trap 31, an air pressure regulator 32, and a shut-off valve 33 are provided in the main supply line 29 in order to ensure that a constant pressure source of clean air is available to the weighing units. As is shown in detail in FIG. 2, each weighing unit 26 and 27 includes a torque arm 41, 42, fixed to its associated motor housing and extending in a horizontal attitude substantially parallel to a stationary base plate 37, FIG. 2. The pneumatic weight unit 38 is shown connected between the base plate 37 and torque arm 42, having an upper rod 44 designed to move vertically as the motor housing and torque arm 42 are rotated. Air pressure from line 29 is admitted to the bottom of the weighing unit 38 through a conduit 45, and an outlet conduit 46 is adapted to be connected to an output pressure line 48 including a shut-off valve 48a, as shown in FIG. 1. The vertical movement of rod 44 operates a sensitive air valve within the weighing unit 38 in a well known manner in order to modulate the input pressure in accordance with the angular movement of torque arm 42 and produce a pressure in output line 48, which is proportional to the braking effort of the right wheel. A conventional dash pot 47 is mounted between the torque arm 42 and base plate 37 in order to damp oscillations of the motor housing. A tare weight 43 is suspended from the free end of torque arm 42 to enable calibration of the weighing unit.

As is shown in FIG. 1, the outlets of weighing systems 26, 27 are connected respectively to lines or conduits 48, 49 which deliver the weighing system output signals to a recorder 60. The conduit 49 has a shut-off valve 49a connected therein.

The recorder 60 also receives a pressure signal via an hydraulic line 50, which is proportional to the brake pedal force applied in the vehicle by the operator. The pedal force signal is developed from a brake pedal pressure signal sending unit 52 adapted to be mounted upon the customary brake pedal 51, as shown in FIG. 1. The unit 52 is designed to produce an accurate output signal regardless of the operator's foot position or the angle of pressure being applied to the face of an auxiliary pedal 57 of the unit. The particular details of a suitable unit 52 are disclosed in a co-pending application of Leland P. Tinkham for a Brake Pedal Pressure Siganl Sending Unit In general, the unit 52 includes a bracket 53 by which a housing 54 is removably fastened to the foot pad of a regular brake pedal 51. The brake pedal 51 is pivoted at 51a to the usual firewall F. An upper plate 55 of the unit 52 is pivotally fastened to the housing 54 by a pin 56 and acts as a support for the auxiliary pedal 57, which is, in turn, pivotally attached to the upper plate 55 by a pin 58. A fluid reservoir, valve and cylinder assembly, details of which are not shown, are confined within the housing 54. Any pressure applied to the auxiliary pedal 57 will result in actuation of the brake pedal 51 and create pressure in a master cylinder 58a in the vehicle hydraulic brake line 59 and will be accompanied by a proportional pressure in line 50 connected at one end to the housing 54 and at its other end to the recorder 60.

Recorder 60 is conventional and as shown includes a main strip or wide tape S having imprinted thereon lines for four parallel strip charts 62, 63, 64 and 65 movable in the direction of the arrow Z by driving means, not shown. A separate pen, 67, 68, 69 and 70 is provided for each strip charg, along with a transducer 72, 73, 74, 75, respectively, for translating any variation in the pressure input to the transducer into a proportional movement of the writing tip of the associated pens. As shown, the conduit 49 from the weighing system 26 associated with the left wheel 11 is connected to the transducer 72, whereby the effective left brake force is recorded on the chart 62. In like manner the effective right brake force, via conduit 48 and transducer 74, is recorded on the chart 64. Transducer 73 receives opposing signals from conduits 48, 49 and therefore records the result of the pressure differential, if any, between left brake force and right brake force to indicate any brake imbalance on chart 63. A suitable gauge 77 is provided in conduit 50 in order that the operator may visually observe the pedal pressure he is exerting during a test sequence. A dual gauge 78 having a pair of coaxially mounted pointers 78a and 78b is connected to the respective conduits 48 and 49 by tubing 78c in order to visually display the braking force being applied to the right and left brakes, respectively, it being understood that one of the pointers 78a indicates the braking effort applied to the left wheel and that the other pointer 79b indicates the braking effort applied to the right wheel. A differential pressure gauge 79 having a pointer 79a is connected by tubing 79b between the conduits 48 and 49 to indicate the total unbalance in the braking effort applied to the pair of wheels, and to indicate by the deflection of its pointer 79a to the left or right of zero, which of the wheels is receiving the greater braking effort.

Figure 3:
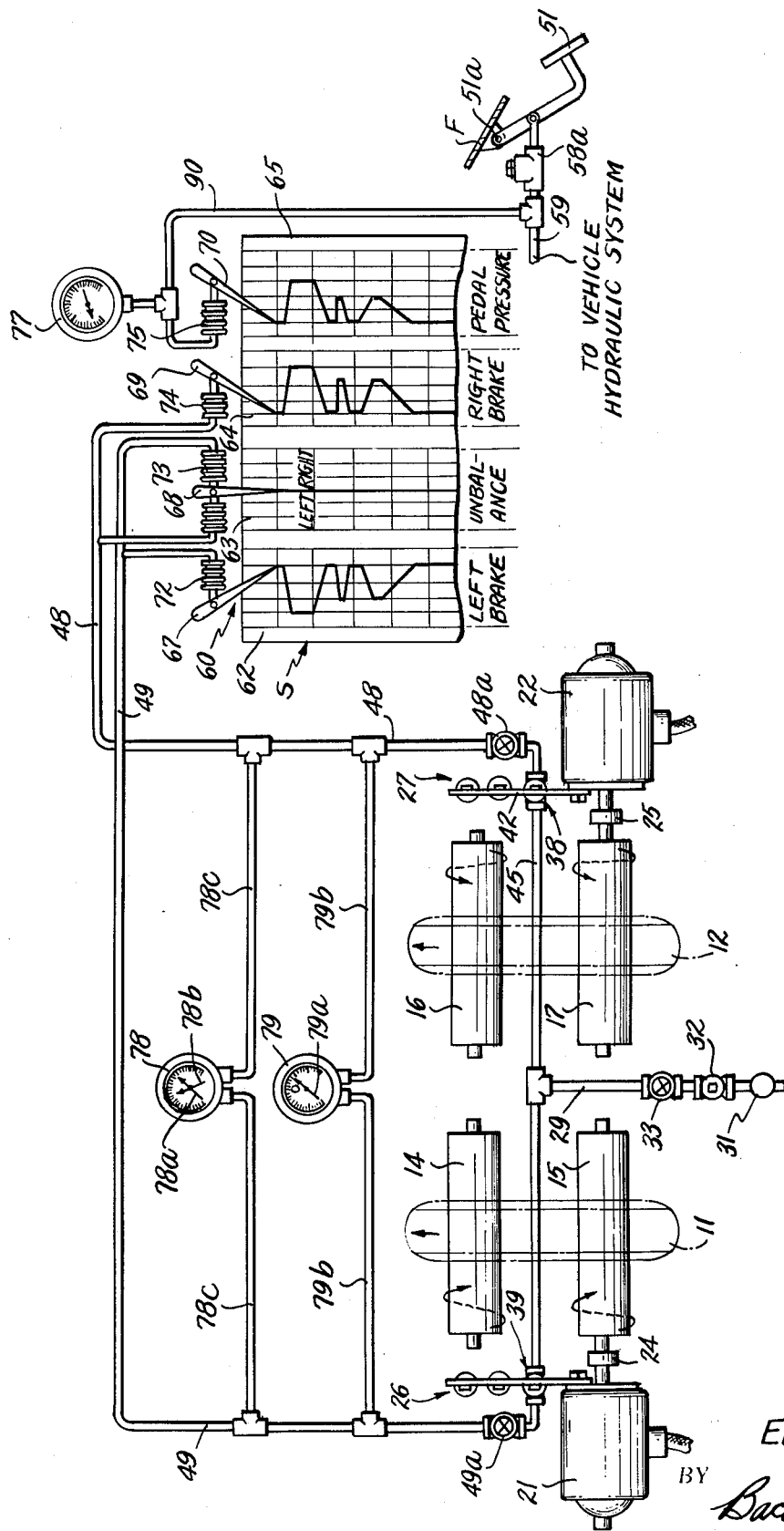
FIG. 3 is a diagrammatic view of a modified form of the brake testing system including an alternative means of measuring the brake pedal force.

Referring now to FIG. 3, an alternative embodiment of the testing system is shown wherein parts previously described are identified by the same numerals. Here, the brake pedal pressure signal sending unit 52 is not used. Rather, the recorder 60 receives a signal via a conduit 90, which is derived directly from the vehicle hydraulic system, for example, from the output of the master cylinder 58a. It should be clear that the hydraulic pressure in conduit 90, when pedal 51 is depressed, will be proportional to the pressure in the vehicle brake hydraulic system, and that the transducer 75 of the recorder 60 can be easily calibrated to function properly with the connection shown. The embodiment of FIG. 3 is identical with that of FIG. 1 in all other respects. While FIG. 3 illustrates a hydraulic brake system, it is apparent that other fluid operated systems, such as pneumatic or vacuum, could be used to produce a suitable signal to operate the transducer 75.

In the embodiment of FIG. 4, electrical signals are developed which are proportional to the brake effort and pedal pressure, respectively, in order that an electrically controlled recorder and/or a computer may be used as an output device. The wheel driving means and weighing units of this embodiment are identical with the corresponding equipment of FIGS. 1 and 3 and bear corresponding numerals. In FIG. 4, the fluid pressure signal conduits 48, 49 are shown connected, respectively, to pressure-to-electrical transducers 111, 112, respectively. These transducers are of conventional design such as Type 4-311 produced by Consolidated Electrodynamics Corp. Transducer 111 translates any variation in the pressure in conduit 48 into corresponding movements of a rod 113. Rod 113 is attached to a movable contact 116 of a rheostat 115, which is shown in a closed electrical circuit including battery 120, or other power source, and the contacts of a motor 106, adapted to control left braking recording pen 101 of a recorder 110. In a like manner, transducer 112 controls the movable contact 118 of rheostat 117 in circuit with a battery 121, or other power source, and the contacts of a motor 108, adapted to control right brake recording pen 103. Brake imbalance recording pen 102 is controlled by a motor 107, which is oppositely energized by the circuits from batteries 120, 121, so that motor 107 will be controlled in response to imbalances in the pressure in conduits 48 and 49. In a similar manner, the hydraulic pressure in conduit 50 is translated into an electrical signal by a transducer 124 controlling movable contact 126 of rheostat 125. Rheostat 125 is shown in circuit with battery 121 and the contacts of motor 109 adapted to control a pedal pressure recording pen 104.

It should be apparent that the brake effort and pedal pressure of the vehicle under test will be recorded, as before, on the moving strip chart S for later analysis by the operator. A computer 140 is also connected, as an output device, in the embodiment of FIG. 4 with electrical lines 141, 142, 143, 144 and 145 being connected from the recorder 110 as inputs to the computer 140. These input lines convey to the computer the same analog signals which are available on the five input lines 131, 132, 133, 134, and 135 to the recorder. Although both a recorder 110 and a computer 140 are shown in FIG. 4, it should be noted that the recorder 110 can be omitted and the computer 140 provided alone and solely relied upon for the processing of the information input thereto in analog form. The recorder 110 has value as a documentation aid to dispel customer doubts or to answer complaints. However, in the fact of computer reliability, the cost of maintaining both devices in the same system would not be feasible economically.

The computer 140 is a special purpose analog unit designed to receive the test values from the brake measuring system, compare them with standard values stored in the computer memory, and produce output indications in response to an unacceptable deviation of any of the test values from the standard values. The stored values may include information for different weight classes and sizes of vehicles, which is made available to the operator in order to permit the interchangeable testing of different types of vehicles. The output signals of the computer 140 may take the form of a tape 140a, or lights or punched cards (not shown). Alternatively, the computer 140 may be connected with a printer 160, by input lines 161, 162, 163, 164 and 165, set up for printing out a complete repair sheet 166.

FIG. 5 differs from the previous embodiments in that the pneumatic units 38 and 39 and the transducers 111, 112 and 124 are omitted and electrical signals are derived directly from weighing units 38a and 39a. Thus a movable contact 171 of a rheostat 170 is controlled by the movement of the upper rod 44a of the weighing unit 39a, while movable contact 173 of rheostat 172 is similarly controlled by weighing unit 38a. In this embodiment, the brake pedal pressure signal sending unit 52 is also not used. Instead, an electrical signal is derived from a circuit directly controlled by movement of the brake pedal 51 upon which is mounted a suitably calibrated hydraulic-pressure-to-electrical-signal transducer 175 having a movable contact 176 of a rheostat 177 associated therewith. The rheostat 177 is connected in a circuit with a battery 178, or other power source, by a conductor 179 and the movable contact 176 is connected by a conductor 180 with the motor 109 that operates the pedal pressure recording pen 104.

The rheostat 170 is connected in circuit with the battery 120 and the motor 106 that operates the pen 101 to record the braking effort applied to the left wheel. The rheostat 172 is connected in circuit with the battery 121 and the motor 108 that operates the pen 103 for recording the braking effort applied by the right brake. The motor 107, which operates the pen 102 for recording any imbalance in the left and right brakes, is connected across the rheostats 170 and 172 by a conductor 181.

As an alternative to the use of the rheostats 170 and 172 in the embodiment shown in FIG. 5, the amperage, torque or speed of the motors 21 and 22 could be measured directly as an indication of the braking effort of the particular wheel driven by the motor. Current proportional to the torque effort would then be supplied to the pen motors 106, 107 and 108. In the latter case, the electrical connections to the recorder 60 would be identical with those shown in FIG. 5.

Referring to FIG. 5A, the elements corresponding to those heretofore described have been identified by the same reference numerals. Thus, the principal difference between the system shown in FIG. 5A and that shown in FIG. 5 is that the torque arms of members 41 and 42, and the pneumatic systems associated therewith have been omitted and electrical means is shown in lieu thereof for actuating the recorder motors 106, 107, and 108, in accordance with variations in the current or amperage draw of the motors 21 and 22. Thus, in FIG. 5A, a power source is generally identified by the numeral 250, which is connected through a three-wire circuit with each of the motors 21 and 22.

A power lead 251 connects the power source 250 to the motor 21, and a power lead 252 connects the power source with the motor 22. The power source 250 is further connected with the motor 21 by leads 251a and 251b, and is further connected to the motor 22 by leads 252a and 252b. Coils 253 and 254 surround the lead 251, while coils 255 and 256 surround the lead 252. These coils inductively generate an alternating current signal proportional to the current being drawn by the respective motors 21 and 22. The current from the coils 254 and 255 associated with the leads 251 and 252, respectively, is reactified, as will now be explained.

The coil 253 is connected by conductors 257 and 258 to a conventional direct current rectifier 253a. The coil 254 is connected by conductors 259 and 260 to a similar rectifier 254a; the coil 255 is connected by conductors 261 and 262 to a rectifier 255a; and the coil 256 is connected by conductors 263 and 264 to a rectifier 256a. The rectifier 254a is connected by conductors 265 and 266 with the motor 106, which operates recording pen 101 to indicate left brake effort. The rectifier 255a is connected by conductors 267 and 68 to the motor 108, which drives recording pen 103 for recording right brake effort. The rectified signals from coil 253 on the motor lead 251, and from the coil 256 on the motor lead 252 are connected together in opposition, that is to say, the plus terminals of the rectifiers 253a and 256a are interconnected by a conductor 269, and the negative terminals are interconnected by a conductor 270. The voltage across the interconnected conductors 269 and 270 represents a differential voltage, which is transmitted by conductor 271 and 272 to the motor 107, which actuates recording pen 102 to indicate the degree of brake imbalance, if any. The alternating current signals can be used without rectification, if desired, but the direct current system described provides a simpler arrangement.

The motor 109 in FIG. 5A, which actuates recording pen 104 to indicate pedal pressure, functions in the same manner previously described in connection with FIG. 5.

FIG. 5b illustrates a simplified system that senses variation or speed droop of the drive motors 21 and 22. The speed droop is the loss of speed that occurs with increasing load and is characteristic of alternating current motors. Each of the motors 21 and 22 is connected to drive a relatively small generator 273 and 274, respectively, of low internal resistance and of a permanent magnet DC type, which is commonly known as a tachometer generator. The tachometer generator 273 is connected by conductors 275 and 276 to the motor 106, which drives recording pen 101 for indicating left brake effort. Tachometer generator 274 is connected by conductors 277 and 278 with motor 108, which drives recording pen 103 for recording right wheel brake effort.

The tachometer generators 273 and 274 are designed to provide an output voltage which varies with the speed in a linear fashion. The drop in speed from the no load speed of the driving motor to the load during a brake test, is a measure of the motor torque and is recorded as brake effort. Interconnecting leads 279 and 280 between positive generator lines 277 and 276 provide a common reference base for a comparison or differential signal. The positive generator lines 279 and 280 are connected to the motor 107, which actuates the recording pen 102. The motor 107, thus, functions as a center zero direct current volt meter to indicate differences in generator output voltage. The difference in output voltage constitutes the difference in speed droop and is recorded as brake balance, or imbalance. The motor 109 actuates the recording pen 104 in response to pressure on the pedal F, as previously described.

Referring now to FIG. 6, another embodiment of the invention is shown which is designed for the simultaneous testing of the brakes on two pairs of wheels of a vehicle. However, it will be understood that three or more pairs of wheels can be simultaneously tested by adding more brake tester rolls and related instrumentation. Two assemblies of rolls and driving means 201, 202 are shown, each of which is identical to the units 38a and 39a described in connection with FIG. 5. The assemblies 201 and 202 are suitably spaced apart and supported to accommodate the four wheels of an automobile. Thus, the assembly 201 supports the left and right front wheels LF and RF, respectively, and the assembly 201 supports the left and right wheels LR and RR, respectively. Electrical signals are developed in conductors 205, 206, 207 and 208, in the same manner previously described in the use of the units 38a and 39a, which are proportional to the brake efforts, respectively, of the four wheels under test. An additional electrical signal is developed in line 209 proportional to the pedal pressure. Pre-amplifiers 211, 212, 213, 214 and 215 are provided to enhance these electrical signals and the outputs of the amplifiers are then fed as inputs to a recorder 240. Amplifiers 211 to 215 are conventional d.c. amplifiers such as Type 1-1500 manufactured by Consolidated Electrodynamics Corporation.

Any suitable conventional power source 218 is provided for the pre-amplifiers 211 to 215, via the connections 211a to 215a shown. Differential amplifiers 221, 222 and 223, also of a conventional design, are shown connected across the outputs of the pre-amplifiers 211 to 214 in order to develop electrical signals proportional to the brake effort and imbalance of the four wheels. Thus amplifier 221 receives input signals from pre-amplifier units 211, 212 and produces an output signal proportional to the difference or brake effort imbalance between the left front and right front wheels LF and RF, respectively, of the test vehicle. A similar amplifier 223 receives inputs from pre-amplifier units 213, 214 and produces an output signal proportional to the brake effort imbalance between the left rear and right rear wheels LR and RR, respectively, of the vehicle. Differential amplifier 222 receives inputs from all four units 211 and 214 and therefore produces an output signal proportional to the brake effort imbalance between the front axle wheels and rear axle wheels of the vehicle. Pedal pressure is signalled through a hydrualic pressure to electrical signal transducer 241 connected in circuit with pre-amplifier 215. However, it will be understood that a signal could be transmitted mechanically instead of hydraulically, to the transducer 241.

The signals are fed, via electric conductors 231, 232, 233, 234, 235, 236 to a conventional eight channel recorder unit 240, which receives power through a conductor 239. A suitable eight channel recorder is produced by Consolidated Electrodynamics Corporation, designated as Type DG-5510.

The test procedure for passenger cars and other vehicles using the present brake analyzer comprises a carefully designed series of simple, discrete steps, which can be easily followed by an operator through a complete test sequence in less than one minute per pair of wheels. The values given below, by way of example, are for passenger care and obviously would be higher for large vehicles such as trucks, buses, etc.. Basically, the sequence for each pair of wheels includes:

1. An initial recordation of rolling resistance with brakes released;
2. A gradual application of the brakes to 50 to 70 pounds brake effort above rolling resistance held for one to two seconds and released gradually;
3. A rapid application of the brakes to 50 to 70 pounds brake effort above rolling resistance followed by a quick release; and
4. A normal application of the brakes to an appropriate high level effort (depending on vehicle weight) held for five to six seconds and released normally. The high level effort, referred to above, is one wherein the retarding force between the wheel surface and roadway is 0.3 to 0.5 of the vehicle weight at the axle. For example, considering a four-wheeled vehicle weighing 4000 pounds, the weight on each wheel would be roughly 1000 pounds. Therefore, the high level retarding force for such weight vehicle would range from about 300 to 500 pounds at the road contact surface of each tire.

The results attained with the use of the instant sequence of test steps are sufficient to diagnose nearly all brake problems and have been found to constitute satisfactory working guidelines for operators to write accurate job and pricing estimates.

BRAKE EVALUATION STANDARDS

Comparison of the test results obtained is made against a set of realistic standard values graphically represented by the chart shown in FIG. 7. These standard values were determined through a careful program of testing the behavior of various vehicles equipped with brakes having introduced malfunctions, repairing the malfuncions, and again testing the behavior of the vehicles with corrected brake systems. The standard values selected enable the behavior of the brakes of each vehicle tested to be classified as satisfactory, potentially hazardous, or hazardous. Evaluation of the test results is relatively simple and will identify nearly all conceivable brake malfunctions. In most cases an exact cause of the malfunction can be identified by a specific symptom on the brake analyzer and in all cases the cause of the malfunction can be categorized as between mechanical, hydraulic, or frictional or two or more of these factors.

Referring now to FIG. 7, the areas covered by crisscross-hatched lines are based on values indicating that the condition of the brakes is HAZARDOUS; the stippled areas are based on values indicating condition of the brakes as POTENTIALLY HAZARDOUS; and the remaining area within the stippled regions is based on values indicating the brakes are SATISFACTORY. The brake imbalance is plotted in percent values at the top of the chart on the abscissa, against the retarding force of the strongest brake on the ordinate, plotted in 1b. values at the left side of the chart. Thus, the slanting lines, with apex at zero on the abscissa, represent the percent imbalance of the retarding force including rolling resistance. It should be apparent from the chart that any imbalance in excess of 30 percent of the retarding force is considered hazardous. Likewise, any imbalance over 70 pounds is hazardous. Furthermore, imbalance of 25 percent of the retarding force are considered to be potentially hazardous. As marked at point T on the chart, it was repeatedly noted in carrying out the standards determination tests that if a 10 pound force was recorded in one brake before the opposite brake started to engage, this lag in brake engagement gave rise to unsatisfactory braking characteristics of the test vehicle during some on-road circumstances.

TESTING PROCEDURE - MANUAL BRAKE CONTROL

The results attained when the previously outlined procedure is carried out will be considered in conjunction with FIG. 8. Prior to any consideration of FIG. 8, however, it is important to note the specific purposes for each discrete step of the test procedure.

The first step of the procedure is to record the rolling resistance of the wheels with brakes released. This is necessary in order to establish the value of the resistance to rotation of the wheels with no brake engagement in order to provide a "base" for the charted readings. In addition, this step is useful in detecting a brake that is adjusted too tightly. When both brakes are properly adjusted, that is, no "drag" when released, the rolling resistance imbalance will generally average 5 pounds higher on the left side due to the weight of the driver. This can be compensated for by proper calibration. A dragging brake, causing imbalance noticeably in excess of the above limit, will also result in a substantially higher temperature in that brake, and a lower than normal friction coefficient as the brake is applied.

The second step of the test procedure is to apply the brakes gradually to a moderate magnitude of 50 to 70 pounds brake effort above the rolling resistance, hold this level of effort for one or two seconds, and then release the brakes gradually. This step combines the tests of brake shoe engagement-lag, prehydraulic and brake shoe seating capability, and a brake release test.

The sensitivity of the present system is sufficient to almost instantaneously display the retarding force of a brake. When one brake shoe contacts the drum noticeably before the shoe of the opposite brake, a momentary imbalance exists which may cause a dangerous dive tendency when cold brakes are rapidly applied at highway speeds, or even at lower speeds. The brake is observed during the time of maximum brake effort of step two for the pre-hydraulic and shoe seating test. The prime purpose of the test is to determine whether the shoes are seating properly and the brakes are in balance within satisfactory tolerances. Also, it prepares the operator for the amount of pedal pressure that will be required in the particular vehicle for the rapid brake application performed later. A frozen wheel cylinder or distorted or cocked brake shoe would cause undue brake imbalance in this step and thus be detected. A noticeably imbalanced brake release, although not a common fault, would also be detected during this step of the test and would be indicative of heavy binding or hangup of the brake shoe, possibly due to a broken or weak brake release spring, a sticking wheel cylinder piston, etc.

The third step of the test procedure comprises a rapid application of the brakes of 50 to 70 pounds above rolling resistance, followed by a quick release. This test evaluates the response and the other functioning of the actuating system and is basically a test to determine if there is a restriction to fluid flow in the system. In the event an imbalance does exist, an undue restriction is implied, which may be caused by a kinked hose, a pinched tube, or some other physical impairment of the flow path of the brake actuating fluid.

The fourth and last step of the test procedure comprises a normal application of the brakes to an appropriate high level effort maintained for 5 to 6 seconds, followed by a normal release. This step of the test includes a test of the brake effort at comfort level application, brake effort at high level application, and constant imbalance, fade, and excursion at high level brake effort.

Comfort level is an approximation of the level of brake effort used during a normal traffic stop and is defined as a brake effort equal to 60 percent of high effort level. Measurement of this effort has value in diagnosing the cause of specific customer complaints, since this level of brake effort is used most frequently by the driver. A brake effort imbalance in excess of the tolerance value, when the high level effect is normal, usually indicates abnormal presence of dry contaminating matter in the brake assembly, such as dust, worn off particles of the drum or brake lining, etc..

The test of high level brake effort and lapsed time of application are values that will produce friction surface temperatures approximating those experienced in decelerating from 60 MPH. While the friction coefficient of all brake linings will vary with temperature, abnormal friction surfaces will be detected in one of the three high level rests discussed below.

A maximum constant imbalance is a measure of the basic imbalance existing between the brakes. Continuous imbalance here is due to a difference in brake drum surface or brake lining. For example, the brake drums may be heavily scored or have hard spots, differences in the quality of the linings on different wheels may exist, or one brake may have reversed primary and secondary shoes.

The equal fade test at high effort is basically a test of the rate of fade. A fade of over 20 percent during the 5 or 6 second duration of the test is considered to be hazardous and indicates a thin brake lining with poor frictional characteristics.

The test of brake excursion is an evaluation of the pattern of the brake effort balance curve during the friction surface temperature rise which results from high brake effort. The patterns may assume three generally different characteristic forms, all of which are indicative of liquid contamination. Thus, there may be a substantial increase in either or both brake efforts in excess of the original value with the same pedal pressure, or other actuating force; an increase in either or both brake efforts above the original value followed by a decrease in effort; or a fade in one brake effort substantially greater than the fade of the opposite brake.

MANUAL EVALUATION OF RECORDED DATA

Referring now to FIGS. 8 and 9, it will be apparent how the recorded results of the test sequence will appear on the strip charts 62, 63, 64 and 65 whereby they may be analyzed. In FIG. 8 the chart S is shown as moving downwardly at a constant rate so that the results of the actual test sequence start at the bottom of the figure. The solid lines of FIG. 8 represent an example of the pedal pressure, or other actuating force, and brake effort which would be exhibited by a perfect pair of brakes with force applied in accordance with the timing in seconds indicated at the right end of the chart and with "robot" like precision. The dotted line portions X would indicate probable "over-effort" on the part of the operator on the hydraulic restriction test, and the dotted lines Y would indicate excess application time of the brakes at high effort. The cross-hatched areas adjacent to the solid lines, and on either side of the zero imbalance line are indications of satisfactory deviations from the perfect standard. The stippled areas indicate potentially hazardous deviations; and the criss-crossed hatched areas indicate hazardous deviations. The shaded areas are oriented on the chart in the direction the deviation from the perfect performance will appear.

Considering now the left brake effort chart 62 of FIG. 8, it should be apparent that the beginning of the solid line is off-set to the left from zero by the amount of pounds of the normal rolling resistance, as it appears between point $a$ and point $b$. This imbalance from side to side, as displayed in chart 63, of more than 5 to 10 pounds is considered to be hazardous.

A lag in shoe engagement time for the left brake will appear both on the left chart 62 and as an excursion to the left side of the zero balance line in chart 63. As shown, the pre-hydraulic test is evaluated from the results recorded between points $c$ and $d$. Again, the unsatisfactory performance of either brake, as well as an excessive imbalance between them will be visible on the chart. The brake release check, as exhibited at point 3 on the chart then completes the second step of the test sequence.

It should likewise be apparent that the third step of the sequence is completed between points $f$ and $g$ on the chart as it comprises a recording of the hydraulic restriction test.

The area between $h$ and $i$ on the chart comprises the fourth step of the test sequence. As shown, the comfort level brake effort is measured at point $i$, while the high level effort is exhibited between points $j$ and $k$.

For purposes of simplicity, FIG. 9 has been included to show the typical patterns at high brake effort which would occur in the presence of high level fade or excursion. Although in FIG. 8 the brakes are shown to exhibit no fade or excursion between points $j$ and $k$, it should be realized that the outline of the recorded curve between these points might assume one of the patters illustrated in FIG. 9. Thus, at the bottom of FIG. 9 a pattern showing equal fade of both left and right brakes at constant pedal pressure is shown. At the top of FIG. 9, the possible excursion patterns are displayed. Thus, curve A shows fade in one brake effort; curve B shows a substantial increase in brake effort in excess of the original value; and curve C shows an increase in brake effort followed by a decrease in effort.

Figure 10:
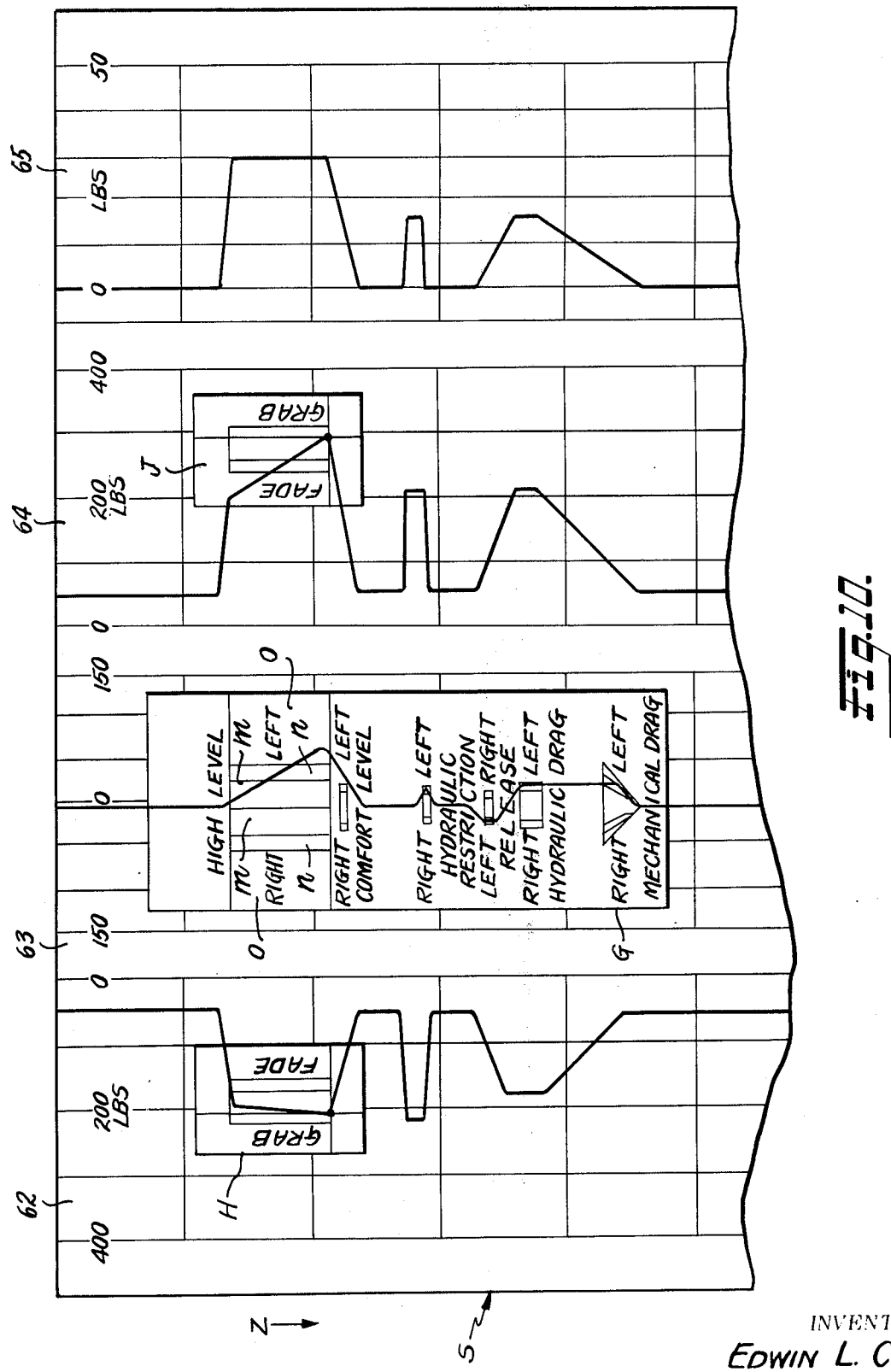
FIG. 10 is an enlarged fragmentary plan view of the portion of the recording chart shown in FIG. 8, with masks superimposed to aid in evaluating the condition of the vehicle brakes.

It will be apparent that deviation of the recorded values into any of the stippled areas as POTENTIALLY HAZARDOUS, or into the criss-cross-hatched areas as HAZARDOUS, may easily be identified by the operator as a further aid to diagnosis of malfunctions; however, masks or colored transparent overlays can be used to conclusively evaluate and identify such deviations. Referring now to FIG. 10, an overlay G is shown on the imbalance strip 63 where it displays vertical tolerance bands $m$, $n$ and $o$ marking the satisfactory, potentially hazardous and hazardous levels, respectively. Additional similar bands are provided for checking the mechanical drag, fluid restriction, release, etc.. The length of the bands $m$, $n$ and $o$ of the mask G in the direction of the tape movement defines the rate of fade since it is designed in accordance with the known chart speed. Similar masks H and J can be used for the evaluation fade and/or other factors on the individual left and right brake effort charts 62 and 64, respectively, along with a set of instructions which key the operator to the specific cause of any malfunction detected. Instead of using overlays, the chart with recorded values can be placed over illuminated grids to permit easy comparison of recordings with standard test values.

The brake recording analysis procedure outlined above has been simplified somewhat since it deals primarily with hydraulic brake systems with lined brake shoes. However, the test procedure set forth can easily be adapted within the scope of the invention to pneumatic, vacuum, electric or mechanical actuated brakes employing wheel brakes of any design and using the principle of friction to absorb energy during braking.

Also in conducting certain tests, for example, factory tests on new vehicles, a modified method can be used whereby adequate data can be obtained for brake diagnostic purposes by measuring and recording the value of the degree of brake effort for only one wheel of a pair of wheels, and recording the difference in values of the brake effort of both wheels of the pair.

The same test procedure may be followed wherein a special purpose computer is used to analyze the results. In that case, it should be apparent that transient signals to which the recorder pen may not respond will be more easily evaluated by the computer, just as the recorder itself is much more sensitive to transient values than the perception of an operator attempting to carry out the test sequences and manually observe and record the necessary values from gauges. Here again, the disclosure of apparatus embodying recorder pens is exemplary and other suitable recording means can be used employing "hot styluses" or "light beams."

AUTOMATICALLY CONTROLLED BRAKE ANALYZER SYSTEM

A computer controlled or automatic brake analyzer system for testing vehicle brakes is described in more detail in FIGS. 11, 12 and 13. Referring now to FIG. 11, a four-wheeled vehicle is illustrated with the front wheels 11 and 12 cradled between the rollers 14 through 17 of a motoring dynamometer of the type described in reference to the preceding figures. The drive motors 21 and 22 are directly connected to the drive rolls 17 and 15 as shown. The motors are controlled from a motor control unit activated by computer 299 through lines 21$c$, $d$ and $e$ to provide a high torque, low torque and to stop. A pair of pneumatic lifts 300$a$ and 300$b$ are positioned between the rolls as illustrated to lift the wheels 11 and 12 off the rollers 14 through 17 in their raised position and thereby permit the test vehicle to be readily driven on and off of the rollers. Once the appropriate wheels are positioned between the rollers 14 through 17, the pneumatic lifts are operated by means of appropriate electronic control units such as 302$a$. The electronic control units operate conventional pneumatic lift units (303 in FIG. 11) to lower or raise the lifts in response to appropriate control signals on lines 304 and 305, respectively from the computer 299. The lift control units 302a send back a lift lowered signal via line 306 to the computer 299 indicative of the fact that the lifts are in a lowered position so that the testing sequence can begin.

A pair of tachometer generators 307a and 307b are coupled to the driven rollers 16 and 14 for providing d.c. signals to the computer via lines 308a and 308b having an amplitude proportional to the speed of the respective driven roller. Only generator 307a is illustrated in FIG. 11. A pair of brake effort signal generators in the form of transducers 38a and 39a are connected to the motors 22 and 21 as illustrated, for example, in FIG. 6 to provide output signals representative of the torque applied by the drive motors which in turn is representative of the retarding force between the respective wheels and the drive rollers 15 and 17. Only one brake effort transducer 39a and one tachometer generator 307a are shown in FIG. 11 for purposes of illustration. The test vehicle illustrated in FIG. 11 is provided with conventional brake drums and shoes with the brake shoes 320 being forced outwardly against the drums 321 by a manually controlled force responsive brake actuator including a pair of conventional pistons 322 carried within a wheel cylinder 323. Brake fluid is forced through brake lines 324 to operate the wheel cylinder pistons 322 and apply the brakes by means of a conventional master brake cylinder 325 including a piston 326 operated by brake lever 327 in response to a force applied to a brake pedal 328. The brake lever 327 is biased by a spring 330 in a position to maintain the brake pedal in its uppermost position to relieve the pressure in the brake lines and permit the brake shoes 320 to be withdrawn from the brake drum by conventional springs, not shown.

A brake pedal actuator control unit 332 for applying a programmed force to the brake pedal 328 is described more particularly in the copending application Ser. No. 382,385 filed July 25, 1973, and assigned to the assignee of this application. The unit 332 includes a frame 333 which comprises a pair of L-shaped legs which rest on the floor 334 of the vehicle under test. A foot treadle 335 is pivotally mounted at the lower end of the frame 333. An air piston 336 is mounted within a pneumatic cylinder and forces a brake pedal bracket 337 against the brake pedal 328 in accordance with the pressure of the fluid on the piston 336. A pedal force sensor (transducer) 338 is disposed between the bracket 337 and the brake pedal 328 to provide an analog signal on line 340 which is proportional to the force applied to the brake pedal. A pedal-to-floor distance sensing unit 342 provides an output signal on line 343 when the pedal position has became less than the minimum acceptable pedal-to-floor distance.

The foot treadle 335 is biased outwardly away from the frame 333 by suitable springs (not shown) with a force in excess of the maximum pedal force required during the testing sequence. A foot pressure sensor in the form of a micro-switch 345 is actuated when the force exerted by the operator's feet on the treadle 335 exceeds the maximum anticipated pedal force, causing the treadle to move downwardly a predetermined distance against the spring bias. The foot press sensor 345 when actuated produces a foot press sensor signal on line 346 indicating that the operator is placing sufficient force against the treadle 335 to prevent movement of the brake pedal actuator control unit while the brake pedal is operated at maximum force by the piston 336. Fluid under pressure is applied to the piston 336 for operating the brake pedal via pneumatic line 350 and pedal actuator transducer 351. A pedal position transducer (not shown) is suitably secured to the hydraulic cylinder for generating a signal on line 348 which is proportional to the position of the piston 336, for providing information concerning the brake pedal travel during the testing sequence as will be discussed in more detail.

The brake pedal control unit 332 is manually placed within the test vehicle at the beginning of the testing sequence. The operator guides the brake pedal bracket 337 until it engages the brake pedal 328 as shown in FIG. 11. An additional micro-switch may be positioned on the bracket 337 to be actuated when the bracket engages the brake pedal thereby providing a signal indicating that the control unit is in place. Rather than remove the brake actuator control unit 332 from the vehicle during the time that the vehicle is moved to change the pair of wheels that are positioned on the dynamometer rollers 14 through 17, the control unit 332 may be left in the vehicle and the brakes controlled by the computer. To provide this type of control, a treadle sensor signal proportional to the force applied by the operator to the treadle may be produced by a suitable transducer and fed back to the computer via line 354. The computer responds to the treadle sensor signal on line 354 to actuate the pedal actuator transducer 351 and apply fluid pressure to the piston 336 which is proportional to the pressure of the operator's feet on the treadle. Such a transducer is described more particularly in copending application Ser. No. 382,385. The operator is thus provided with reliable control of the braking action of the vehicle while it is being driven to place the rear wheels 11a and 12a on the dynamometer rollers.

Referring now to FIG. 13, the computer or automatic control system 299 is actuated by a manual control unit 353 to selectively commence the test sequence for the front or the rear wheels and to stop, via signals on lines 355, 356 and 357, respectively. The computer 299 receives input signals from the lift controls 302a and b indicating that the lifts are in the lowered position and the test vehicle wheels are properly positioned for the test sequence. The computer also receives input signals from the brake effort transducers 38a and 39a, tachometer generators 307a and 307b, foot press sensor 345, pedal-to-floor distance sensor 342, and pedal force sensor 338. The computer 299 controls the induction motors 21 and 22 to provide high or low torque (y or Δ connection) or to stop, via signals on 21c, d and e, respectively. The pedal actuator transducer 351 is controlled via signals on line 352 to apply sufficient force to the vehicle's brake pedal to provide a predetermined brake effort from the strongest brake or a predetermined pedal force as will be discussed in more detail.

The computer may provide output signals on line 361 for recording by a conventional recorder 362, for example, of the strip chart type (recorder 60 in FIG. 5) or magnetic type. The recorder 362 may also be in the form of a printer which provides a printed sheet indicating the condition of the vehicle brakes, with or without recommendations as to suggested corrective work needed, if any. The computer may also apply output signals on line 363 to a visual display arrangement 364 such as a group of lights to provide a recorded indication of appropriate output signals indicating that certain braking characteristics are satisfactory, marginal or unacceptable. The visual display arrangement provides a recordation of such output signals for a time duration in excess of the testing period so that the operator may review the braking performance after the testing sequence has been performed on front, rear or both sets of wheels of the test vehicle.

To determine whether or not the braking performance of the vehicle under test is satisfactory, marginal or unacceptable, pre-established test limits are fed into the computer on line 365 from a vehicle test limits storage arrangement 366, shown in more detail in FIG. 17.

The computer 299 operates on digital signals and thus includes conventional analog-to-digital converters for converting analog input signals into corresponding digital signals. Analog-to-digital converters for providing digital right and left brake effort signals and pedal force signals are illustrated in FIG. 14. Analog signals from the right and left brake effort transducers 38a and 39a are amplified by amplifiers 370a and 370b and converted to binary signals by analog-to-digital converters 371a and 371b. The binary signals representing the right and left brake efforts are supplied on lines 372a and 372b to logic and storage elements within the computer as will be described in more detail. The lines such as 372a and 372b for carrying digital information in the form of multi-bit words between the various computer components illustrated in the drawings are composite lines, that is, one line is used for each bit or N lines for an Nth bit word to transfer the data in parallel form. Thus, each digital data transmission line as shown in the drawings represents a composite of Nth lines.

A subtractor 374 subtracts the digital signals representing the right and left brake efforts to produce a braking effort imbalance signal on line 375. Analog signals representing the separate effort signals are also supplied to certain computing components via lines 373a and 373b. The right and left brake effort signals on lines 372a, 372b, 373a and 373b represent the gross braking effort or the total retarding force between the left or right wheel 11 or 12 and the respective drive roller 15 or 17. During the time that the brakes are not being applied to the vehicle, the signals on lines 372a, 372b, 373a and 373b represent rolling resistance of the respective wheels and when the brakes are being applied, these signals represent the sum of the rolling resistance and the braking effort contributed by the brake drum and shoe of the respective wheel.

The brake effort imbalance signal on line 375 represents the gross imbalance in the retarding force between the wheels 11 and 12 and the respective drive rollers and thus includes the rolling resistance imbalance of the two wheels. The subtractor 374 also applies an output signal on line 376 having a logic sign (high or low) dependent upon which brake effort signal is the largest. The logic sign of the signal on line 376 thus identifies the strongest (and weakest) brake. For example, a true logic signal (high level) on line 376 may be utilized to indicate that the highest brake effort is supplied by the right brake and a false logic (low level) signal may be used to indicate that the left brake is strongest.

A gate 379 receives the highest brake effort identification signal (true or false) and switches the highest brake effort signal (right or left) to an output line 378. The analog signal from the pedal force sensor 338 is also amplified by amplifier 380 and converted via an analog-to-digital converter 381 to a binary signal representative of the force applied to the brake pedal 328 (FIG. 11) by the pedal actuator 332 (FIG. 11).

Figure 16:
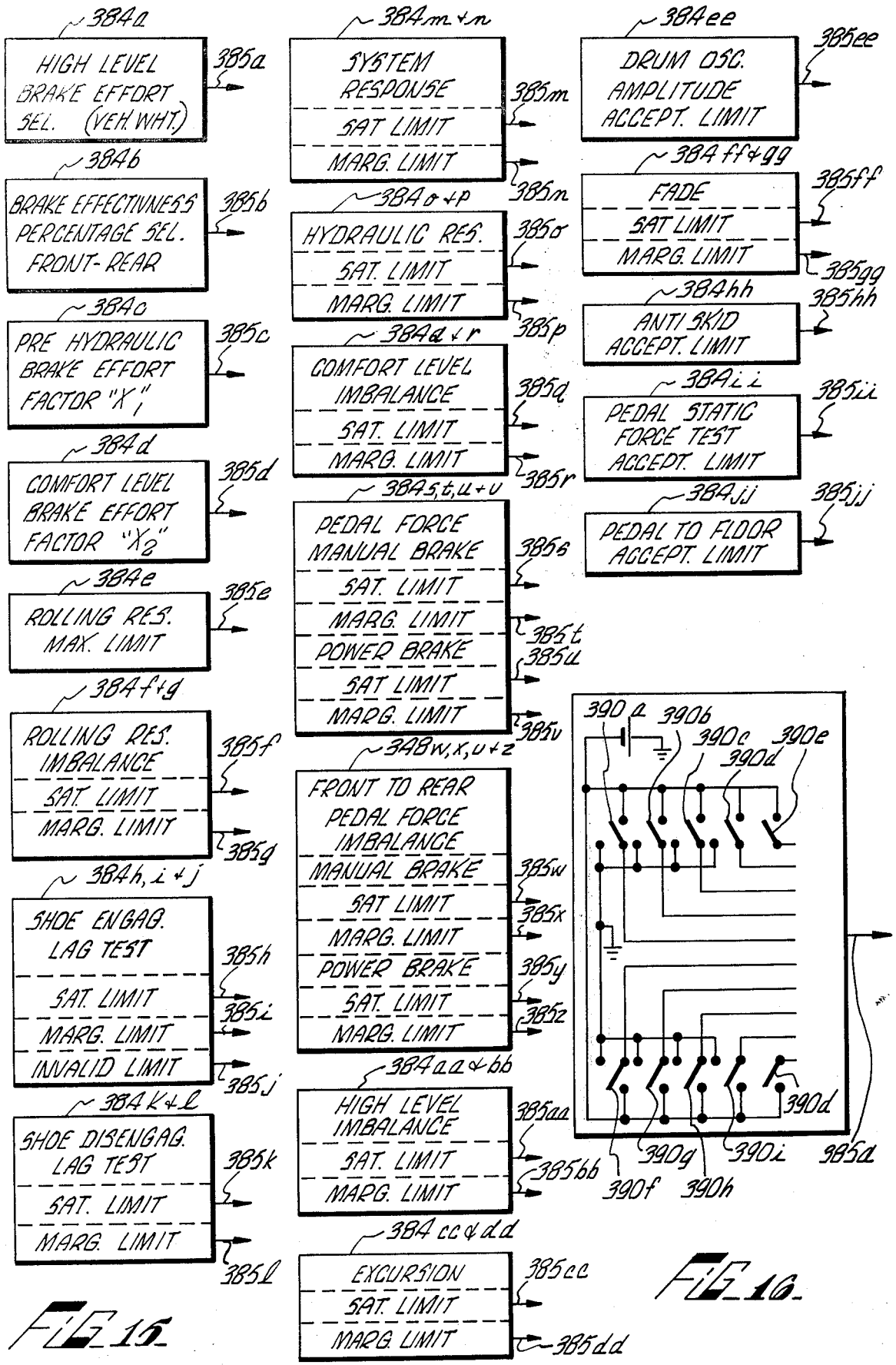
FIG. 16 is a schematic circuit diagram of one of the storage elements of FIG. 15.

Referring now to FIG. 15, there are illustrated vehicle test limits storage elements 384a through 384jj for supplying digital signals representing satisfactory, marginal and unacceptable limits of brake performance of the vehicle under test and the brake effort levels at which the tests are to be conducted. The storage elements of FIG. 15 provide a total of thirty five output signals on lines 385a through 385jj to the computer. The circuit associated with each of the output lines 385a through 385jj may be of the type shown in FIG. 16 in which an Nth bit word is selected by properly positioning Nth movable contacts of single pole, double throw switches 390a–390h to provide a true signal (high level) or a false signal (low level) logic signal. Thus the output signal for any line 385a–385jj may represent $2^{10}$ or a total of 1024 discrete values.

The storage element 384a of FIG. 15 determine the total brake effort required (front plus rear wheel brakes) for the high level brake effort tests for the particular vehicle. The high level brake effort signal on line 385a may be selected from as many as 1024 discrete values but as a practical matter may be limited to 5 values representing categories of weight of the vehicles being tested. Such categories may, for example, represent (1) small cars, (2) intermediate compacts, compact cars, (3) heavy compact cars, (4) standard cars, and (5) heavy cars. The storage element 384b provides an output signal on line 385b which represents the brake effectiveness percentage between the front and rear wheels of the vehicle under test. For example, the storage element 384b may be set to provide a brake effectiveness of 75 percent for the front wheels and 25 percent for the rear wheels, or 60 percent for the front wheels and 40 percent for the rear wheels, etc.. A one percent variation may be utilized if desired. The storage element 384c provides an output signal representing the pre-hydraulic brake effort factor $X_1$ which is utilized by the computer to arrive at the degree of braking effort utilized to derive certain test data from the vehicle in pre-hydraulic tests as will be described in more detail. The storage element 384d provides an output signal which represents a comfort level brake effort factor $X_2$ which is utilized by the computer to derive the comfort level brake effort at which brake effort imbalance of the vehicle is measured as will be described in more detail. The remaining storage elements provide signals representing satisfactory, marginal or acceptable limits for the particular vehicle under test and the value of such signals may be varied in accordance with braking performance requirements dictated by governmental agencies, etc.. See for example FIG. 7 which illustrates automobile brake evaluation standards. As is illustrated in the figure, satisfactory, potentially, hazardous (marginal) and hazardous (fail) limits of brake effort imbalance may be correlated in terms of percentages of imbalance or fixed values of imbalance at predetermined levels of brake effort.

It should be noted that only two output signals are utilized from each of the storage elements 384stuv and 384wxyz at any one time, and the two particular output signal lines that are read by the computer will be determined by the type of brake incorporated into the test vehicles, that is, manual or power brakes.

The vehicle test limit information stored in elements 384a through 384jj may, of course, be supplied to the computer by other well known recording means such as punched cards, magnetic tape, etc..

A computer programmer is illustrated in FIG. 17 for providing the commands for a complete testing sequence for the front and rear wheels of the test vehicle. The manual control 353 initiates the testing sequence for the front wheels by an appropriate signal on line 394 and initiates the testing sequence of the rear wheels by a signal on line 395. The manual control unit stops the test program and the dynamometer motors by a signal on line 396. A signal on line 394 or 395 actuates a pre-program storage register 400 to provide a signal on line 304 to cause the lift control units to lower the lifts and cradle the front wheels between the rollers 14 through 17. The storage register 400 also provides a signal on line 352 to the pedal actuator transducer 351 to cause the brake pedal actuator 332 to lower the brake pedal bracket 337 until contact is just made with the brake pedal 328. The brakes are not applied by the signal on line 352 from the register 400.

As shown in FIG. 17, signals on line 394 and 395 from the manual control 353 are also applied to front and rear wheel test inhibitors 402a and 402b. The wheel test inhibitors also receive signals from the foot pressure sensor 345 via line 346 and from the lift control units via line 306. An appropriate signal (true or false) on all input circuits of either wheel test inhibitor will provide an output signal (i.e. true) on the respective output lines 403 and 404 or 407, 408 and 409.

Front and rear wheel lamp indicators 410 and 412 are responsive to signals on lines 403 and 407 to indicate which set of wheel brakes are undergoing tests. An output signal on line 404 or 409 initiates operation of the motor control 413 which, in turn, applies an appropriate signal on output line 21d to energize the induction dynamometer motors 21 and 22 in a low torque configuration, e.g. Y connection. The dynamometer motors rotate drive rollers 15 and 17 which, in turn, rotate the left and right wheels of the vehicle. The vehicle wheels, in turn, drive the driven rollers 14 and 16 which rotate tachometer generators 307a and 307b. Under certain abnormal conditions some slippage may occur between the tires and the drive rollers 15 and 17 which causes the driven rollers 14, 16 to rotate at a slower speed than the drive rollers 15, 17. The coefficient of friction, influenced, for example, by water between the tires and rollers is an important factor in determining slippage. Thus, the driven rollers 14 and 16 will begin to catch up to the drive rollers 15 and 17 as the surface of the tires dry off.

Each of the tachometer generators 307a and 307b produce a d.c. signal having a magnitude proportional to the rotational speed of the respective driven rollers 16, 14. The signals from the tachometer generators are supplied to one input of a pair of differential amplifiers 416 and 418. The other input of each of the differential amplifiers is connected to a reference voltage source 417. The differential amplifiers 416 and 418 are arranged to provide an appropriate output signal (high level) to a gating circuit 414 only when the output signal from the respective tachometer generator exceeds the reference voltage. An output signal from each differential amplifier is indicative of the fact that both driven rollers are within a predetermined range of the normal induction motor speed representing, for example, a vehicle speed of 45 mph.

A gating circuit 414 produces an output signal on line 420 in response to output signals from both comparators 416 and 418 and an output signal on line 404 or 409. The output signal on line 420 causes the motor control unit 413 to change the energization of the drive motors to a high torque configuration e.g. Δ connection, via a signal on line 21c. An output signal on line 420 is also supplied to a program command storage 422 to initiate time sequence test commands to the various components of the computer as will be described in more detail. For example, the program command storage provides command signals to a front to rear pedal force balance command control unit 425. The unit 425 in response to the command signal from storage 422 and a signal from the rear wheel test inhibitor via line 408 provides a signal to the pedal actuator transducer 351 to actuate the brakes in the front to rear pedal pressure balance tests to be described.

The program command storage also provides appropriate signals to command unit 427 to initiate a static pedal force and pedal to floor test. At the end of a test sequence, the program command storage supplies a signal to an end of test control unit 430 which sends a signal on line 305 to the lift control units to raise the lifts so that the vehicle may be moved. A manual pedal control unit 432 when enabled by a signal from unit 430 responds to a signal from the treadle pressure sensor on line 354, and provides a signal proportional thereto on line 352 to control the brake pedal actuator 332 in accordance with the operator's foot pressure on the treadle. This permits the vehicle to be moved without removing the actuator 332. The manual pedal control unit 432 is inhibited by a signal on either line 404 or 409 indicating that a test sequence is still under way. Fast and slow rate pedal force control units 434 and 435 apply signals to the pedal actuator transducer 351 to provide a fast or slow rate of brake application as will be described.

The functional components of the computer or automatic control system 299 for controlling the vehicle brakes and for monitoring the braking effort signals etc., will now be described in relation to individual steps of the testing sequence of Table I.

TESTING SEQUENCE

TABLE I

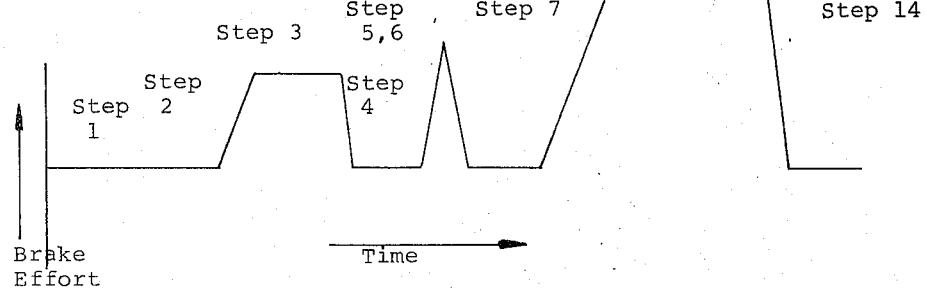

Figure 23:
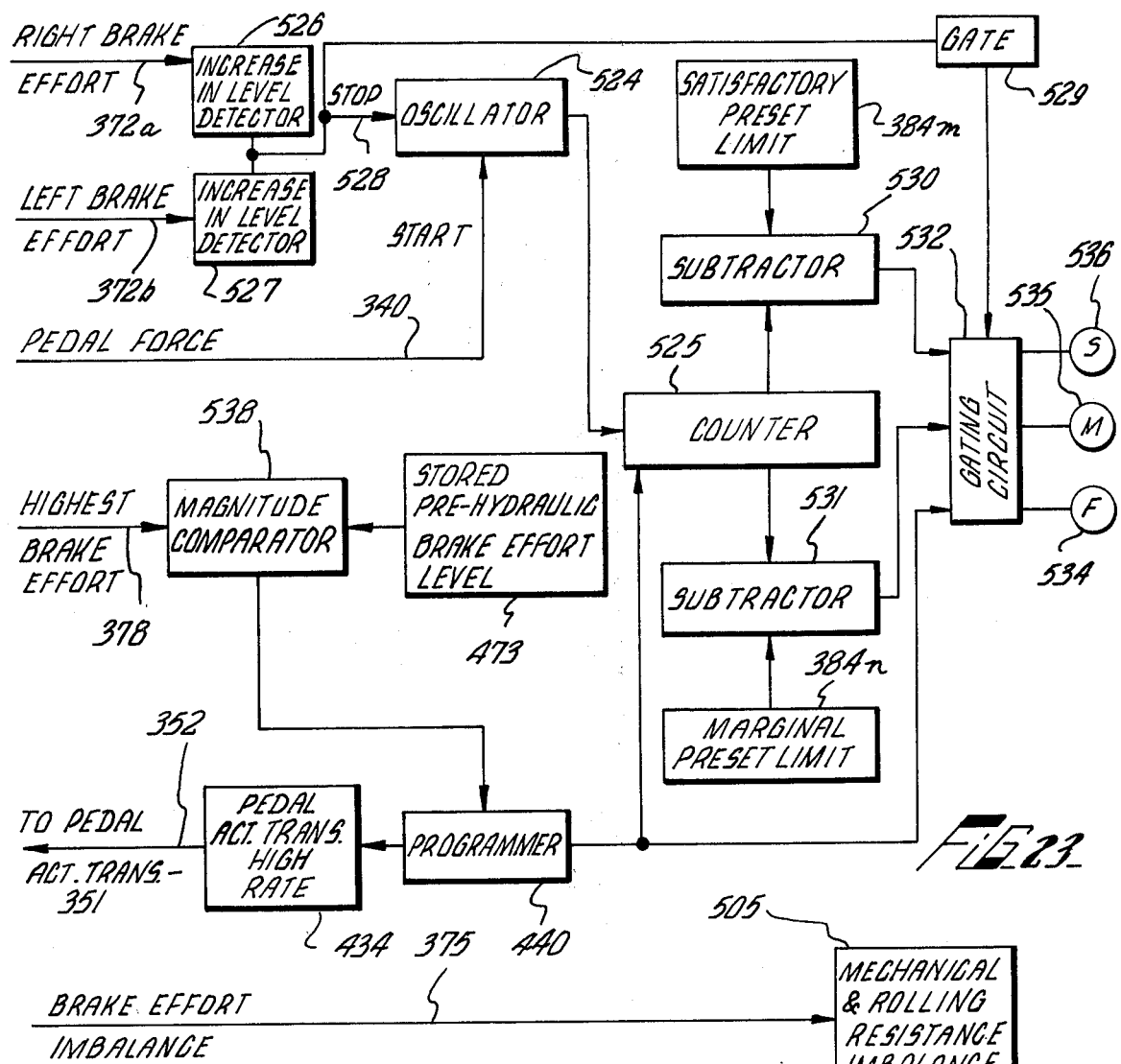
FIG. 23 is a block diagram of certain computer components for providing brake system response test data.
Figure 21:
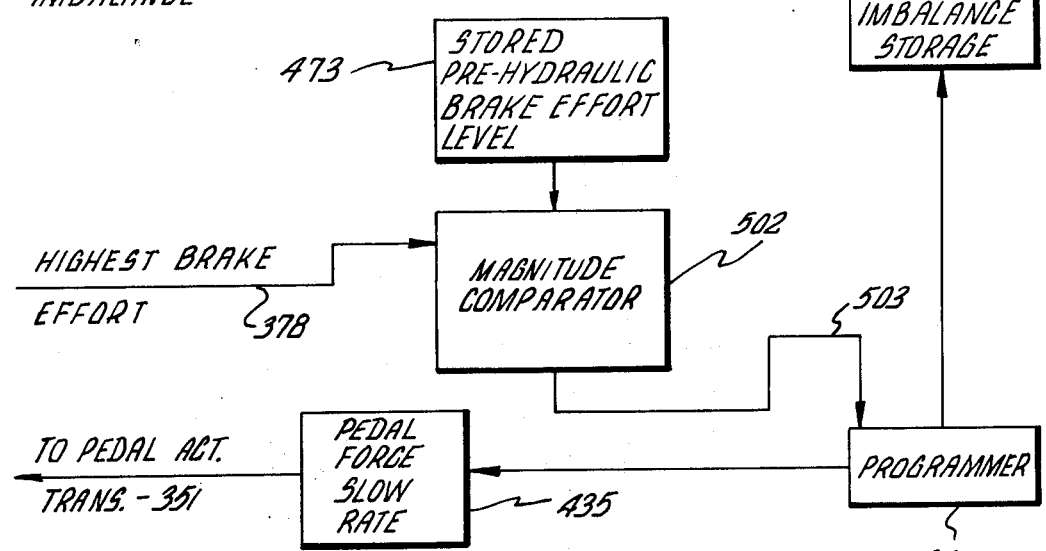
FIG. 21 is a block diagram of certain computer components for measuring and recording the mechanical and rolling resistance imbalance data.
Figure 31:
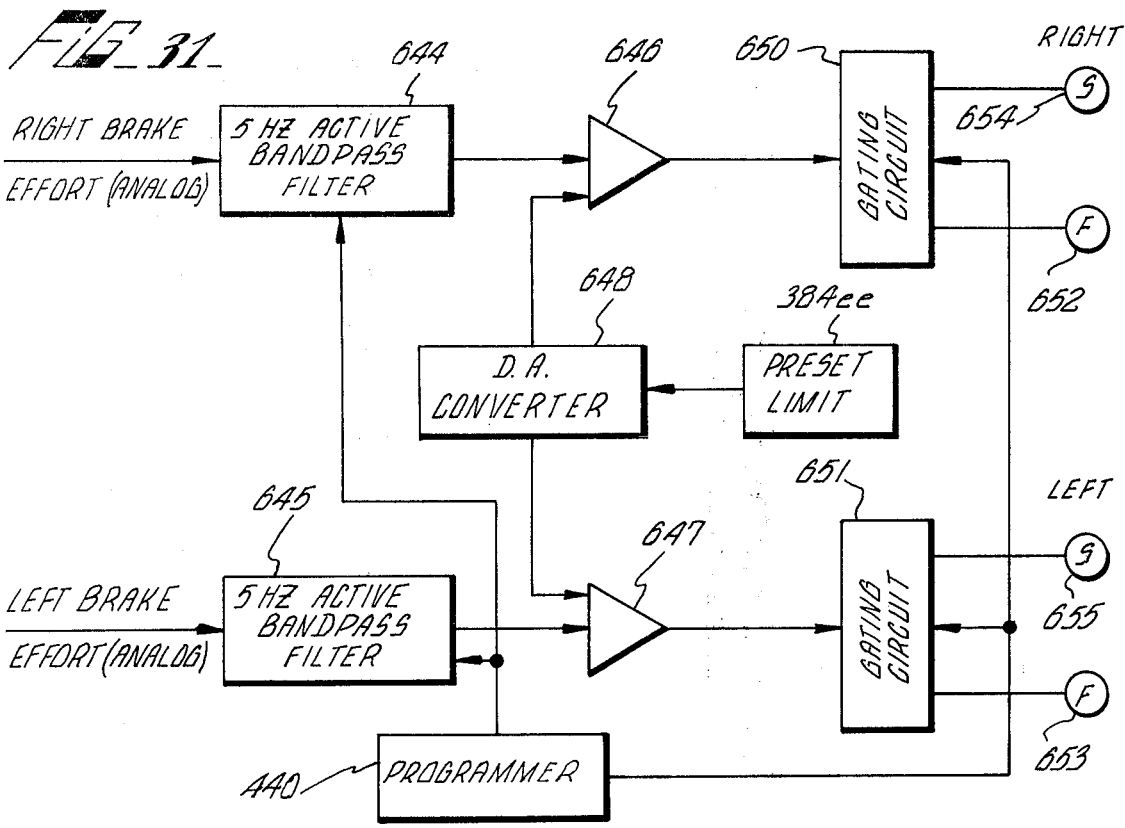
FIG. 31 is a block diagram of certain computer components for providing brake oscillation test data.
Figure 26:
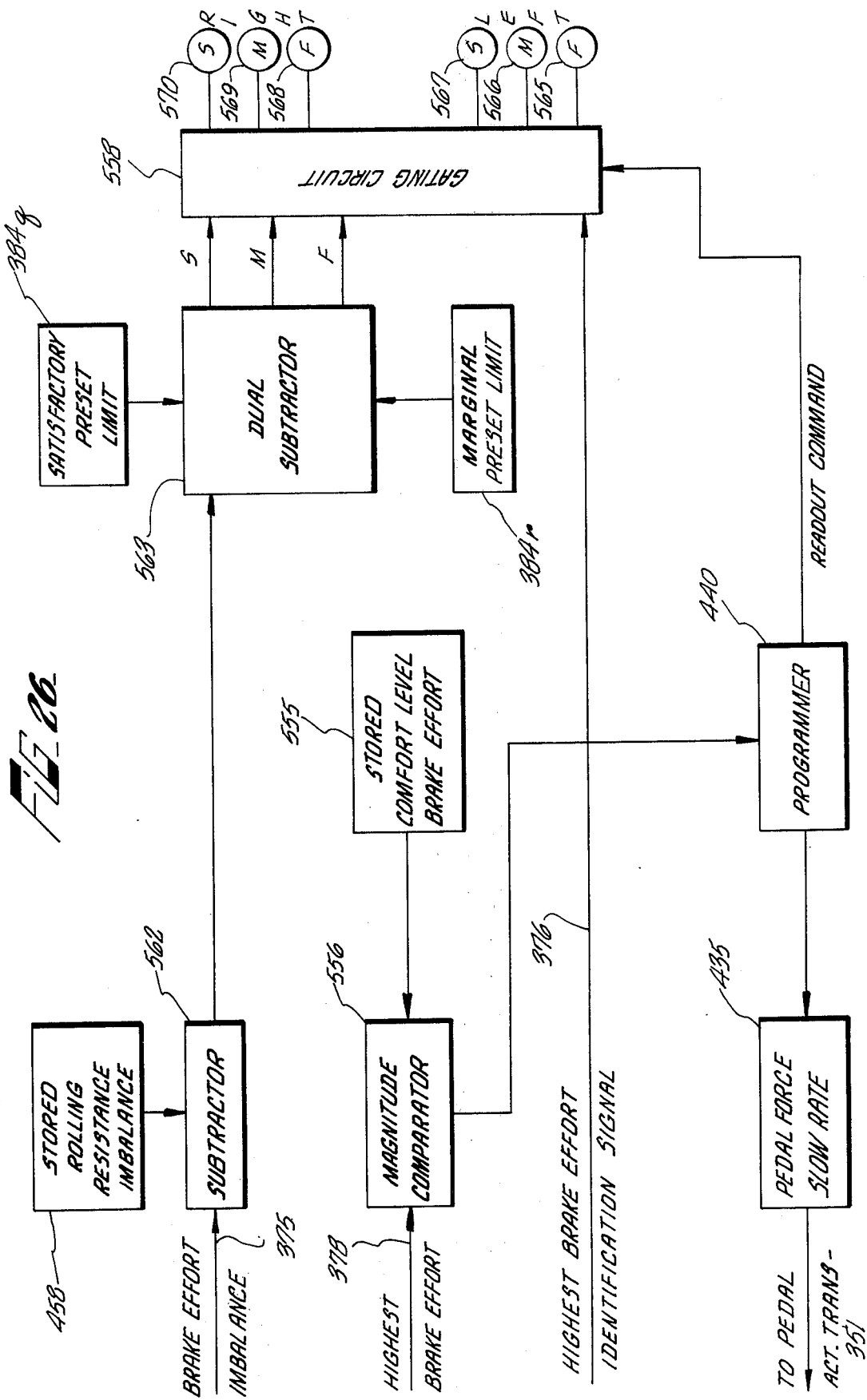
FIG. 26 is a block diagram of certain computer components for providing comfort level brake effort imbalance test data.
Figure 27:
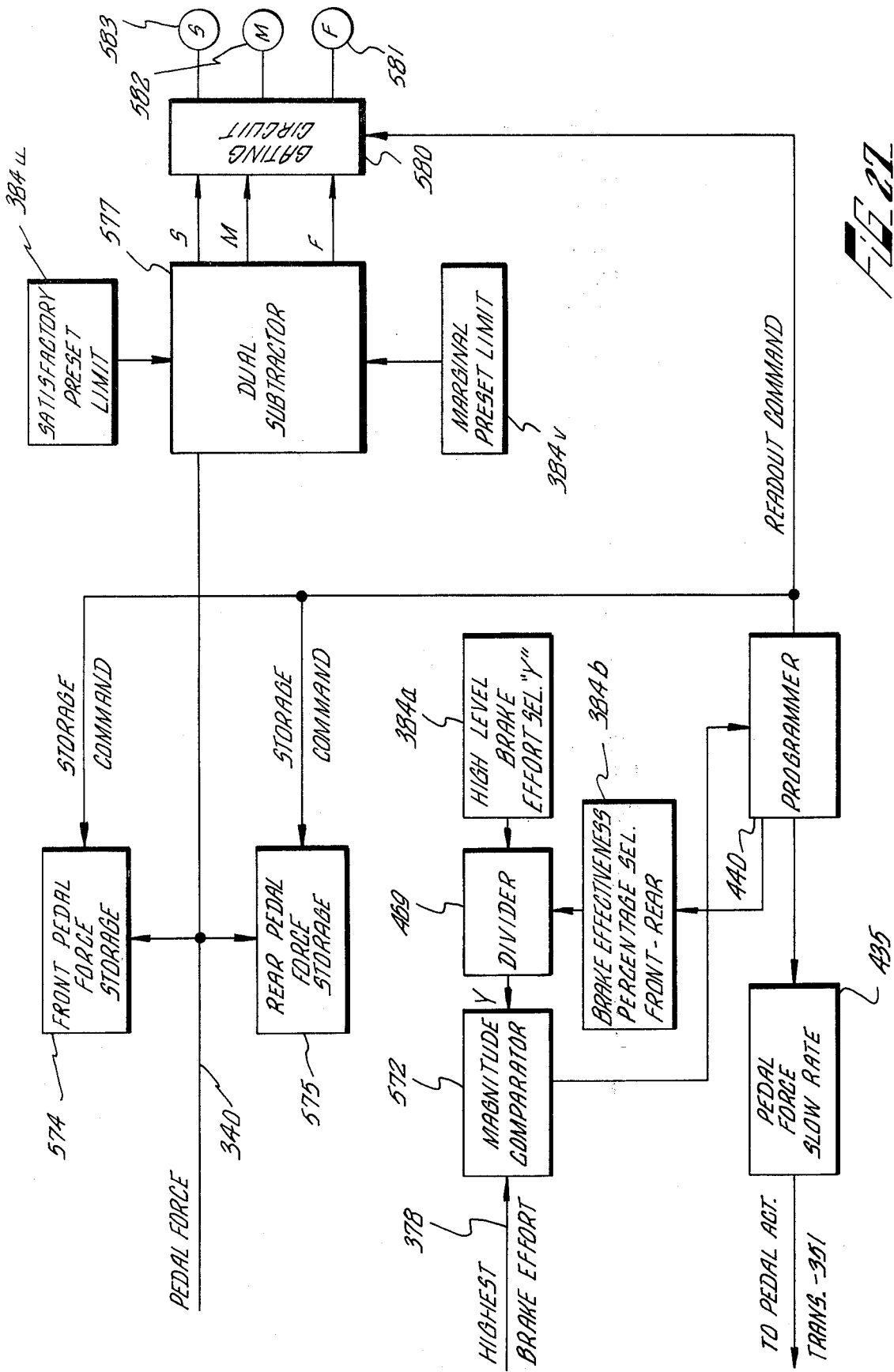
FIG. 27 is a block diagram of certain computer components for providing brake pedal force level test data.
Figure 28:
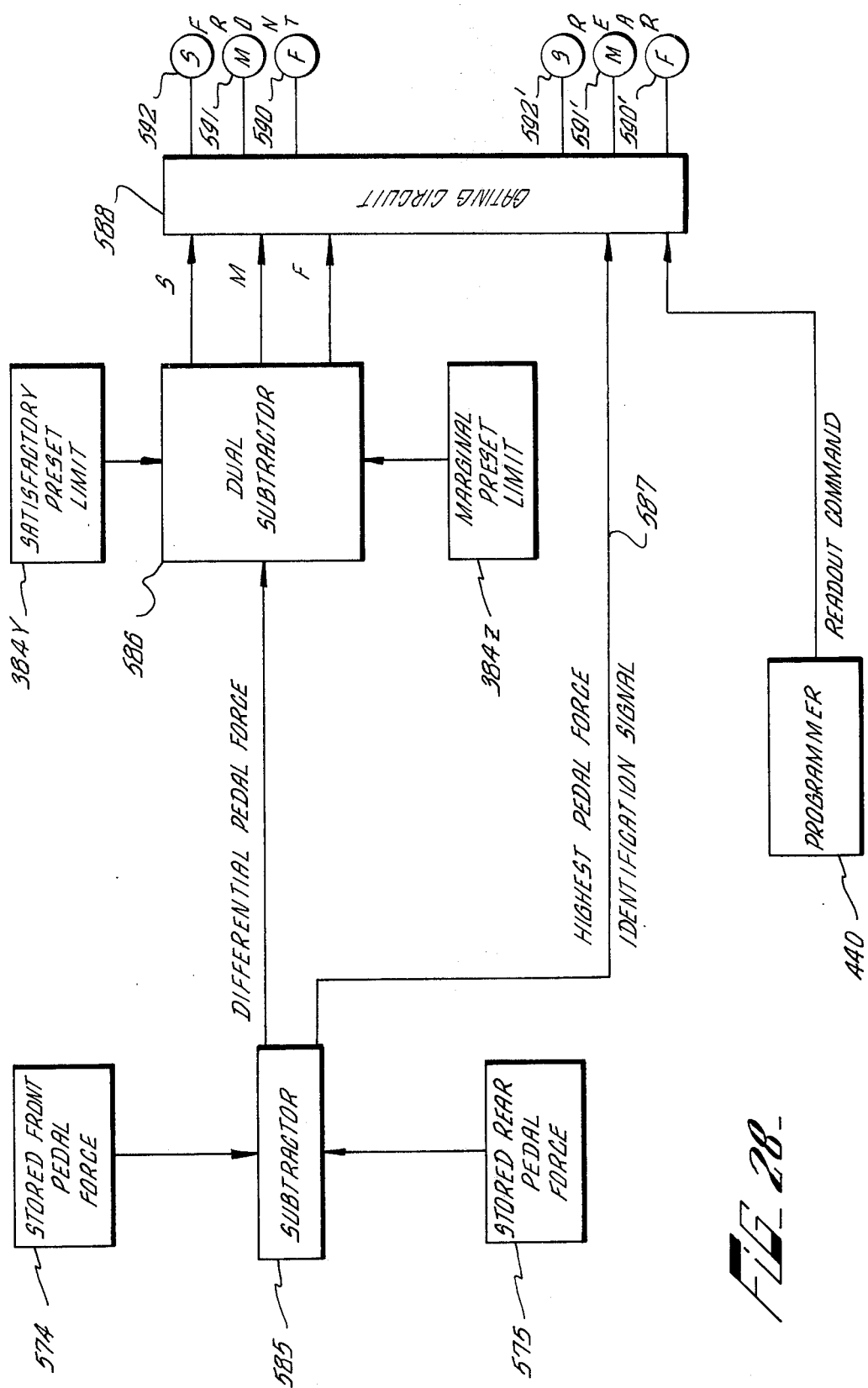
FIG. 28 is a block diagram of certain computer components for providing front to rear pedal force balance test data.
Figure 29:
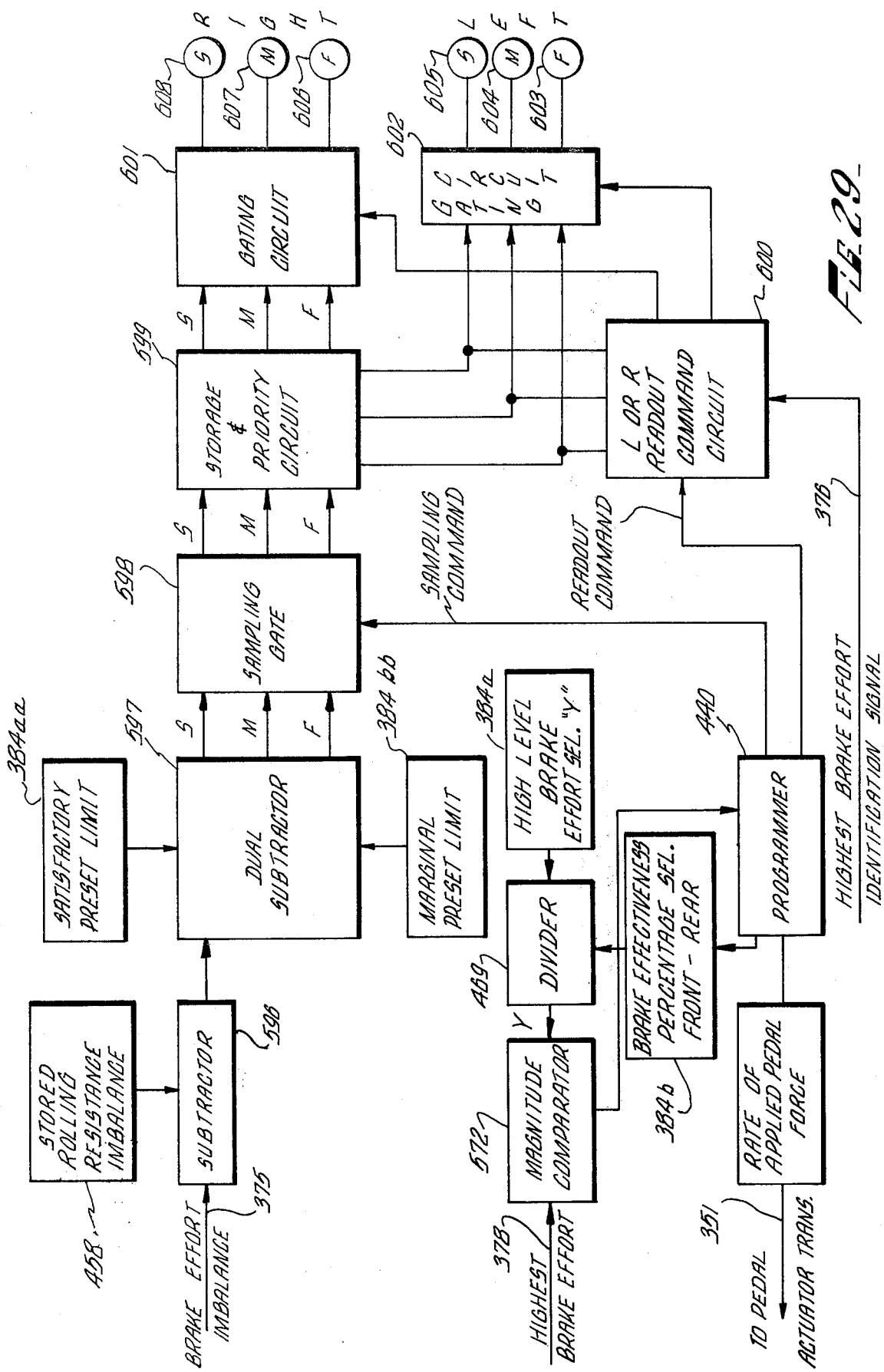
FIG. 29 is a block diagram of certain computer components for providing high level brake effort imbalance test data.
Figure 31:
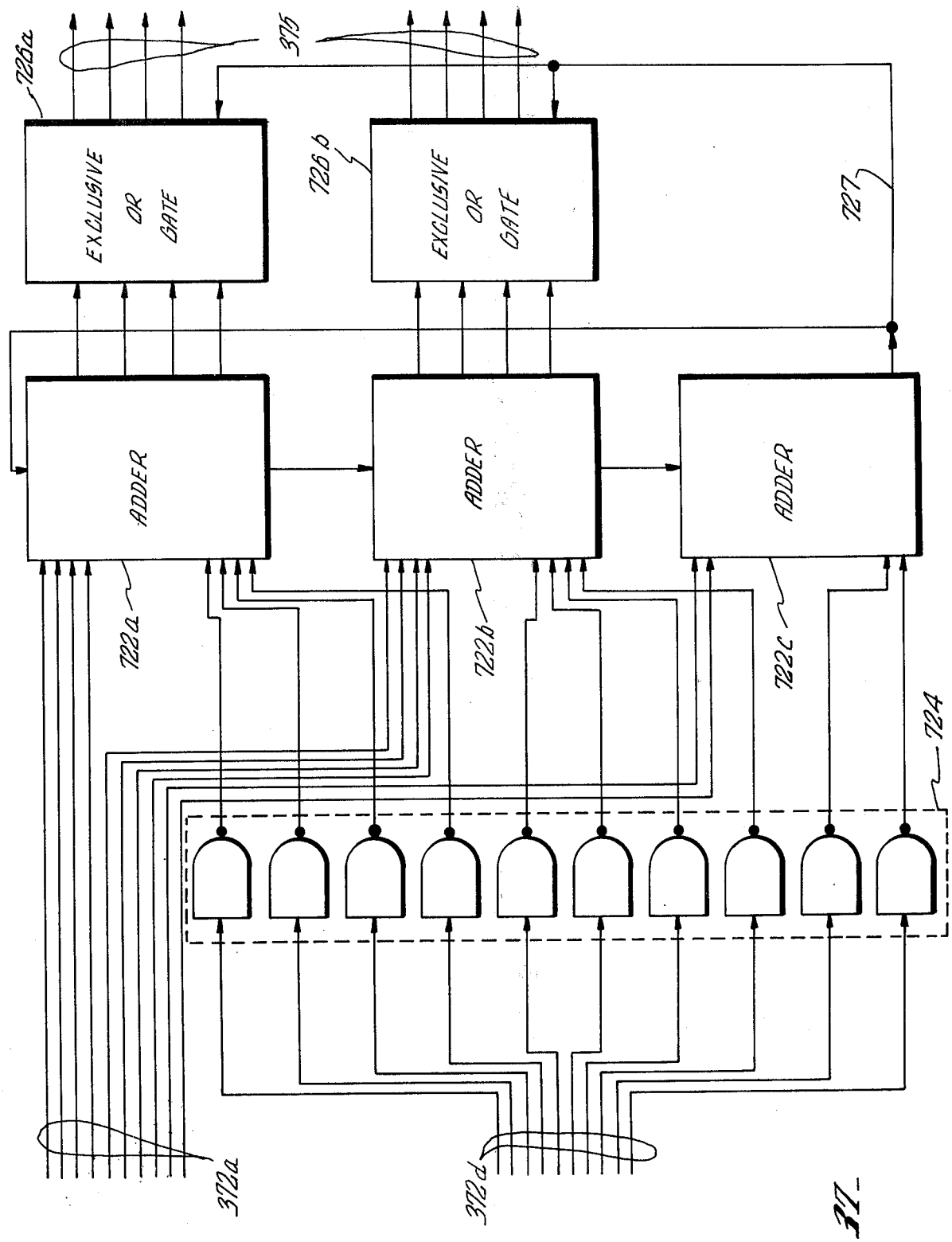

| | Nature of Test and Applicable Drawing Figure | Command to Brake Pedal Actuator Control Unit | Braking Performance Criteria Analyzed |
|---|---|---|---|
| 1. | Rolling Resistance FIG. 18 | Brakes released | 5<br>a) Highest rolling resistance of either wheel<br>b) Imbalance in rolling resistance between wheels |
| 2. | Brake engagement lag test FIG. 20 | Brake pedal force increased at slow rate until pre-hydraulic brake effort is reached by strongest brake | Net brake effort imbalance at instant of engagement of last brake to engage |
| 3. | Pre-hydraulic and shoe seating test FIG. 21 | Pre-hydraulic brake effort level maintained for short time, e.g. one second | Gross brake effort imbalance stored for use in Test 6 |
| 4. | Brake disengagement lag test FIG. 22 | Brake pedal force decreased at slow rate until brakes are released | Net brake effort imbalance at instant of disengagement of first brake to disengage |
| 5. | System response test FIG. 23 | Brake pedal force increased at fast rate until pre-hydraulic brake effort is reached by strongest brake | Time delay between application of force to brake pedal and first engagement of either brake |
| 6. | Hydraulic restriction test FIG. 24 | Same as 5 | Net brake effort imbalance at level determined by Test 3 |
| 7. | Comfort level imbalance FIG. 26 | Brake pedal force increased at slow rate until high level brake effort is reached by strongest brake and then pedal force is maintained constant for predetermined period, e.g. 6 seconds | Net brake effort imbalance at time that comfort level brake effort is reached by strongest brake |
| 8. | Pedal force level test FIG. 27 | Same as 7 | Pedal force required for high level brake effort to be reached by strongest brake |
| 9. | Front to rear pedal force balance test (performed only when rear wheels are undergoing tests) FIG. 28 | Same as 7 | Difference between front and rear pedal force required to provide high level brake effort for front and rear wheels |
| 10. | High level brake effort imbalance test FIG. 29 | Same as 7 | Net brake effort imbalance |
| 11. | Excursion test FIG. 30 | Same as 7 | a) Excursion of either brake effort above predetermined values; and<br>b) Return of brake effort below the predetermined value previously exceeded |
| 12. | Drum oscillation test FIG. 31 | Same as 7 | Magnitude of brake effort oscillation above 5 cycles per second in either wheel brake |
| 13. | Fade test FIG. 32 | Same as 7 | Change in magnitude of brake effort of each brake from beginning to end of high level test |
| 14. | Anti-skid test FIG. 33 | Drive motors are de-energized and maximum brake pedal pressure applied | Non-linear decrease in speed of dynamometer rollers indicating that vehicle anti-skid control has intermittently released and applied vehicle brakes during deceleration of dynamometer rollers |
| 15. | Static pedal force test FIG. 34 performed only when rear wheels are being tested | Same as 7 | Change of position of brake pedal with constant pedal force (Pedal fail) |

TABLE 1 – Continued

| Nature of Test and Applicable Drawing Figure | Command to Brake Pedal Actuator Control Unit | Braking Performance Criteria Analyzed |
|---|---|---|
| 16. Brake pedal to floor distance test FIG. 35 | | Minimum acceptable distance between the brake pedal and the floor of the vehicle |

Preparatory to commencing the test sequence it is necessary that each of the vehicle test limit storage elements 384a through 384jj be adjusted to provide the appropriate output signal. The category of weight of the vehicle, i.e., compact, etc., percent of balance between front and rear brakes, use of power or manual brakes are reflected by appropriate adjustments in storage elements 384a and 384b, 384STUV and 384WXYZ. The acceptable or marginal and fail limits as established by the remaining storage elements will remain the same for many vehicles.

An anti-skid and limited slip differential switch may also be manually set by the operator prior to the commencement of the test sequence. An anti-skid switch (see FIG. 36) permits the operator to determine whether the anti-skid test will be performed on the front and/or rear wheel brakes. A limited slip differential switch (see FIG. 18) permits the operator to override an abort command when the maximum rolling resistance of either wheel exceeds a preset mixture limit as is described in more detail in connection with FIG. 18.

To initiate the test sequence, the vehicle is driven into the test area until the front wheels are positioned between the dynamometer rollers 14 through 17 (FIG. 11). The brake pedal actuator control unit 332 is positioned over the brake pedal and the pedal bracket 337 is guided into engagement with the brake pedal. The manual control 353 is then actuated by the operator while seated behind the vehicle steering wheel to initiate testing of the front wheels.

Referring now to FIG. 17, the hydraulic lifts are lowered by the preprogrammed storage register 400 and the motors are energized in the low torque configuration as discussed previously. When the driven rollers 14 and 16 have reached a predetermined percentage of the test or induction motor speed, i.e. 75 percent, the gating circuit 414 actuates the motor control 413 to energize the dynamometer motors in the high torque configuration. The gating circuit 414 also provides a signal to the program command storage which, after a predetermined time delay, for example two seconds to enable the dynamometer rollers to arrive at the final test sequence speed, e.g. 45 MPH, issued test commands to the various components of the system to begin the testing operation.

TEST 1 - ROLLING RESISTANCE

The maximum rolling resistance and the rolling resistance imbalance are measured and compared with maximum, satisfactory and marginal preset limits by the computer components illustrated in FIG. 18. The programmer illustrated in FIG. 18 is shown only in block form and referenced by the number 440. The programmer initiates operation of the various components of FIG. 18, i.e., gates and storage elements and controls the brake pedal actuator via signals to the transducer 351 to maintain the brakes in a released or inoperative condition. The signals on lines 372a and 372b thus represent the rolling resistance of the right and left wheels of the vehicle. The rolling resistance signals are applied to a dual subtractor 442 and stored in storage elements 445 and 456. The subtractor 442 subtracts the right and left rolling resistance signals from a maximum limit rolling resistance signal from storage element 384e. The subtractor 442 applies a first output signal (e.g. high level) on fail lines marked F, to associated gates 446 or 447 when either rolling resistance signal exceeds the maximum limit signal from element 384e. The gates 446 and 447 are enabled by an appropriate readout command signal from the programmer 440 and in response to a fail signal from the dual subtractor 442 to energize a fail lamp indicator 452 or 453, respectively, indicating that the rolling resistance of the respective wheel has exceeded the acceptable limit. The satisfactory indicating lamps 450 and 451 are energized when the subtractors apply a second output signal on S or satisfactory lines to the gates 446 and 447 indicating that the rolling resistance is less than the maximum acceptable limit. The indicating lamps 450 through 453 remain energized by an appropriate latching circuit to be discussed, until after the test sequence has been completed to provide a recorded indication that the vehicle has passed or failed the maximum rolling resistance test. The indicating lamps referred to in the remaining figures also remain energized for a period in excess of the test period to provide a record of the test results.

The automatic control system of the present invention includes a limited slip differential switch 448 and a limited slip differential abort command gate 449 as shown in FIG. 18. A fail signal on line F from the dual subtractor 442 is also applied to the programmer 440 via abort command gate 449 to stop the testing sequence and deenergize the dynamometer motors 21 and 22. The limited slip differential switch 448 when operated to indicate that the vehicle being tested is equipped with limited slip differential inhibits the abort command gate 449 during the rear wheel testing sequence so that a fail signal on line F from the subtractor 442 does not stop the testing sequence.

During the rolling resistance test, the highest rolling resistance signal on line 378 is stored in storage element 457 for later use. The brake imbalance signal on line 375 is also stored in storage element 458 and compared with the satisfactory and marginal preset imbalance limits via a dual subtractor 459. When the brake effort imbalance signal on line 375 is greater than the marginal preset limit from storage element 384g, then the subtractor 459 applies an appropriate output signal (e.g. high level) on output line F to gating circuit 462 to cause either a left or right fail indicating lamp 463 or 466 to be energized. When the imbalance signal on line 375 is less than the marginal preset limit but greater than the satisfactory preset limit (384f) then the subtractor 459 applies an appropriate output signal (output line M) to the gating circuit 462 which, in turn, energizes a marginal indicating lamp 464 or 467. The gating circuit 462 is enabled by a readout command signal from the programmer 440 and is also responsive to the highest brake effort identification signal on line 376 to transfer the output signals on the subtractor output lines M or F to left or right indicating lamps. Where the left brake effort signal is the largest, the left indicating lamps (463, 464) will be energized and vice versa. When the imbalance signal on line 375 is less than the preset satisfactory level, then the subtractor 459 applies an output signal on output line S to two satisfactory indicating lamps 465 and 468 via the gating circuit 462.

The indicating lamps 450 through 453 and 463 through 468 inform the operator that (1) the vehicle has passed or failed the maximum rolling resistance test, (2) the vehicle has a satisfactory, marginal or unacceptable rolling resistance imbalance, and (3) the identity of the wheel with the highest rolling resistance where the imbalance is marginal or failing. The output signals from the gates 446 through 447 and 462 may be utilized to operate a printer or other suitable recording device, if desired.

TEST 2 - BRAKE ENGAGEMENT LAG TEST

The brake engagement lag test follows the rolling resistance test. In preparation for this test, the computer calculates the pre-hydraulic brake effort level for use in controlling the brake pedal actuator. The components for performing this calculation are illustrated in FIG. 19. The value of the high level brake effort for the front or rear wheel testing sequence is obtained by a divider 469 which divides the total brake effort value stored in element 384a by a number representing the percentage of such value to be used in testing the front or rear wheel brakes, i.e. 75 percent, 25 percent, etc.. The highest rolling resistance value Z as stored in element 457 in the previous test is subtracted via subtractor 470 from the output signal Y of the divider 469.

The pre-hydraulic brake effort factor $X_1$ which has been preset into element 384c is divided into the difference signal Y - Z from the subtractor 470 by a divider 471. The quotient $Y - Z/X_1$ is then added to the stored highest rolling resistance signal Z by an adder 472 and the resultant signal is stored in storage element 473.

The system is now ready for the brake engagement lag test. Referring now to FIG. 20, force is applied to the brake pedal at a slow rate (e.g. 25 pounds of brake effort per second) via the slow rate control unit 435, the brake actuator transducer 351 (electric to fluid pressure signal transducer) and the brake pedal actuator control unit 332. The right and left brake effort signals on lines 372a and 372b are monitored by a pair of increase in level detectors 475 and 476 to sense an increase in brake effort level which indicates that the respective brake has engaged. The increase in level detectors 475 and 476 are identical except that the stored right rolling resistance signal is used in detector 475 and the left stored rolling resistance signal is used in detector 476. Only the individual components of the detector 475 are depicted in FIG. 20.

The increase in level detector 475 includes an adder 478 which receives on one input the stored rolling resistance signal for the right wheel from storage element 455. The other input of the adder 478 receives a signal from a preset increment storage element 480. The signal from the storage element 480 represents a preset increment in the brake effort level, for example, three lbs.. The output of the adder 474 is applied to one input of a subtractor 481, the other input of which is connected to line 372a to receive the right brake effort signal.

The subtractor 481 produces an appropriate output signal (high level) on line 482 when the instantaneous value of the right brake effort signal is greater than the stored rolling resistance of the right wheel plus the preset increment from storage element 480. This high level signal may be provided by the carry line in the subtractor as is discussed in more detail in reference to FIG. 38. By the same token, the increase in level detector 476 produces an appropriate output signal (high level) on line 483 when the value of the left brake effort signal has increased a predetermined nominal amount (e.g. 3 lbs.) over the stored rolling resistance signal for the left wheel. Thus a high level output signal on either line 482 or 483 is representative of the fact that the respective brake has engaged. The output signals on lines 482 and 483 are applied to two inputs of a logic circuit 484.

Logic circuit 484 when enabled by an enabling signal from programmer 440 produces a brake engagement lag signal (i.e. high level) on line 485 upon the occurrence of an output signal (high level) from each increase in level detector 475 and 476 indicating that both brakes have just engaged. Thus the brake engagement lag signal from the logic circuitry 484 marks the time when the last to engage brake has engaged. The output signal from the logic circuitry 484 enables gating circuits 486 and 492.

A signal representing the stored rolling resistance imbalance from storage element 458 is subtracted from the brake effort imbalance signal on line 375 by means of a subtractor 487. The difference or output signal from the subtractor 487 represents the net brake effort imbalance, that is, the gross brake effort imbalance between the right and left wheels minus the stored rolling resistance imbalance. The output signal from the subtractor 487 is applied to a dual subtractor 488 and a single subtractor 490 which compare the net braking effort imbalance with preset satisfactory, marginal and invalid limits from storage elements 384h, 384i, 384j, respectively. If the net brake effort imbalance (at the instant that the last to engage brake engages) exceeds a value represented by the invalid preset limit, an output signal (i.e. high level) is applied to the gating circuit 492 via invalid line to energize invalid indicating lamp 493. Energization of the invalid lamp 493 informs the operator that the hydraulic restriction test to follow cannot be validly run until certain mechanical problems causing the unacceptable brake imbalance are corrected.

The dual subtractor 488 of FIG. 20 functions in the same manner as the dual subtractor 462 of FIG. 18 and energizes left or right marginal or fail indicating lamps depending upon the logic of the highest brake effort identification signal on line 375. A net brake effort imbalance signal which is greater than the marginal limit will produce an appropriate output signal (high level) on the F output line from the dual subtractor 488 and cause the gating circuit 486 to energize a left fail indicating lamp 495 if the left brake is the weaker brake. If the net brake effort imbalance signal is less than the marginal limit but greater than the satisfactory limit, the subtractor 488 will provide an output signal on line M to cause the gating circuit 486 to energize a left or right marginal indicating lamp 496 or 499 depending upon which brake is the weakest. A net brake effort imbalance signal having a value less than the satisfactory preset maximum limit will cause energization of a satisfactory indicating lamp 497 and 500. The lamp indicators 493, 495 through 500 inform the operator of (a) whether the brake effort imbalance at the moment that the last to engage brake has engaged exceeds the satisfactory maximum limit, falls between the satisfactory limit and the maximum marginal limit or exceeds an invalid maximum limit and (b) which brake is lagging in peformance.

TEST 3 - PRE-HYDRAULIC AND SHOE SEATING TESTS

Referring now to FIG. 21, upon completion of the brake engagement lag test, the brake pedal actuator control unit 332 continues to apply force to the brake pedal at the slow rate until the highest brake effort signal on line 378 is equal to or greater than the stored pre-hydraulic brake effort level. At this time, a magnitude comparator 502 provides an output signal to the programmer 440 to command the brake pedal actuator transducer 351 and the control unit 332 to maintain the force applied to the brake pedal constant for a predetermined period of time, e.g. one second.

The magnitude comparator 502 receives as one input the highest brake effort signal and as the other input the stored pre-hydraulic brake effort level signal. The comparator provides an appropriate output signal (e.g. true or high level) on output line 503 when the signal on line 378 is equal to or greater than the signal from the storage element 473. The output signal on line 503 is applied to the programmer 440 to indicate that the highest brake effort signal has reached the desired pre-hydraulic brake effort level. The programmer in response to the output signal from the comparator 502 commands the brake pedal actuator control unit 332 to maintain the pedal force constant for the predetermined period of time.

The brake effort imbalance signal on line 375 which represents the sum of the rolling resistance imbalance and the net brake effort imbalance is stored in storage element 505 during the test period for later use in the hydraulic restriction test No. 6.

TEST NO. 4 - BRAKE DISENGAGEMENT LAG TEST

The brake disengagement lag test is performed by the computer components illustrated in FIG. 22. To start this test a command is given to the brake pedal actuator control unit 332 to begin decreasing the pedal force (from the maximum force applied in Test No. 3) at a pre-determined rate, for example, 25 lbs. of brake effort per second. The specific rate is adjustable. The left and right brake effort signals are compared with the previously stored left and right rolling resistance signals by magnitude comparators 506 and 507. When the right or left brake effort signal is equal to its respective stored rolling resistance signal, the respective magnitude comparator provides an appropriate output signal (high level) to a gating circuit 508.

The gating circuit 508 responds to this output signal from either comparator to produce a brake disengagement lag signal in an output circuit 509 thereof which enables a gating circuit 510. At this same time, the stored rolling resistance imbalance signal from storage element 458 is subtracted from the brake effort imbalance signal on line 375 to produce a net brake effort imbalance signal which is applied to a dual subtractor 512. The subtractor 512 also receives signals from storage elements 384k and 384l representing the maximum satisfactory and marginal limits of net brake effort imbalance for the brake disengagement lag test.

If the net brake effort imbalance (at the time that the first to disengage brake has disengaged) is greater than the marginal preset limit, the subtractor 513 applies an appropriate output signal on the output line F to the gating circuit 510 to energize (a) a left fail indicating lamp 514 when the left brake has failed to disengage, and (b) a right fail indicating lamp 317 when the right brake has failed to disengage. If the net brake effort imbalance signal is less than the marginal preset limit but greater than the satisfactory preset limit, the subtractor 512 applies an appropriate output signal on M line to the gate 510 to energize either a left or right marginal indicator lamp 515 or 518. When the net brake effort imbalance signal is less than satisfactory preset limit, the subtractor applies an output signal on the output line which causes the gating circuit to energize both left and right satisfactory indicating lamps 516 and 519.

TEST 5 - SYSTEM RESPONSE TEST

The brake system response test is performed by the components illustrated in FIG. 23. Upon completion of the brake disengagement lag test, the brakes are left in a released condition for a short period of time, for example, one or two seconds. At the end of this interval, the programmer 440 actuates the pedal force high rate controller 434 to apply pedal force at a high rate, for example, 50 lbs. of brake effort per second until the highest brake effort signal reaches the pre-hydraulic brake effort level stored in element 473. Upon the application of force to the brake pedal, the pedal force sensor signal on line 340 starts an oscillator 524. The output of the oscillator 524 is applied to a counter 525. At this same time, a pair of increase in level detectors 526 and 527 provide a brake engagement lag signal on line 528 to stop the oscillator 524 when either the right or left brake effort signal has increased a predetermined nominal amount (i.e. 3 lbs.) to indicate that a brake has engaged. The increase in level detectors 526 and 527 may be the same as the detector 475 in FIG. 20.

The count from counter 525 is compared by subtractors 530 and 531 to preset maximum satisfactory and marginal limits. A gating circuit 532 is enabled by the brake engagement lag signal via gate 529 as illustrated, and responds to the output signals from the subtractors 530 and 531 to energize a fail indicating lamp 534 when the count is greater than the maximum marginal preset limit. The gating circuit 532 also energizes marginal and satisfactory indicating lamps 535 and 536 when the count in counter 525 is between the satisfactory and marginal preset limits and less than the satisfactory preset limit, respectively. The lamps 534, 535 and 536 thus inform the operator of whether the brake system response time is satisfactory, marginal or unacceptable.

TEST 6 - HYDRAULIC RESTRICTION TEST

Referring now to FIG. 24, the brake pedal actuator control unit 332 is controlled as in FIG. 23 by the programmer to continue to apply pedal force at the fast rate as in the previous test until the highest brake effort signal on line 378 is equal to the stored pre-hydraulic brake effort level in storage element 473. A magnitude comparator 538 provides an appropriate output signal to programmer 440 when the highest brake effort signal is equal to the stored pre-hydraulic level to stop the application of brake pedal force. At this time the stored mechanical and rolling resistance imbalance signal from storage element 505 is subtracted from the gross brake effort imbalance signal on line 375 by means of subtractor 544. The difference signal from subtractor 544 is compared with maximum satisfactory and marginal pre-set imbalance limits from storage elements 384o and 384p by a dual subtractor 545.

A gating circuit 540 is enabled by the programmer 440 at the instant when the highest brake effort signal reaches the stored pre-hydraulic level. The dual subtractor 545, through the gating circuit 540, energizes one of the fail or marginal indicating lamps 548, 549, 551, 552 when the output signal from subtractor 540 is greater than the marginal preset limit or between the marginal and satisfactory preset limits. The highest brake effort identification signal on line 376 controls the gating circuit 540 to energize the marginal or fail indicating lamp which is associated with the weakest wheel brake, left or right. For example, if the brake effort imbalance signal from the subtractor 544 exceeds the marginal preset limit and the weakest brake is the left brake, then lamp 548 will be energized. Satisfactory indicating lamps 550 and 553 are energized when the output signal from the subtractor 544 is below the satisfactory preset limit.

At the end of the hydraulic restriction test, the programmer 440 decreases the brake pedal force at a high rate, for example, 50 lbs. of brake effort per second until the brakes are released.

TEST 7 - COMFORT LEVEL IMBALANCE TEST

Figure 25:
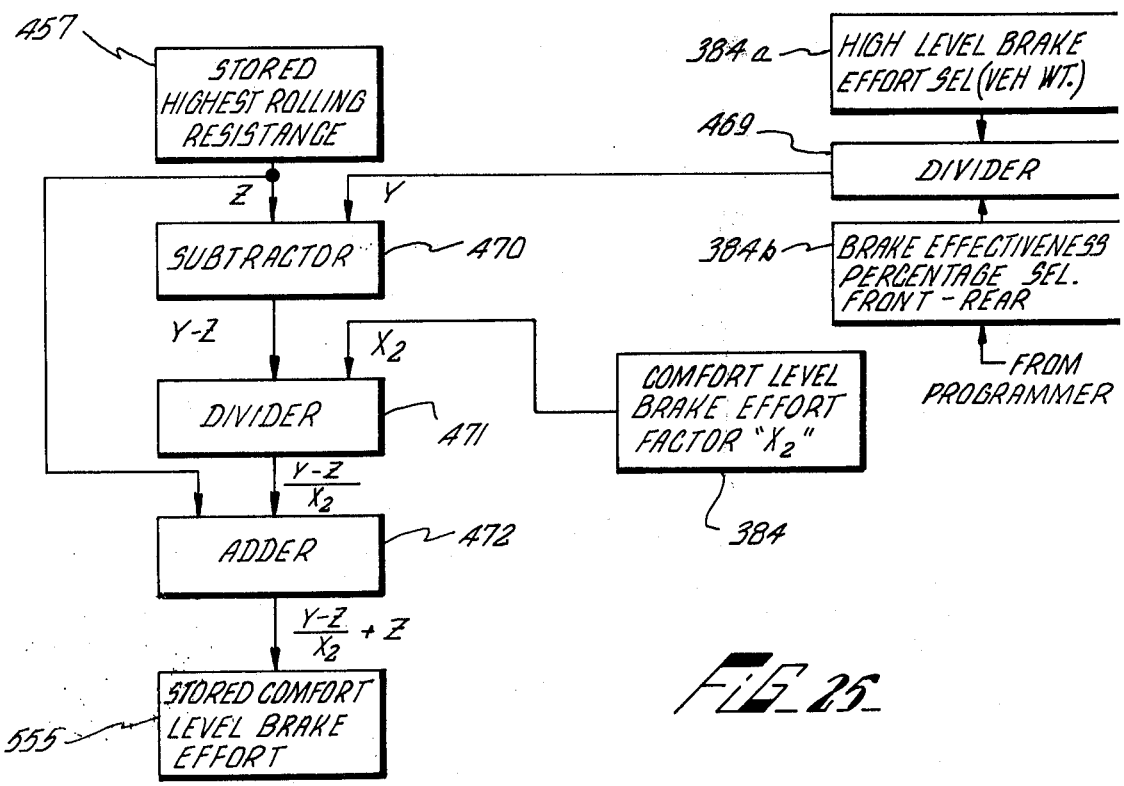
FIG. 25 is a block diagram of certain computer components for calculating and storing the comfort level brake effort.

Upon completion of the hydraulic restriction test, the brakes are released for a predetermined period of time, i.e. one second. During this time, signals representing the rolling resistance of each wheel and the highest rolling resistance are re-sampled and stored by the circuitry of FIG. 18. The highest rolling resistance signal is now used to determine the comfort level brake effort by the circuit of FIG. 25. The circuit of FIG. 25 is identical to the circuit of FIG. 19 with the exception that the comfort level brake factor $X_2$ is divided into the difference signal $Y - Z$ from the subtractor 470. The corresponding components are given the same reference numerals as in FIG. 19. The comfort level brake effort signal is stored in storage element 555.

The remaining tests, e.g. Nos. 7 through 16 are conducted by the application of pedal force at the slow rate to the brake pedal until the high level brake effort is reached by the strongest brake. The pedal force then remains constant for a predetermined period of time, i.e. five or six seconds and the brakes are then released.

Referring now to FIG. 26, the brake effort imbalance at the comfort level (e.g. the level which is applied during normal driving) is determined. During the time that the brake pedal is being applied to reach the high level brake effort, the highest brake effort signal is monitored and compared with the stored comfort level brake effort signal in a magnitude comparator 556. When the highest brake effort signal reaches the comfort level brake effort signal, the magnitude comparator 556 provides an output signal to the programmer 440 which in turn enables a gating circuit 558. At this time the stored rolling resistance imbalance from storage element 458 is subtracted from the gross brake effort imbalance signal on line 375 by a subtractor 562 and the difference signal (net brake effort imbalance) is applied to a dual subtractor 563.

The net brake effort imbalance signal from subtractor 562 is compared with maximum marginal and satisfactory preset limits from storage elements 384q and 384r by the subtractor 563. Left or right fail and marginal indicating lamps 565, 566, 568, 569 are energized by the gating circuit 558 when the net brake effort imbalance signal exceeds the marginal limit or falls between the marginal and satisfactory limits. The highest brake effort signal on line 376 controls the gating circuit 558 so that the fail and marginal indicating lamps identify the weakest brake. Satisfactory indicating lamps 567 and 570 are energized when the output signal from the subtractor 562 is less than the satisfactory preset limit.

TEST 8 - PEDAL FORCE LEVEL TEST

The pedal force level test is conducted by the circuit of FIG. 27. The brake pedal actuator applies increasing force to the brake pedal via a command from the programmer 440 until the highest brake effort signal reaches the high level brake effort signal for the front (or rear) wheels as determined by storage element 384a, divider 469 and brake effectiveness percentage selector 384b. At this time, a magnitude comparator 572 provides an output signal to the programmer 440 to maintain the pedal force constant for the five or six second interval discussed previously. At this same time, the programmer 440 issues a storage command to storage element 574 or 575, depending upon whether the front or rear wheels are being tested. storage elements 574 and 575 store the pedal force signal present on line 340 for use in subsequent test No. 9.

The pedal force signal on line 340 is also compared with maximum marginal and satisfactory preset limits via a dual subtractor 577. The output signals on output lines S, M or F of the subtractor 577 are applied to indicating lamps 581, 582 and 583, respectively, when the gating circuit 580 is enabled by a readout command signal from the programmer. If the pedal force required to reach the high level brake effort is above the marginal preset limit, intermediate the marginal and satisfactory preset limits or less than the satisfactory preset limit, then the gating circuit 580 energizes the fail, marginal or satisfactory indicating lamps 581, 582 and 583, respectively.

TEST 9 - FRONT TO REAR PEDAL FORCE BALANCE TEST

Referring now to FIG. 28, the front to rear pedal force balance tests are conducted by the circuitry illustrated in FIG. 28. This test is performed only when the rear wheels are undergoing tests. When the rear pedal force signal is compared to its preset limits during test No. 9, it is also compared to the stored front pedal force signal. The difference between the front and rear pedal force signals is obtained by subtractor 585 and compared with maximum satisfactory and marginal preset limits by means of a dual subtractor 586. The subtractor 586 controls a gating circuit 588 which, in turn, energizes front or rear fail, marginal and satisfactory indicating lamps 590, 591, 592, 590', 591' and 592' when the differential pedal force exceeds the marginal preset limit, falls between the marginal and satisfactory preset limits and is less than the satisfactory limit, respectively. The subtractor 585 provides a highest pedal force identification signal (e.g. high or low level) on line 587 which is indicative of whether the front pedal force is higher than the rear pedal force or vice versa. This highest pedal force identification signal controls gating circuit 588 (in the same manner as the highest brake effort identification signal controls the gating circuit 558 of FIG. 26) to cause the marginal or fail indicating lamps when energized to correspond with the highest pedal force, that is front or rear.

TEST 10 - HIGH LEVEL BRAKE EFFORT IMBALANCE TEST

The high level brake effort imbalance test will now be discussed in relation to FIG. 29. The stored rolling resistance imbalance signal is subtracted from the gross brake effort imbalance signal on line 375 by subtractor 596 to provide a net brake effort imbalance signal which is compared with a maximum satisfactory and marginal preset limit by a dual subtractor 597. The dual subtractor 597 provides an appropriate output signal on output line S indicating that the brake effort imbalance is less than the satisfactory preset limit, falls between the satisfactory and marginal preset limit and exceeds the marginal preset limit, respectively. The output lines S, M and F from the dual subtractor 597 are continuously sampled by sampling gate 598. This gate is enabled by programmer 440 at the beginning of the high level brake effort test.

The satisfactory, marginal or fail signals from the subtractor 597 as sampled by the gate 598 are transferred to a storage and priority circuit 599 via lines S, M and F as shown. The storage and priority circuit 599 continuously samples the existing satisfactory, marginal and fail conditions on output lines S, M and F, respectively. The storage and priority circuit 599 stores the worst condition that has occurred by assigning priorities to the input signals. The highest priority signal is the fail signal on line F, the second highest priority signal is the marginal signal on line M, and the lowest priority signal is the satisfactory signal on line S. The priority circuit 599 has output lines marked S, M and F corresponding to satisfactory, marginal and fail signals.

The output signals from the priority circuit 599 represent the worst brake effort imbalance during the high level test. For example, if the brake effort imbalance exceeds the marginal limit at one point in time during the high brake effort level test period and then falls below the marginal limit, the circuit 590 will provide a fail signal on output line F. If the brake effort imbalance exceeds the satisfactory limit and then falls below the satisfactory limit during the high level test period, then the circuit 599 will provide a marginal signal on the M output line.

A left or right readout command circuit 600 is responsive to the highest brake effort identification signal on line 376 and to the output signals from the storage and priority circuit 599. The readout command circuit 600 samples the highest brake effort identification signal each time there is a change in the output signal from the priority circuit 599 to provide an indication of whether the marginal or failing brake is left or right. At the end of the high level test, the programmer 440 commands the readout command circuit 600 to provide an appropriate enabling signal to either a right gating circuit 601 or a left gating circuit 602 depending upon which brake is the weakest brake at the time of the last change in the output signal from the priority circuit 599. The gating circuits 601 and 602 when enabled by the readout command circuit 600 transfer the output signals on the marginal (M) and fail (F) output lines from the storage and priority circuit 599 to the left or right marginal or fail indicating lamp circuit 603, 604, 606 or 607, depending upon which brake is weakest. Thus, if the worst brake imbalance during the high level test exceeded only the satisfactory preset limit and at that time the left brake was weakest, then indicating lamp 604 will be energized. When the brake effort imbalance remains below the satisfactory preset limit, both satisfactory lamps 605 and 608 are energized.

TEST NO. 11 - EXCURSION TEST

The excursion test data is obtained by the circuit of FIG. 30. The results of the excursion test inform the operator of whether (1) the brake effort of either wheel has increased in value above a preset limit and (2) increased above such limit and then subsequently decreased again below such limit, during the high level brake effort test (i.e. 5 or 6 seconds).

At the beginning of the high level brake effort test, e.g. when the highest brake effort has reached the predetermined high level brake effort, the right and left brake effort signals are stored in storage elements 610 and 611 via an appropriate storage command signal from programmer 440. The right and left brake effort signals are then continuously compared with the respective initially stored values by means of subtractors 612 and 614, respectively. The output signals from the subtractors 612 and 614 thus represent in digital format the difference signal between the instantaneous or current values of the right and left brake efforts and their respective initially stored values. The computer components for comparing the output signals from the right and left brake effort subtractors 612 and 614 are identical and for that reason only the components associated with right brake effort subtractor 612 will be discussed in detail.

The output signal from the right brake effort subtractor 612 on line 615 is applied to a dual subtractor 617 which compares this difference signal with satisfactory and marginal preset limits stored in elements 384cc and 384dd. The dual subtractor 617 provides an appropriate output signal (i.e. high level) on one of its output lines marked S, M. or F. An output signal on line F is indicative of the fact that the difference between the instantaneous right brake effort signal and the initially stored right brake effort signal has exceeded the marginal preset limit. By the same token, a signal on output line M is indicative of the fact that the difference between the instantaneous value of the right brake effort signal and the initially stored right brake effort signal falls between the marginal and satisfactory preset limits. A signal on output line S of the dual subtractor 617 is indicative of the fact that the difference between the instantaneous and initial values of the right brake effort has not exceeded the satisfactory preset limit.

A sampling gate 618 (similar to gate 598 of FIG. 29) is enabled by the programmer 440 and continuously samples and transfers to output lines S, M and F, the satisfactory, marginal or fail signals, respectively, from the subtractor 617. A storage and priority circuit 619

(similar to the storage and priority circuit 599 of FIG. 29) continuously samples and stores the existing conditions of the satisfactory, marginal and fail output lines from the gate 618. The priority circuit 619 assigns priorities to the output lines S, M and F so that the F line has the first priority, the M line the second priority and the S line the least priority. The priority circuit 619 continuously updates the signal on its output lines S, M and F to represent the worst brake condition, as for example, if the difference between the instantaneous and stored right brake effort signals at some point during the high level test exceeds the marginal preset limit, then the subtractor 617 will provide a fail output signal on the output line F, and the sampling gate 618 will, in turn, provide a fail signal in its output line F. The storage and priority circuit 619 will respond to the fail signal and produce an output signal on its output line F indicating a fail condition. If the difference between the instantaneous and stored right brake effort signals later falls below the marginal preset limit to cause the subtractor 617 and the sampling gate 618 to change the output signal to a marginal output signal on line M, then the storage and priority circuit 619 will continue to provide only a fail output signal on line F.

A reversal indication circuit 621 receives the output signals from the sampling gate 618 on lines S, M and F and provides satisfactory or fail output signals on lines S or F. The reversal indication circuit 621 provides a fail indication signal on its output line F when the output signal from the dual subtractor 617 and sampling from gate 618 change from a fail to a marginal output signal or from a marginal to a satisfactory output signal, indicating that the brake performance has exceeded the marginal or satisfactory preset limits and then fallen below such limits during the period of the high level test. The reversal indication circuit 621 provides a satisfactory output signal on its output line S when the output signals from the subtractor 617 and gate 618 do not reverse, that is when the difference between the instantaneous and stored right brake effort signals do not exceed and then fall back below the marginal or satisfactory preset limits.

At the end of the high level brake effort test, the programmer 440 provides a readout command signal to gating circuits 620 and 622. The gating circuit 620 when enabled energizes (1) indicating lamp 623 in response to a signal on output line F from the priority circuit 619, or (2) a marginal indicating lamp 624 in response to a signal on output line M from priority circuit 619, or (3) a satisfactory indicating lamp 625 in response to a signal on output line S from priority circuit 619. Gating circuit 622 when enabled energizes a fail indicating lamp 626 in response to a signal on output line F of reversal indication circuit 621. The gating circuit 622 when enabled energizes a satisfactory indicating lamp 627 in response to a satisfactory signal on output line S of reversal indication circuit 621.

The indicating lamps 623 through 627 thus inform the operator of whether the difference between the instantaneous and stored values of the right brake effort signals have (1) exceeded the marginal or satisfactory preset limits at any time during the high level brake effort test, and (2) whether such difference has exceeded the marginal or satisfactory preset limit and then fallen below such limit during the high level test.

A dual subtractor 628, sample gate 629, storage and priority circuit 630, reversal indication circuit 632 and gating circuits 631 and 633 function in the same manner as the corresponding elements for the right brake. Such elements 629 through 633 energize a fail, marginal or satisfactory indication lamp 634, 635 or 636 when the difference between the instantaneous and stored value of left brake effort (1) exceeds the marginal preset limit, or (2) falls between the marginal and satisfactory preset limits, or (3) remains below the satisfactory preset limit during the high level test. The elements 629 through 633 also energize a fail or satisfactory indicating lamp 637 or 638 when the difference between the instantaneous and stored left brake effort signal exceeds and then falls below the satisfactory or marginal preset limit during the high level brake effort test.

TEST 12 - DRUM OSCILLATION TEST

The circuit of FIG. 31 provides an analysis of brake drum oscillation. The right and left brake effort signals (analog) are applied to a pair of 5 $H_z$ active bandpass filters 644 and 645. The filters 644 and 645 pass only signals which have an oscillation frequency greater than 5 $H_z$. The output signals from the bandpass filters 644 and 645 are applied to one input of respective comparators 646 and 647. The other input to each of the comparators is an analog signal representing a preset maximum limit. The preset maximum limit storage element 384ee provides a digital output signal which is converted to an analog signal by digital-to-analog converter 648. The output signals from the comparators 646 and 647 are applied to gating circuits 650 and 651, respectively. When the output signals from the bandpass filters 644 and 645 exceed the analog signal from the digital to analog converter 648, the gating circuits 650 and 651 energize fail indicating lamps 652 and 653. Satisfactory indicating lamps 654 and 655 are energized when the output signals from the filters 644 and 645 are less than the signal from the converter 648. Energization of the fail lamp indicators 652 and 653 inform the operator that the respective brake effort signals have oscillations of 5 $H_z$ or more and an amplitude which exceeds a preset maximum amplitude indicating that the drums are, for example, out of round to an unacceptable degree.

TEST 13 - FADE TEST

The circuit of FIG. 32 checks the brakes for excessive fade, or excessive reduction in brake effort at the end of the high level test. The programmer 440 enables gating circuits 660, 661 at the end or approximately the end of the high level test. The right and left brake effort signals are subtracted from the initial stored values by subtractors 662 and 663. The difference between the brake effort signals at the end of the high level test and the initial brake effort signals are compared with maximum satisfactory and marginal preset limits by dual subtractors 664 and 666. The gating circuits 660 and 661 energize failure indicating lamps 670 and 671 when the final brake effort signals are less than the initial brake effort signals of the respective wheels by an amount which exceeds the marginal preset limit as determined by storage element 384gg. The marginal indicating lamps 672 and 673 are energized when the final brake effort signals are less than the initial brake effort signals by an amount which falls between the marginal and satisfactory preset limits and the satisfactory indicating lamps 674 and 675 are energized when the difference between the initial and final brake effort signals is less than the maximum satisfactory preset limit.

TEST 14 - ANTI-SKID TEST

Referring now to FIG. 33, the vehicle is tested to determine whether or not the internal anti-skid control is operating properly by monitoring the tachometer generator signals after the drive motors 21 and 22 have been de-energized via programmer 440 and the rollers 14 through 17 permitted to coast. The brake pedal pressure is increased to a maximum by a signal from the programmer to the E/P transducer 351. The analog signals from the right and left tachometer generators are monitored by comparators 678 and 679. The comparators 678 and 679 produce an appropriate output signal when the input signals from the respective tachometer generators are non-linear representing an abnormal decreasing speed signal. The output signals from the comparators 678 and 679 are applied to gating circuits 680, 681 which (when enabled by a readout command signal from the programmer 440) energize satisfactory indicating lamps 682 and 683 in response to an appropriate output signal from the comparators. The gating circuits 680 and 681 energize fail indicating lamps 684 and 685 when the signal from either tachometer decreases linearly. A test cut off point circuit 677 applies an appropriate output signal to the programmer 440 to end the anti-skid test by removing the enabling signal to the readout gates 680 and 681 when the signal from either tachometer generator falls below a predetermined value indicative of the fact that the dynamometer roller and vehicle wheel speed has decreased below a particular value, e.g. 10 MPH. The circuit 677 may simply compare the voltage output signals from the tachometer generator with a suitable d.c. reference voltage and provide an output signal to the programmer when either tachometer generator signal falls below the magnitude of the reference voltage.

TEST 15 - STATIC PEDAL FORCE TEST

The brake pedal travel is monitored during the high level brake effort test to determine if there are any hydraulic leaks in the brake system. The components for providing an indication of such leakage are illustrated in FIG. 34. As discussed previously, the brake pedal actuator control unit 332 includes a transducer such as a potentiometer which provides a signal representative of the position of the piston 336 or brake pedal bracket to the actuator frame. A potentiometer such as that illustrated at 686 in FIG. 34 may be used to provide a position dependent signal. The potentiometer 686 is provided with a center tap 687 which is movable with the piston 336. A constant current source 688 is coupled to the potentiometer 686 so that the voltage at the movable center tap 687 is proportional to the position of piston 336.

The output signal of analog-to-digital converter 689 is stored at the beginning of the static pedal pressure test in storage element 690. A continuous sample element 691 provides a continuous sample of the signal representing the brake pedal position. A subtractor 692 provides an output signal representing the difference between the initial position of the brake pedal and the instantaneous position. Another subtractor 693 compares the difference signal from subtractor 692 with a preset limit from storage element 684ii. If the difference signal from subtractor 692 exceeds the preset limit, a fail indicator lamp 694 is energized. If the brake pedal travel falls within an acceptable limit, the satisfactory indicating lamp 695 is energized.

TEST 16 - BRAKE PEDAL TO FLOOR DISTANCE TEST

Referring now to FIG. 35, the pedal-to-floor distance indicator 342 provides a signal (representing for example a contact closure) on line 343 when the distance between the brake pedal and the floor is less than an acceptable value. The signal on line 343 energizes a fail indicating lamp 697 through a gating circuit 698 in response to a signal on line 343. A satisfactory indicating lamp 699 is energized in the absence of a signal on line 343 indicating that the pedal-to-floor distance is within the acceptable limit.

The testing sequence discussed above with the exception of the front to rear pedal force balance, static pedal force and the pedal to floor distance tests is performed on both the front and rear wheels of the vehicle under test. Both sets of vehicle wheel brakes may be tested with the same computer components except that an additional set of satisfactory, marginal and fair indicator lamps are used to record the performance of the rear wheels.

DISPLAY PANEL

Figure 36:
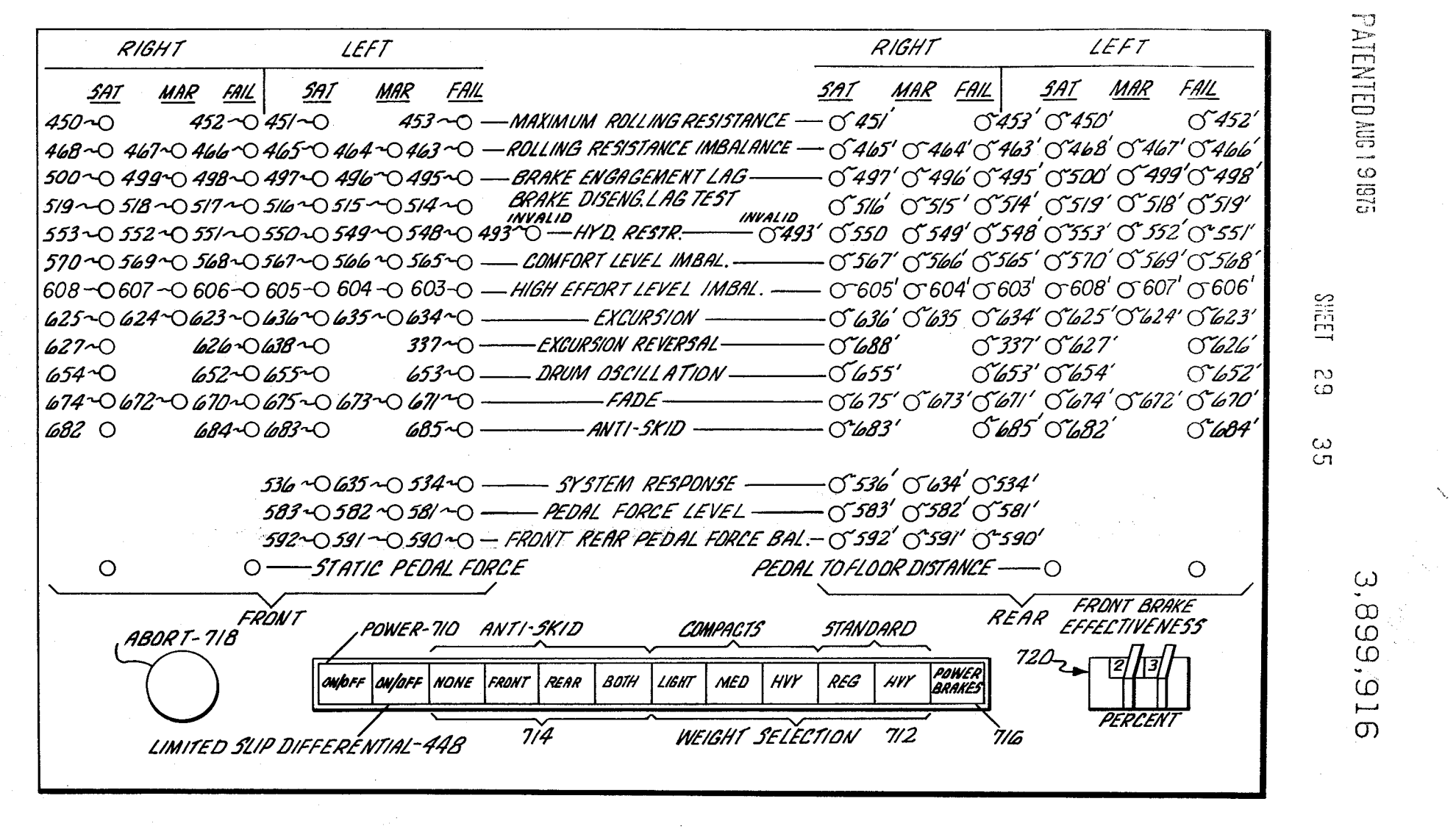

Referring now to FIG. 36, there is illustrated a display panel, preferably located on the front of the computer console which contains all of the indicating lamps referred to in the previous figures arranged in rows in accordance with the test sequence as illustrated. The indicating lamps for the rear wheel brakes are marked with the primed number of the corresponding indicating lamps for the front wheel brakes.

A manual switch arrangement is provided on the switch panel for the operator's convenience. This switch arrangement includes a power switch 710 and five weight selection switches designated by the numeral 712 and marked under compact, light, medium and heavy, and under standard cars, regular and heavy. The five weight selection switches 712 may be utilized to control the setting of the individual switches of storage element 384a of FIG. 16. In the alternative, five separate vehicle weight storage elements may be used with a particular storage element being selected for the particular vehicle under test by the actuation of one of the switches 712.

The front panel may also include four anti-skid switches 714 including a front anti-skid switch, a rear anti-skid switch, a front and rear anti-skid switch and a switch marked none, to be actuated when neither the front nor rear wheels of the vehicle under test is equipped with an anti-skid control. The actuation of one of the anti-skid switches causes the programmer to include the anti-skid test in the testing sequence. The limited slip differential switch 448 permits the operator to enable or disable the abort shut down command gate 449 as was discussed in connection with FIG. 18.

A power or manual brake switch 716 may be provided on the front panel to permit the operator to select either storage unit 384st or 384uv. An abort indicating lamp 718 which when energized informs the operator that the system is being shut down or has been shut down may also be included on the front panel. The front panel may also include a two digit thumb wheel switch 720 which functions as the storage unit 384b to select the brake effectiveness percentage between the front to the rear wheel brakes.

DESCRIPTION OF SPECIFIC LOGIC CIRCUITS FOR USE IN THE AUTOMATIC CONTROL SYSTEM

Several logic circuits which may be used in the block diagrams discussed in FIGS. 12 through 32 will now be described. The subtractor 374 of FIG. 14 for providing a continuous brake effort imbalance signal and a highest brake effort identification signal may be of the type illustrated in FIG. 37. The right brake effort signal is applied via composite line 372a to full adder units 722a, 722b, and 722c. The left brake effort signal on line 372b is inverted (or complemented) by an inverter 724 and then applied to the adder units 722a, b and c as is illustrated. The full adder units 722a, b and c obtain the difference signal between the right and left brake effect signals and apply such difference signal to an exclusive OR gate 726 a and b to provide the gross brake effort imbalance on composite line 375. The carry out signal from the most significant bit of adder 727 a, b and c is applied to the exclusive OR gate 726a and b via carry line 727 to cause the gate 726a and b to either supplement or complement (invert) the output signal from the adder. The brake effort imbalance signal on line 375 is the complement of its actual value for use by the computer components to provide the fail, marginal or satisfactory indication.

Figure 38:
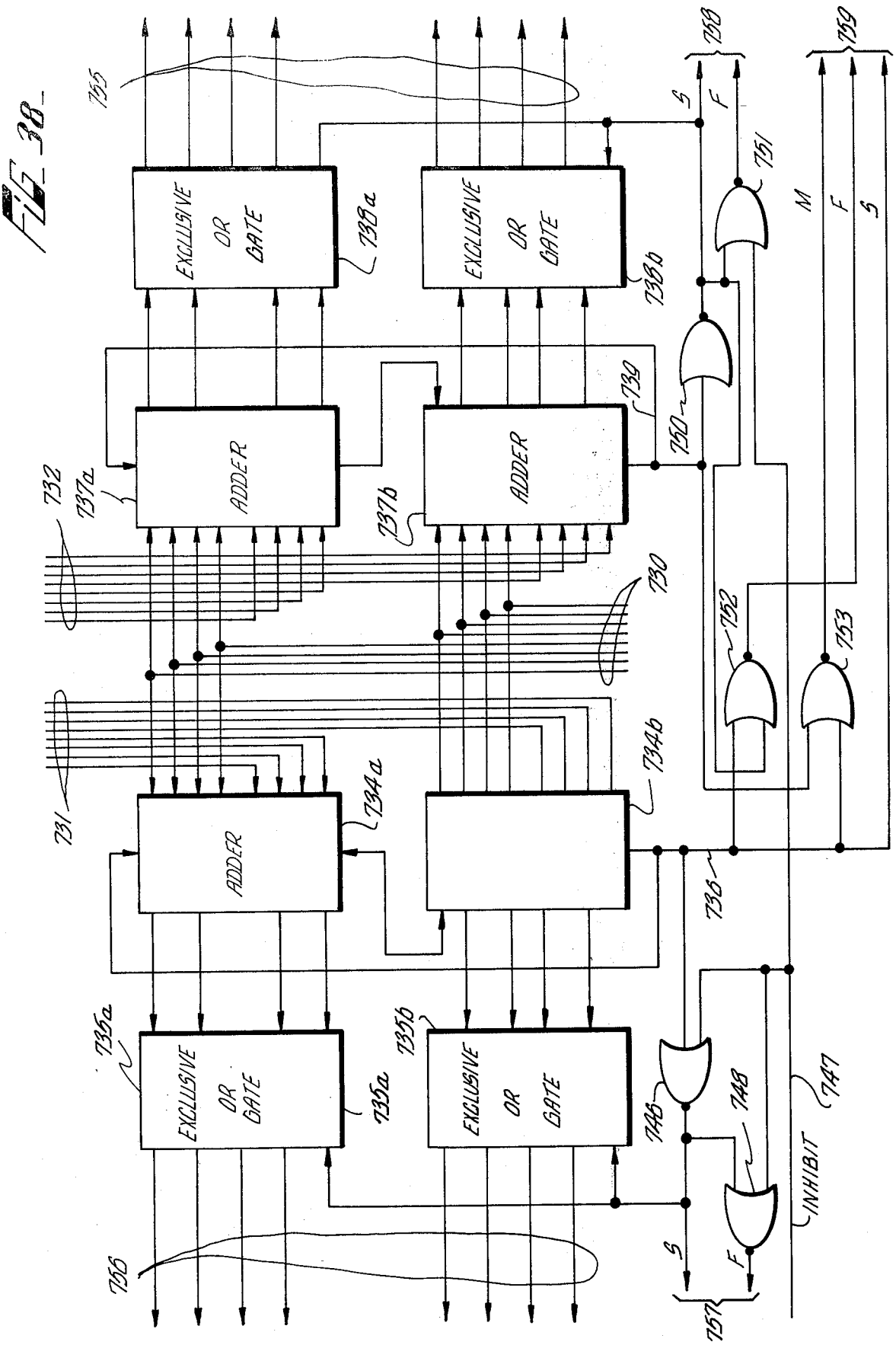
FIG. 38 is a block diagram of a dual subtractor.

Referring now to FIG. 38, a dual subtractor is illustrated which may be utilized as the dual subtractor referred to in each of the foregoing figures. One side of the dual subtractor may be used as the single subtractor referred to in the above figures. The output signals from the dual (or single) subtractors which is used will vary depending upon the particular testing circuit as will be apparent.

The dual subtractor of FIG. 38 includes a first, second and third data input line, 730, 731 and 732, respectively. The data supplied to either the input line 730 or to the two input lines 731 and 732 is in the complemented form so that the output signals on output lines 755 and 756 represent the difference between the values represented by the input signals to lines 730 and 732 and 730 and 731, respectively.

The value represented by the signal on input line 730 is subtracted from the value represented by the signal on line 731 via a first adder 734a, b. The output signal from adder 734a and b is applied to an exclusive OR gate 735a, b for providing an output signal representing the difference in the two input signal values on line 756 for recording or readout purposes, if desired. The OR gate 735 a, b complements or supplements the signal from the adder depending upon the logic of the carry out signal from adder 734 a and b (the most significant bit) on line 736 to provide a true difference output signal on line 756.

An adder 737a, b and an exclusive OR gate 738a, b function in the same manner as elements 734 and 735 to provide a true difference signal in digital format on output line 755. The adders 734a, b and 737a, b produce a carry out signal (e.g. low level) from the most significant bit of the adders on carry out lines 736 and 739 when the value represented by the input signal on line 730 is greater than the values represented by the signals on lines 731 and 732, respectively. The carry out signal on line 736 and an inhibit (or enabling) signal (low level) on line 747 from the programmer 440 are applied to a NOR gate 746. A low level signal on line 736 is indicative of the fact that the value of the data represented by line 730 is less than the value of the data represented by the signal on line 731 and produces a satisfactory output signal (high level) from the NOR gate 746 on line marked S of an output circuit 757. The output from the NOR gate 746 is also applied to another NOR gate 748 to provide a fail output signal on line F of output circuit 757 indicative of the fact that the value of the data represented by the signal on line 730 has exceeded the value of the data represented by the signal on line 731. NOR gates 750 and 751 function in the same manner to provide a satisfactory or fail signal on lines S or F of output circuit 758 as illustrated, when the value represented by the signal on line 730 is less than or greater than the value represented by the signal on line 732. The dual subtractor thus far described is the only portion of the subtractor card that is used for the subtractor 442 in FIG. 18. In FIG. 18, the input circuits 731 and 732 are connected to lines 372a and 372b respectively, and the output circuits 757 and 578 are connected to gates 446 and 447, respectively.

Where three output signals, e.g. satisfactory, marginal and fail signals, are required from the dual subtractor, an additional pair of NOR gates 752 and 753 are utilized. For example, the NOR gate 753 will produce a true output signal (high level) in response to a carry out signal (low level) on carry out line 736 and the absence of a carry out signal (high level) on carry out line 737. The NOR gate 752 is connected to provide a true or high level output signal on line F of output circuit 759 indicating a fail condition in the presence of a carry out signal (low level) on line 739. In the absence of a carry out signal on either carry out line 736 or 737, then a high level signal will be supplied on output line S of output circuit 759 indicating a satisfactory condition. Thus an output signal (high level) on line F, M or S of output circuit 759 indicates that the value represented by the signal on input line 730 is (a) greater than the value represented by the signal on line 731, (b) less than the value represented by the signal on line 731 and greater than the value represented by the signal on line 732, and (c) less than the value represented by the signal on line 732, respectively.

The dual subtractor illustrated in FIG. 38 may be used as the dual subtractors 459 (FIG. 18), 488 (FIG. 20), 512 (FIG. 22), 545 (FIG. 24), 563 (FIG. 26), 577 (FIG. 27), 586 (FIG. 28) 597 (FIG. 29) 617 and 628 (FIG. 30) and 664 and 666 (FIG. 32) with the input lines 731 and 732 connected to the satisfactory and marginal preset limit storage elements, respectively, and the input line 730 connected to receive the brake effort imbalance signal, etc..

One side of the dual subtractor may be used as the single subtractors illustrated in the foregoing figures by connecting one input data signal to input line 730 and connecting the other input data signal to input line 731. The output may be taken from output circuit 756 where a signal representing the difference between the values of the input signals is desired. Where the output signal of the single subtractors is indicative of only whether or not the value of one input signal has exceeded the value of the other input signal (e.g. subtractor 390 of FIG. 20) then the output may be taken from output circuit 757.

Referring now to FIG. 39, there is illustrated a two pole bi-lateral switch which may be utilized as the readout gating circuits 446 and 447 (FIG. 18), and 622 and 633 (FIG. 30). The gating circuit of FIG. 39 includes a pair of field effect transistors 760 and 761 with the control electrodes thereof connected to the programmer readout command line. The drain and source electrodes of the transistor are connected between the S and F signal lines and gate electrodes of silicon controlled rectifiers 762 and 763 as shown. When enabled by a readout command signal from programmer 440, the switch 760 transfers the high level signal present on either the S or F input line to the gate electrode of the associated silicon controlled rectifier, 762 or 763 to cause the rectifier to conduct and energize one of the indicating lamps 450 or 452. Once a silicon controlled rectifier is fired by the transfer of a high level gating signal from the gate 760, the rectifier will remain conducting until the positive bias is removed from the anode and the associated lamp by the computer programmer to ready the circuitry for a new testing sequence. Thus the lamp 450 or 452 will remain energized after the completion of the testing sequence on any particular vehicle to inform the operator of the test results.

Referring now to FIG. 40, a gating circuit is illustrated which may be employed as the gating circuits 462 (FIG. 18) 485 (FIG. 20), 510 (FIG. 22), 540 (FIG. 24), 558 (FIG. 26) and 588 (FIG. 28). The gating circuit of FIG. 40 receives as an input signal (high level) a satisfactory, marginal or fail signal on lines S, M and F, respectively. The gating circuit of FIG. 40 also receives the highest brake effort identification signal on line 376 and the program readout command signal from the programmer 440. The gating circuit 40 includes five NAND gates 765, 766, 767, 768 and 769 which are arranged in the circuit as illustrated to determine which is the marginal or failing brake (e.g. weakest brake). A pair of gates 770 and 771 (similar to gate 760 of FIG. 39) are provided to transfer high level signals in the M or F input line to the gate electrode of the associated silicon controlled rectifier when enabled by the application of an appropriate control signal to control lines 772 and 773, respectively. When the signal on input line 376 indicates that the left wheel brake is weakest, then gate 771 will be enabled (by a high level signal on control line 773) to transfer a marginal or fail signal to the left marginal (M) or fail (F) indicating lamps as shown. The right gate 770 functions in a like manner. When a high level signal is received on the satisfactory or S input line, then both gates 770 and 771 are enabled and both satisfactory lamps are energized as is shown. The silicon controlled rectifiers and associated lamp operate in the same manner as the ones described in FIG. 39.

The gating circuit 558 of FIG. 28 is identical to the gating circuit of FIG. 40 with the exception that the signals to NAND gates 767 and 765 indicate whether the highest pedal pressure is front or rear rather than which brake is weakest.

When the readout gating circuit such as gating circuit 580 of FIG. 27 simply transfers the signals on a set of input lines to the same number of output lines, than a simple gate such as 770 may be used.

Referring now to FIG. 41, the sampling gate, storage and priority curcuit, left or right readout command circuit and the readout gating circuit of FIG. 20 are illustrated. The dual subtractor 596 of FIG. 29 may be as described in FIG. 38. The satisfactory, marginal and fail output signals from the subtractor 597 are applied to a sample gate 598 which may be like gate 770 of FIG. 40. The sample gate 598 is utilized for the continuous sensing of the satisfactory, marginal and fail signal lines from subtractor 597 during the high level brake effort test.

The storage and priority circuit 599 consists of latching NOR gates 780 through 785, connected in a priority configuration as illustrated to continually sample and store the existing conditions of the satisfactory, marginal and fail signals from the sampling gate 598. The highest priority signal is the fail signal on line F, the second highest priority signal is the marginal signal on line M, and the lowest priority signal is the satisfactory signal on line S. The priority circuit 599 provides output signals on output lines S, M and P to gating circuits 601 and 602. A marginal input signal on line M to the priority circuit during the high level test will change a satisfactory output signal (high level on output line S) to a marginal output signal (high level on output line M). A fail input signal on line F to the priority circuit 599 will change a satisfactory or marginal output panel to a fail output signal (high level on output line F).

During the high level testing period, the left or right readout command circuit 600 senses the highest brake effort identification signal each time that the output signal from the priority circuit 599 changes. The left or right readout command circuit 600 includes one shot multivibrators 787, 788, NAND gates 790, 791, 792, 793, 794 and NOR gates 795, 796, 797, 798 and 799 connected as shown. The readout command circuit 600 stores a signal (e.g. high level in output of NAND gates 794 or 791) indicative of the weakest brake, left or right, respectively. Upon completion of the high level test, the programmer applies a readout command signal to the left or right readout command circuit 600 and the circuit applies an enabling signal on control lines 786a or 786b to transfer the marginal or fail output signals from the priority circuit 599 to the proper right or left indicating lamp. A satisfactory output signal on line S from the priority circuit 599 energizes both satisfactory indicating lamps as illustrated.

A sampling gate, storage and priority circuit and a reversal identification circuit which may be utilized in the circuit of FIG. 30 are illustrated in FIG. 42. Only the circuits associated with the right wheel brake performance are illustrated in FIG. 42 since the right and left circuits are identical. The sample gate 626 may be of the type shown in FIG. 40 by the numeral 770. The storage and priority circuit 619 may also be the same as the circuit 599, described in FIG. 41. The readout gating circuits 620 and 622 may be of the type shown in FIGS. 40 and 39 by the reference numerals 770 and 760, respectively.

The reversal identification circuit 621 utilizes four NAND gates 800 through 803 and two NOR gates 804 and 805 to monitor any change in the input signals to the storage and priority circuit 619. If the input signal (high level) to the priority circuit 619 changes from a marginal or fail signal (on input line M or F) and then back to satisfactory or marginal signal on input line M or S, respectively, the reversal indicating circuit 621 will provide an output signal (high level) on output line F to gate 622. This output signal will energize the associated fail lamp through readout gating circuit 622 when the gating circuit 622 is enabled by a readout command signal from the programmer 440 at the end of the high level test. At the end of the high level test, the proper fail, marginal or satisfactory indicator lamp will also be energized through gating circuit 620 as has been discussed in reference to the preceding figure.

Referring now to FIG. 43, there is illustrated a simplified magnitude comparator (four digits only) of the type that may be utilized for comparator 538 (FIG. 23), 502 (FIG. 21), 506 and 507 (FIG. 22), 538 (FIG. 24), 556 (FIG. 26), and 572 (FIG. 27). While the magnitude comparator is illustrated as comparing two four bit words with A0 through A3 representing one word and B0 through B3 representing the second word, multiple comparators of the type shown may be connected together to compare large bit words in a conventional manner. The comparator provides three output signals on output lines 820, 821 and 822, indicating that word A is greater than word B, word A is less than word B, and word A is equal to word B, respectively. The output lines 820 and 822 may be coupled to an OR gate to provide a single output signal, representing the condition that A is equal to or greater than B. The comparator utilizes eight inverters 823 through 830, nineteen NAND gates 831 through 849 and six NOR gates 850 through 855, connected as illustrated.

The programmer is arranged in a conventional manner to reset the appropriate counters, storage elements, gates and switches (i.e. silicon controlled rectifiers which control the readout indicating lamps) etc., before a new test sequence is commenced.

There has been described a method and apparatus for analyzing the performance of wheeled land vehicle brake systems.

It is understood, of course, that the forms of the invention shown and described herein constitute a preferred embodiment and several variations thereof, and that it is not intended to illustrate all of the possible forms or ramifications of the invention. For example, the brake analyzer may be used to test hydraulic, pneumatic or mechanical brakes. Where pneumatic brakes are tested the hydraulic restriction test provides data concerning restrictions in the fluid or air lines which connect the wheel brakes to the centrally located brake actuator. For this reason, the hydraulic restriction test is sometimes referred to as the fluid restriction test.

It should also be noted that the present invention may be used to test vehicle braking systems in which the vehicle brake actuator sytem includes a brake control lever which applies the brakes in accordance with the lever position.

The brake analyzer apparatus and method of my invention described above measures and compares certain braking performance characteristics such as brake effort imbalance when the strongest brake reaches a predetermined brake effort, e.g. pre-hydraulic, comfort level and high level. It should be understood that the brake effort level used for such tests may be the sum of the individual brake efforts of the two wheel brakes under test instead of the brake effort reached by the strongest brake. It is only necessary that at least one of the brake effort signals (e.g. one or the sum of both signals) reach a signal representative of a pre-established brake effort to analyze certain of the vehicle braking performance characteristics discussed above.

The high level brake effort test sequence is designed to cause the brakes to absorb an amount of energy substantially equivalent to that required to stop the vehicle from a speed of at least 60 miles per hour at a rate of at least 0.5 g average deceleration. In the preferred embodiment, the high level tests are conducted with the dynamometer rollers driving the vehicle wheels at a speed simulating approximately 45 miles per hour and the brakes applied to provide a retarding force of 0.3 to 0.5 of the vehicle axle weight on the wheels being tested for a period of 5 to 6 seconds. The vehicle wheel speed braking effort time can, of course, be varied.

The language used herein involves words of description rather than of limitation, so that various changes in relative size, shape and arrangement of parts can be made without departing from the principles of the invention.

What is claimed is:

1. Apparatus for analyzing the performance of the brakes on the wheels of a vehicle while force is being applied thereto by a brake actuator, comprising:

test means for rotating at least one pair of wheels of the vehicle;

means for separately and continuously measuring the brake effort of each of the brakes of said wheels as the brake actuator is operated;

recording means actuated by said measuring means and including means for simultaneously and continuously recording the variations, if any, in brake effort on each wheel, the imbalance in brake effort, if any between the wheel brakes, and the degree of brake actuator operation;

a computer connected in circuit with said recorder for comparing the recorder values with pre-established stndard values for the test being conducted; and a printer connected with the computer, for printing the variations in the test values from the standard values.

2. Apparatus for analyzing the performance of the brakes on four wheels of a vehicle while force is being applied thereto by a brake actuator, comprising: test means for simultaneously rotatng all four wheels of the vehicle at substantially the same speed; means for separately measuring the value of the brake effort of each of the brakes of said wheels as force is exerted upon the vehicle brake actuator to apply the brakes, means for measuring the degree of brake actuator operation; recorder means actuated by said measuring means and including means for simultaneously and continuously recording the values in brake effort on each wheel and for recoring the value of the degree of brake actuator operation, the recorder means comprising: an eight channel recorder including first and second channels for recording the value of the brake effort applied to the left and right front wheels and a third channel for recording the value of the differential, if any, in brake effort applied to said front wheels, fourth and fifth channels for recording the value of the brake effort applied to the left and right rear wheels and a sixth channel for recording the value of the differential, if any, in brake effort applied to said rear wheels, a seventh channel for recording the value of the differential, if any in brake effort applied to said rear wheels, a seventh channel for recording the value of the differential, if any, in the brake effort applied to the front and rear wheels, and an eighth channel for recording the value of the degree of brake actuator operation.

3. Apparatus as defined in claim 2, in which each means for rotating a wheel of the vehicle actuates means for producing an electrical signal proportional to the value of the brake effort applied to the respective wheels; conductors through which the signal is transmitted to pre-amplifiers, there being one pre-amplifier for each wheel; conductors for transmitting the signal from said pre-amplifiers to the recorder means; differential amplifiers connected in circuit to receive the signal from the pre-amplifiers associated with the front and rear wheels, respectively; conductors for transmitting the differential signal from said differential amplifiers to the recorder means; and additional differential amplifiers connected to receive the signals from the aforementioned differential amplifiers and a conductor for transmitting such signal to the recorder means; and means connected with the brake actuator for producing an electrical signal proportional to the degree of brake actuator operation; and conductors for transmitting the same to a pre-amplifier and to said recorder means.

4. The method of analyzing the operation and effectiveness of vehicle brakes, comprising the steps of: rotating the vehicle wheels with the brakes released to determine the rolling resistance of the respective wheels; gradually applying the brakes to a moderate magnitude of brake effort above the rolling resistance and holding the same for a time sufficient to obtain an indication of the brake effort and then gradually releasing the brake and recording the values of the brake effort exerted on each of the vehicle wheels; rapidly applying the brakes to a moderate magnitude of brake effort above the rolling resistance and quickly releasing the brake and recording the values of the brake effort exerted on each of said wheels; gradually applying the brakes to an appropriate high level and holding said application substantially constant for several seconds and then releasing the brake as in normal operation and recording the values of the brake effort exerted on each of said wheels; and comparing the foregoing recorded values with a standard set of values to detect any malfunctioning in the brakes.

5. The method defined in claim 4, including the step of associating with the recorded values, at least one grid having standard test values for comparison and determination of deviations from the standard values.

6. The method defined in claim 4, including the step of positioning an overlay having standard test values over the recorded values for comparison and determining deviation from said standard values.

7. The method of analyzing vehicle brake operation and effectiveness, comprising the steps of: rotating the vehicle wheels with the brakes released to determine the rolling resistance of the respective wheels; gradually applying pressure to the brakes of a moderate magnitude of 50 to 70 pounds brake effort above the rolling resistance, and holding such pressure for 1 to 2 seconds and then gradually releasing the pressure and recording the values of the brake effort exerted on each of the vehicle wheels; rapidly applying pressure to the brakes of a moderate magnitude of 50 to 70 pounds brake effort above the rolling resistance and quickly releasing the pressure and recording the values of the brake effort exerted on each of said wheels; gradually applying pressure to the brakes to an appropriate high level of 0.3 to 0.5 of the vehicle axle weight on the wheels being tested and holding said pressure constant for 5 to 6 seconds and then releasing the pressure as in normal operation and recording the values of the brake effort exerted on each of said wheels; and comparing the foregoing recorded values with a standard set of values to detect any malfunctioning in the brakes.

8. The method of analyzing the operation and effectiveness of vehicle brakes, comprising the steps of: rotating at least one pair of vehicle wheels with the brakes released to determine the rolling resistance of the respective wheels; grdually applying the brakes to a moderate magnitude of brake effort above the rolling resistance and holding the same for a time sufficient to obtain an indication of the brake effort and then gradually releasing the brake and recording the value of the brake effort exerted on one wheel of a pair of the vehicle wheels, and recording the differential of the values of the brake effort exerted on both wheels of said pair; rapidly applying the brakes to a moderate magnitude of brake effort above the rolling resistance and quickly releasing the brake and recording the value of the brake effort exerted on said one wheel of said pair of vehicle wheels, and recording the differential of the values of the brake effort exerted on both wheels of said pair; gradually applying the brakes to an appropriate high level and holding said application substantially constant for a time sufficient to obtain an indication of brake effort from cool to hot brakes as required and then releasing the brake as in normal operation and recording the value of the brake effort exerted on said one wheel of said pair of vehicle wheels, and recording the differential of the values of the values of the brake effort exerted on both wheels of said pair; and comparing the foregoing recorded values with a standard set of values to detect any malfunctioning in the brakes.

9. The method defined in claim 8, including the step of recording the degree of brake application for each brake effort exerted on the wheels.

10. In an apparatus for analyzing the braking performance of a wheeled vehicle having wheel brakes individually associated with at least two wheels, the combination which comprises:

test means for rotating said wheels of the vehicle for a test period during which the brakes are applied;

brake effort signal generating means including the test means for producing a separate brake effort signal for each wheel, each brake effort signal being proportional to the braking effort of the respective wheel while the wheel brakes are being applied;

test level signal generating means for monitoring the brake effort signals and for producing a test level signal when at least one of the brake effort signals reaches a value representing a pre-established level of brake effort; and output signal generating means responsive to the brake effort signals for producing an output signal having a time duration in excess of the test period when the brake effort signals fall within or outside of a predetermined acceptable range.

11. The combination as defined in claim 10 wherein the output signal generating means produces a marginal output signal when the brake effort signals fall within a preset marginal range.

12. The combination as defined in claim 10 wherein the output signal represents a fail condition wherein at least one of the brake effort signals falls outside of a predetermined range representing acceptable deviations from a standard value.

13. The combination as defined in claim 10 including brake effort imbalance signal generating means responsive to the brake effort signals for each wheel for producing a brake effort imbalance signal representative of the difference between the braking effort of the two wheels.

14. The combination as defined in claim 13 including means responsive to the brake effort imbalance signal for producing an output brake effort imbalance signal when the brake effort imbalance signal exceeds or remains below a maximum preset imbalance value.

15. In an apparatus for analyzing the braking performance of a wheeled vehicle having wheel brakes individually associated with at least two wheels, the combination which comprises:
   test means for rotating said wheels of the vehicle for a test period during which the brakes are applied;
   brake effort signal generating means including the test means for producing a separate brake effort signal for each wheel, each brake effort signal being proportional to the braking effort of the respective wheels while the wheel brakes are being applied;
   output signal generating means responsive to the brake effort signals for producing an output signal having a time duration in excess of the test period when the brake effort signals fall within or outside of a predetermined acceptable range; and
   means responsive to the brake effort signals for producing a highest brake effort identification signal for identifying the particular wheel brake which is providing the largest or smallest brake effort.

16. In an apparatus for analyzing the braking performance of a wheeled vehicle having wheel brakes individually associated with at least two wheels, the combination which comprises:
   test means for rotating said wheels of the vehicle for a test period during which the brakes are applied;
   brake effort signal generating means including the test means for producing a separate brake effort signal for each wheel, each brake effort signal being proportional to the braking effort of the respective wheels while the wheel brakes are being applied;
   means including the brake effort signal generating means for producing a separate rolling resistance signal for each wheel, the rolling resistance signal being proportional to the rolling resistance of each wheel without the application of the wheel brakes;
   means responsive to the rolling resistance signals for producing a rolling resistance imbalance signal representative of the difference between the rolling resistance signals;
   means responsive to the rolling resistance imbalance signal for producing an unacceptable rolling resistance imbalance signal when the rolling resistance imbalance signal exceeds a maximum acceptable rolling resistance imbalance;
   indicating means responsive to the unacceptable rolling resistance imbalance signal for providing a recorded indication thereof; and
   means responsive to the rolling resistance signals for producing a highest rolling resistance identification signal for identifying the particular wheel brake which has the largest or smallest rolling resistance.

17. The combination as defined in claim 16 including storage means for storing the rolling resistance imbalance signal.

18. In an apparatus for analyzing the braking performance of a wheeled vehicle having wheel brakes individually associated with at least two wheels, the combination which comprises:
   test means for rotating said wheels of the vehicle for a test period during which the brakes are applied;
   brake effort signal generating means including the test means for producing a separate brake effort signal for each wheel, each brake effort signal being proportional to the braking effort of the respective wheels while the wheel brakes are being applied;
   means including the brake effort signal generating means for producing a separate rolling resistance signal for each wheel, the rolling resistance signal being proportional to the rolling resistance of each wheel without the application of the wheel brakes;
   means responsive to the rolling resistance signals for producing a rolling resistance imbalance signal representative of the difference between the rolling resistance signals;
   storage means for storing the rolling resistance imbalance signal;
   net braking effort imbalance signal generator means responsive to the brake effort signals and to the rolling resistance imbalance signal for producing a net braking effort imbalance signal representative of the difference between the gross braking effort imbalance and the rolling resistance imbalance of the wheels; and
   output signal generating means responsive to the net braking effort imbalance signal for producing an output signal having a time duration in excess of the test period when the net braking effort imbalance falls within or outside of a predetermined acceptable range.

19. The combination as defined in claim 18 wherein the brake effort signal generating means is arranged to produce a separate gross braking signal for each wheel, the gross braking effort signal being proportional to the sum of the rolling resistance and brake effort of each respective wheel while the wheel brakes are being applied, and wherein the net braking effort signal generator means includes:
   means responsive to the gross braking effort signals for producing a gross braking effort imbalance signal representative of the difference between the gross braking effort signals; and
   means responsive to the stored rolling resistance imbalance signal and the gross braking effort imbalance signals for producing a net braking effort imbalance signal proportional to the difference between the gross braking effort imbalance and the rolling resistance imbalance.

20. In an apparatus for analyzing the braking performance of a wheeled vehicle having wheel brakes individually associated with at least two wheels, the combination which comprises:
   test means for rotating said wheels of the vehicle for a test period during which the brakes are applied;
   brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range;

brake effort imbalance signal generating means responsive to the brake effort signals for each wheel for producing a brake effort imbalance signal representative of the difference between the braking effort of the two wheels; and brake engagement lag imbalance signal generating means responsive to the brake effort signals; and to the brake effort imbalance signal for producing a brake engagement lag imbalance signal representative of the value of the brake effort imbalance when the last to engage brake has engaged upon application of the wheel brakes.

21. The combination as defined in claim 20 including means responsive to the brake effort signals for producing a highest brake effort identification signal for identifying the particular wheel brake which is providing the largest or smallest brake effort.

22. The combination as defined in claim 20 wherein the brake engagement lag imbalance signal generating means includes means for producing a brake engagement lag signal when the last to engage brake has engaged upon application of the wheel brakes, and means responsive to the brake engagement lag signal and to the brake effort imbalance signal for producing the brake engagement lag imbalance signal representative of the value of the brake effort imbalance upon occurrence of the brake engagement lag signal.

23. The combination as defined in claim 22 including:
means responsive to the brake engagement lag imbalance signal for producing fail brake engagement lag imbalance signal when the brake engagement lag imbalance signal exceeds a preset maximum acceptable lag imbalance value.

24. The combination as defined in claim 22 including means responsive to the brake engagement lag imbalance signal for producing a marginal brake engagement lag imbalance signal when the brake engagement lag imbalance signal falls within a preset range of lag imbalance values.

25. The combination as defined in claim 22 including means responsive to the brake engagement lag imbalance signal for producing a satisfactory brake engagement lag imbalance signal when the brake engagement lag imbalance signal falls within a pre-determined acceptable range.

26. The combination as defined in claim 20 wherein the brake effort imbalance signal generating means includes:
means responsive to the brake effort signal generating means when the brakes are released for producing and storing a rolling resistance imbalance signal representative of the difference between the values of rolling resistance of the two wheels; and
means responsive to the stored rolling resistance imbalance signal and to the brake effort signals when the brakes are applied for producing a net brake effort imbalance signal representative of the difference between the gross braking effort imbalance and the rolling resistance imbalance of the wheels.

27. In an apparatus for analyzing the braking performance of a wheeled vehicle having wheel brakes individually associated with at least two wheels, the combination which comprises:

test means for rotating said wheels of the vehicle for a test period during which the brakes are applied;

brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range;

brake effort imbalance signal generating means responsive to the brake effort signals for each wheel for producing a brake effort imbalance signal representative of the difference between the braking effort of the two wheels; and brake disengagement lag imbalance signal generating means responsive to the brake effort signals and to the brake effort imbalance signal for producing a brake disengagement lag imbalance signal representative of the value of the brake effort imbalance when the first to disengage brake has disengaged after the wheel brakes have been released.

28. The combination as defined in claim 27 including means responsive to the brake effort signals for producing a highest brake effort identification signal for identifying the particular wheel brake which is providing the largest or smallest brake effort.

29. The combination as defined in claim 27 wherein the brake disengagement lag imbalance signal generating means includes:
means responsive to the brake effort signals for producing a brake disengagement lag signal when the first to disengage brake had disengaged after the wheel brakes have been released; and
means responsive to the brake disengagement lag signal and the other brake effort imbalance signal for producing the brake disengagement lag imbalance signal representative of the value of the brake effort imbalance upon occurrence of the brake disengagement lag signal.

30. The combination as defined in claim 29, including:
means responsive to the brake disengagement lag imbalance signal for producing a fail brake disengagement lag imbalance signal when the brake disengagement lag imbalance signal exceeds a preset maximum acceptable lag imbalance value.

31. The combination as defined in claim 29 including means responsive to the brake disengagement lag imbalance signal for producing a marginal brake disengagement lag imbalance signal when the brake disengagement lag imbalance signal falls within a preset range of lag imbalance values.

32. The combination as defined in claim 29 including means responsive to the brake disengagement lag imbalance signal for producing a satisfactory brake disengagement lag imbalance signal when the brake disengagement lag imbalance signal falls within a predetermined acceptable range of imbalance values.

33. The combination as defined in claim 29 wherein the brake effort imbalance signal generating means includes:
- means responsive to the brake effort signal generating means when the brakes are released for producing and storing a rolling resistance imbalance signal representative of the difference between the values of rolling resistance of the two wheels; and
- means responsive to the stored rolling resistance imbalance signal and to the brake effort signals when the brakes are applied for producing a net brake effort imbalance signal representative of the difference between the gross braking imbalance and the rolling resistance imbalance of the wheels.

34. In an apparatus for analyzing the braking performance of a wheeled vehicle having wheel brakes individually associated with ate least two wheels, and a brake actuator for simultaneously applying the brakes to said two wheels, the combination which comprises:
- test means for rotating said wheels of the vehicle for a test period during which the brakes are applied;
- brake effort signal generating means including the test means for producing a separate brake effort signal for each wheel, each brake effort signal being proportional to the braking effort of the respective wheels while the wheel brakes are being applied;
- output signal generating means responsive to the brake effort signals for producing an output signal having a time duration in excess of the test period when the brake effort signals fall within or outside of a predetermined acceptable range;
- brake actuator sensor means for producing a brake sensor signal upon operation of the brake actuator; and
- means responsive to the brake effort signals and to the brake sensor signal for producing a brake system response signal proportional to the time delay between the operation of the brake actuator and the engagement of the first brake to engage.

35. The combination as defined in claim 34 including means responsive to the brake system response signal for producing a fail system response signal when the brake system response signal exceeds a preset maximum acceptable value.

36. The combination as defined in claim 34 including means responsive to the brake system response signal for producing a marginal system response signal when the brake system response signal falls within a preset marginal range of values.

37. The combination as defined in claim 34 including means responsive to the brake system response signal for producing a satisfactory system response signal when the brake system response signal falls within a predetermined acceptable range of values.

38. In an apparatus for analyzing the braking performance of a wheeled vehicle having wheel brakes individually associated with at least two wheels, the combination which comprises:
- test means for rotating said wheels of the vehicle for a test period during which the brakes are applied;
- brake effort signal generating means including the test means for producing a separate brake effort signal for each wheel, each brake effort signal being proportional to the braking effort of the respective wheels while the wheel brakes are being applied;
- brake effort imbalance signal generating means responsive to the brake effort signals for each wheel for producing a brake effort imbalance signal representative of the difference between the braking effort of the two wheels;
- test level signal generating means responsive to the brake effort signals upon application of the wheel brakes for producing a test level signal when at least one of the brake effort signals reaches a signal representative of a preestablished brake effort; and
- output signal generating means responsive to the brake effort imbalance signal for producing an outlet signal having a time duration in excess of the test period when the brake effort imbalance signal falls within or outside of a predetermined acceptable range.

39. The combination as defined in claim 38 including means responsive to the test level signal and to the brake effort imbalance signal for producing a fail test level imbalance signal when the brake effort imbalance exceeds a maximum preset imbalance.

40. The combination as defined in claim 38 including means responsive to the brake effort signal for producing a highest brake effort identification signal for identifying the particular wheel brake which is providing the largest or smallest brake effort.

41. The combination as defined in claim 38 including means responsive to the test level signal and to the brake effort imbalance signal for producing a marginal test level imbalance signal when the brake effort imbalance signal falls within a preset marginal range of values.

42. The combination as defined in claim 38 including means responsive to the test level signal and to the brake effort imbalance signal for producing a satisfactory test level imbalance signal when the brake effort imbalance signal falls within a predetermined acceptable range of values.

43. The combination as defined in claim 38 wherein the pre-established brake effort represents the fluid restriction brake effort testing level, and wherein the brake effort imbalance signal generating means includes:
- means for producing and storing a mechanical and rolling resistance imbalance signal representative of the gross brake effort imbalance between the wheels when the brakes are applied for a predetermined period at a precalculated brake effort; and
- means for deriving the difference between the gross brake effort imbalance and the mechanical and rolling resistance imbalance between the wheels.

44. The combination as defined in claim 43 wherein the vehicle is provided with a manually controlled, force responsive brake actuator for providing a braking effort which varies in accordance with the magnitude of the force applied to the brake actuator and further including brake actuator control means for rapidly applying a force to the brake actuator.

45. The combination as defined in claim 38 wherein the pre-established brake effort represents the comfort brake effort testing level and wherein the brake effort imbalance signal generating means includes:
- means for producing and storing a rolling resistance imbalance signal representative of the rolling resistance imbalance between the wheels when the brakes are released; and pedal force signal generating means for producing a pedal force signal representative of the force applied to the brake pedal; and means responsive to the pedal force signal when at least one brake effort signal reaches a value representative of a preestablished brake effort for producing an output pedal force signal when the pedal force signal exceeds or remains within a maximum acceptable preset value.

46. In an apparatus for analyzing the braking performance of a wheeled vehicle having wheel brakes individually associated with at least two wheels, the combination which comprises:

test means for rotating said wheels of the vehicle for a test period during which the brakes are applied;
brake effort signal generating means including the test means for producing a separate brake effort signal for each wheel, each brake effort signal being proportional to the braking effort of the respective wheels while the wheel brakes are being applied;
brake effort imbalance signal generating means responsive to the brake effort signals for each wheel for producing a brake effort imbalance signal representative of the difference between the braking effort of the two wheels;
means responsive to the brake effort signals for producing a highest brake effort identification signal for identifying the particular wheel brake which is providing the largest or smallest brake effort; and
output signal generating means responsive to the brake effort imbalance signal for producing an output of signal having a time duration in excess of the test period when the brake effort imbalance falls within or outside of a predetermined acceptable range.

47. In an apparatus for analyzing the braking performance of a wheeled vehicle having wheel brakes individually associated with at least two wheels, the combination which comprises:

test means for rotating said wheels of the vehicle for a test period during which the brakes are applied;
brake effort signal generating means including the test means for producing a separate brake effort signal for each wheel, each brake effort signal being proportional to the braking effort of the respective wheels while the wheel brakes are being applied;
brake effort imbalance signal generating means responsive to the brake effort signals for each wheel for producing a brake effort imbalance signal representative of the difference between the braking effort of the two wheels;
means for monitoring the brake effort imbalance signal after at least one of the brake effort signals reaches a signal representative of a pre-established high level brake effort, during the test period and for producing a fail high level brake effort imbalance signal when the brake effort imbalance exceeds a maximum acceptable imbalance during the test period; and
indicating means responsive to the fail high level brake effort imbalance signal for providing a recorded indication thereof which has a time duration in excess of the test period.

48. In an apparatus for analyzing the braking performance of a wheeled vehicle having wheel brakes individually associated with at least two wheels, the combination which comprises:

test means for rotating said wheels of the vehicle for a test period during which the brakes are applied;
brake effort signal generating means including the test means for producing a separate brake effort signal for each wheel, each brake effort signal being proportional to the braking effort of the respective wheels while the wheel brakes are being applied;
brake effort imbalance signal generating means responsive to the brake effort signals for each wheel for producing a brake effort imbalance signal representative of the difference between the braking effort of the two wheels;
means for monitoring the brake effort imbalance signal after at least one of the brake effort signals reaches a signal representative of a pre-established high level brake effort, during the test period and for producing a marginal high level brake effort imbalance signal when the brake effort imbalance falls within a preset marginal imbalance range of values during the test period; and
indicating means responsive to the marginal high level brake effort imbalance signal for providing a recorded indication thereof which has a time duration in excess of the test period.

49. In an apparatus for analyzing the braking performance of a wheeled vehicle having wheel brakes individually associated with at least two wheels, the combination which comprises:

test means for rotating said wheels of the vehicle for a test period during which the brakes are applied;
brake effort signal generating means including the test means for producing a separate brake effort signal for each wheel, each brake effort signal being proportional to the braking effort of the respective wheels while the wheel brakes are being applied;
brake effort imbalance signal generating means responsive to the brake effort signals for each wheel for producing a brake effort imbalance signal representative of the difference between the braking effort of the two wheels;
means for monitoring the brake effort imbalance signal after at least one of the brake effort signals reaches a signal representative of a pre-established high level brake effort during the test period and for producing a satisfactory high level brake effort imbalance signal when the brake effort imbalance is less than a pre-determined maximum acceptable imbalance during the test period; and
indicating means responsive to the satisfactory high level brake effort imbalance signal for providing a recorded indication thereof which has a time duration in excess of the test period.

50. In an apparatus for analyzing the braking performance of a wheeled vehicle having wheel brakes individually associated with at least two wheels, the combination which comprises:

test means for rotating said wheels of the vehicle for a test period during which the brakes are applied;
brake effort signal generating means including the test means for producing a separate brake effort signal for each wheel, each brake effort signal being proportional to the braking effort of the respective wheels while the wheel brakes are being applied;

means for monitoring the brake effort signals while the wheel brakes are being applied at a substantially constant magnitude during a test period of a predetermined time interval;

means for storing each of the brake effort signals when at least one of the brake effort signals reaches a signal representative of a predetermined brake effort;

comparing means for comparing the stored and current brake effort signals during the test period and for producing a separate difference brake effort signal representative of the difference between the stored and current values of the brake effort for each wheel brake; and output signal generating means responsive to the brake effort signals for producing an output signal having a time duration in excess of the test period when the brake effort signals fall within or outside of a predetermined acceptable range.

51. The combination as defined in claim 50 wherein the output signal generating means is responsive to the difference brake effort signals for producing a fail brake effort excursion signal when either of the current brake effort signals exceeds the initial stored value of the respective brake effort by a value above a preset maximum acceptable value.

52. The combination as defined in claim 50 wherein the output signal generating means is responsive to the difference brake effort signals for producing a marginal brake effort excursion signal when either of the current brake effort signals exceeds the initial stored value of the respective brake effort by a value within a preset range.

53. The combination as defined in claim 50 wherein the output signal generating means is responsive to the difference brake effort signals for producing a satisfactory brake effort excursion signal when each of the current brake effort signals remains below the sum of the initial stored value of the respective brake effort and a preset value.

54. The combination as defined in claim 50 wherein the output signal generating means is responsive to the difference brake effort signals for producing a fail brake effort reversal signal when either of the current brake effort signals exceeds the initial stored value of the respective brake effort by a value greater than a preset maximum acceptable value and subsequently decreases below said preset maximum acceptable value during the test period.

55. The combination as defined in claim 50 wherein the output signal generating means is responsive to the difference brake effort signals for producing a fail brake effort reversal signal when either of the current brake effort signals exceeds the initial stored value of the respective brake effort by a value greater than a preset satisfactory value and subsequently decreases below said preset satisfactory value during the test period.

56. The combination as defined in claim 50 wherein the output signal generating means is responsive to the difference brake effort signals for producing a satisfactory brake effort reversal signal when neither of the current brake effort signals exceeds the initial stored value of the respective brake effort by a value greater than a preset value and subsequently decreases below said preset value during the test period.

57. The combination as defined in claim 50 wherein the output signal generating means is responsive to the difference brake effort signals for producing a fail brake effort fade signal when either of the brake effort signals at the end of the test period is less than the initial stored value of the respective brake effort by an amount greater than a preset maximum acceptable value.

58. The combination as defined in claim 50 wherein the output signal generating means is responsive to the difference brake effort signals for producing a marginal brake effort fade signal when either of the brake effort signals at the end of the test period is less than the initial stored value of the respective brake effort by an amount greater than a preset satisfactory value.

59. The combination as defined in claim 50 wherein the output signal generating means is responsive to the difference brake effort signals for producing a satisfactory brake effort fade signal when neither of the brake effort signals at the end of the test period is less than the initial stored value of the respective brake effort minus a preset satisfactory value.

60. In an apparatus for analyzing the braking performance of a wheeled vehicle having wheel brakes individually associated with at least two wheels and wherein the vehicle is provided with a manually controlled, force responsive brake actuator including a brake pedal for providing a braking effort which varies in accordance with the magnitude of the force applied to the brake pedal, the combination which comprises:

test means for rotating said wheels of the vehicle for a test period during which the brakes are applied;

brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range;

pedal force signal generating means for producing a pedal force signal representative of the force applied to the brake pedal; and means responsive to the pedal force signal when at least one brake effort signal reaches a value representative of a preestablished brake effort for producing an output pedal force signal when the pedal force signal exceeds or remains within a maximum acceptable preset value.

61. The combination as defined in claim 60 including means responsive to the pedal force signal when at least one brake effort reaches a value representative of a pre-established brake effort for producing a marginal pedal force signal when the pedal force signal exceeds a satisfactory preset value.

62. The combination as defined in claim 60 wherein the vehicle is provided with a pair of front wheel brakes and a pair of rear wheel brakes and further including:

means coupled to the pedal force signal generator means for storing a first pedal force signal required to produce a first predetermined brake effort on one of said pair of wheel brakes; and comparing means responsive to the stored value of the first pedal force signal and coupled to the pedal force signal generating means for comparing the first pedal force signal with a second pedal force signal as produced when the brake pedal is actuated to apply said other pair of wheel brakes to provide a second predetermined brake effort, the comparing means being arranged to provide a difference pedal force signal representative of the difference between the first and second pedal force signals; and means responsive to the difference pedal force signal for producing a fail pedal force balance signal when the difference between said first and second pedal force signals falls outside of a preset range of values.

63. The combination as defined in claim 62 including means responsive to the difference pedal force signal for producing a marginal pedal force balance signal when the difference between said first and second pedal force signals falls within a preset marginal range of values.

64. The combination as defined in claim 60 wherein the vehicle is provided with a pair of front wheel brakes and a pair of rear wheel brakes and further including:

means coupled to the pedal force signal generator means for storing a first pedal force signal required to produce a first predetermined brake effort on one of said pair of wheel brakes; and comparing means responsive to the stored value of the first pedal force signal and coupled to the pedal force signal generating means for comparing the first pedal force signal with a second pedal force signal as produced when the brake pedal is actuated to apply said other pair of wheel brakes to provide a second predetermined brake effort, the comparing means being arranged to provide a difference pedal force signal representative of the difference between the first and second pedal force signals; and means responsive to the difference pedal force signal for producing a satisfactory pedal force balance signal when the difference between said first and second pedal force signal falls within a preset satisfactory range of values.

65. In an apparatus for analyzing the braking performance of a wheeled vehicle having wheel brakes individually associated with at least two wheels, the combination which comprises:

test means for rotating said wheels of the vehicle for a test period during which the brakes are applied;

brake effort signal generating means including the test means for producing a separate brake effort signal for each wheel, each brake effort signal being proportional to the braking effort of the respective wheels while the wheel brakes are being supplied;

output signal generating means responsive to the brake effort signals for producing an output signal having a time duration in excess of the test period when the brake effort signals fall within or outside or a predetermined acceptable range;

filter means coupled to the brake effort signal generating means for producing a brake rotary member oscillation signal representative of each brake effort signal above a predetermined frequency range; and means for producing a fail oscillation signal when one of said oscillation signals exceeds a pre-established maximum acceptable limit or a satisfactory oscillation signal when each of said oscillating signals remains below an acceptable limit.

66. The combination as defined in claim 65 wherein the predetermined frequency is about 5 $H_z$.

67. In an apparatus for analyzing the braking performance of a wheeled vehicle having wheel brakes individually associated with at least two wheels, the vehicle being provided with a manually controlled, force responsive fluid brake actuator including a brake pedal, the actuator being arranged to apply the brakes when the brake pedal is moved in a predetermined direction, the combination which comprises:

test means for rotating said wheels of the vehicle for a test period during which the brakes are applied;

brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range; and means for monitoring the position of the brake pedal and for producing an output static pedal force signal when the movement of the brake pedal exceeds or remains within a maximum acceptable value during the application of a pre-calculated force to the pedal for a preset time period.

68. In an apparatus for analyzing the braking performance of a wheeled vehicle having wheel brakes individually associated with at least two wheels, the vehicle being provided with a manually controlled, force responsive brake actuator including a brake pedal mounted above the floor board in the vehicle for movement toward the floor board to supply the brakes, the combination which comprises:

test means for rotating said wheels of the vehicle for a test period during which the brakes are applied;

brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range; and means responsive to the movement of the brake pedal for producing an output pedal to floor board distance signal when the distance between the brake pedal and vehicle floor board decreases below or remains above a preset minimum acceptable value.

69. In an apparatus for analyzing the braking performance of a wheeled vehicle having wheel brakes individually associated with at least two wheels, the combination which comprises:

test means including at least one drive roller in rotational engagement with each wheel and motor means for rotating the drive rollers to thereby rotate the wheels of the vehicle for a test period during which the brakes are applied;

brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range; and means responsive to a change in the rotational speed of each wheel when the brakes are applied and the drive rollers are free wheeling for producing a satisfactory anti-skid signal when the rotational speed of each wheel changes in a non-linear manner.

70. In an apparatus for analyzing the braking performance of a wheeled vehicle having wheel brakes individually associated with at least two wheels, the combination which comprises:

test means including at least one drive roller in rotational engagement with each wheel and motor means for rotating the drive rollers to thereby rotate the wheels of the vehicle for a test period during which the brakes are applied;

brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range; and means responsive to a change in the rotational speed of each wheel when the brakes are applied and the drive rollers are freewheeling for producing a fail anti-skid signal when the rotational speed of either wheel changes in a linear manner.

71. In an apparatus for analyzing the braking performance of a wheeled vehicle having wheel brakes individually associated with at least two wheels, and a manually controlled, force responsive brake actuator for providing a braking effort in response to a force applied to the brake actuator, the combination which comprises:

test means for rotating said wheels of the vehicle for a test period during which the brakes are applied;

brake effort signal generating means including the test means for producing a separate brake effort signal for each wheel, each brake effort signal being proportional to the braking effort of the respective wheels while the wheel brakes are being applied;

output signal generating means responsive to the brake effort signals for producing an output signal having a time duration in excess of the test period when the brake effort signals fall within or outside of a predetermined acceptable range;

brake actuator control means having an input circuit and being arranged to apply a force to the brake actuator which varies in accordance with the control signal applied to the input circuit thereof; and means for applying a control to the input circuit of the brake actuator to apply the vehicle brakes.

72. The combination as defined in claim 71 wherein the means for applying a control signal to the input circuit of the brake actuator control means is arranged to selectively apply the brakes at a slow or fast rate.

73. The combination as defined in claim 71 wherein the means for applying a control signal to the input circuit of the brake actuator control means is arranged to provide a predetermined brake effort from at least one of the wheel brakes.

74. The combination as defined in claim 71 wherein the means for applying a control signal to the input circuit of the brake actuator control means is arranged to provide a substantially constant brake effort for a preset time.

75. The method of analyzing the braking performance of a wheeled vehicle having wheel brakes individually associated with at least two wheels comprising the steps of:

rotating said two vehicle wheels with the brakes released and measuring the rolling resistance of the respective wheels;

comparing the measured values of rolling resistance with preset acceptable values to detect a satisfactory or fail rolling resistance condition;

applying the brakes to provide a predetermined level of brake effort in at least one of said brakes and measuring the brake effort in each of said brakes; and comparing the measured values of brake effort with preset acceptable values to detect a malfunctioning of the brakes.

76. The method of claim 75 including the steps of:
measuring the brake effort imbalance between the two wheel brakes, and
comparing the measured value of brake effort imbalance with a preset maximum acceptable value to detect a satisfactory or fail imbalance condition.

77. The method of claim 76 including the steps of:
measuring the rolling resistance imbalance between the wheels, and
comparing the measured value of rolling resistance imbalance with a preset maximum acceptable value to detect a satisfactory or fail rolling resistance imbalance condition.

78. The method of claim 75 including the steps of:
gradually applying the wheel brakes;
measuring the brake effort imbalance at the instant when the last brake to engage engages; and
comparing the measured value of the brake effort imbalance with a preset maxim acceptable value to detect a satisfactory or fail brake effort imbalance.

79. The method of claim 75 including the steps of:
releasing the wheel brakes after the wheel brakes have been applied;
measuring the brake effort imbalance at the instant of disengagement of the first brake to disengage; and
comparing the measured value of brake effort imbalance with a preset maximum acceptable value to detect a satisfactory or fail brake imbalance condition.

80. The method of claim 75 including the steps of:
rapidly applying the wheel brakes to a predetermined magnitude of brake effort;

measuring the brake effort imbalance; and comparing the brake effort imbalance with a preset maximum acceptable value to detect a satisfactory or fail imbalance condition.

81. The method of claim 75 including the steps of:

applying the wheel brakes to a predetermined magnitude of brake effort;

measuring the brake effort imbalance at the time that said predetermined magnitude of brake effort is reached by at least one of the brakes; and comparing the brake effort imbalance with a preset maximum acceptable value to detect a satisfactory or fail imbalance condition.

82. The method of claim 75 incuding the steps of:

applying the wheel brakes until at least one of the brakes reaches a predetermined high level of brake effort;

holding said brake application substantially constant for a predetermined period of time;

measuring the brake effort imbalance during the time that said brakes are applied; and comparing the maximum brake effort imbalance during the time that the brakes are applied at said high level with a preset maximum acceptable value to detect a satisfactory or fail brake imbalance condition.

83. The method of claim 82 including the steps of:

recording the value of the brake effort exerted on each wheel at the time that said high level brake effort is reached;

obtaining the difference between the current and stored values of each of the brake efforts during the time that the brakes are applied at the high level; and comparing the difference between the stored and current values of each brake effort with a preset maximum acceptable value to detect a satisfactory or fail excursion condition.

84. The method of claim 75 wherein the vehicle is provided with a manually controlled, force responsive brake actuator including a brake pedal for providing a braking effort which varies in accordance with the force applied to the brake pedal and including the steps of:

applying the wheel brakes until at least one of the brakes reaches a predetermined high level of brake effort;

measuring the value of pedal force required to obtain said predetermined level of brake effort; and comparing said measured value of pedal force with a preset maximum acceptable value to detect a malfunctioning of the brakes.

85. The method of analyzing the braking performance of a wheeled vehicle having wheel brakes individually associated with at least two wheels comprising the steps of:

rotating the wheels;

applying the wheel brakes; and measuring the brake effort imbalance when the last to engage wheel brake engages.

86. The method of claim 45 including the step of comparing the measured value of brake effort imbalance with a preset maximum acceptable value to detect a malfunctioning of the brakes.

87. The method of claim 85 wherein the measured value of brake effort imbalance is the gross brake effort imbalance and including the steps of:

measuring the rolling resistance imbalance between the wheels;

obtaining the difference between the gross brake effort imbalance and the rolling resistance imbalance when the last to engage brake engages; and comparing the difference between the gross brake effort imbalance and the rolling resistance imbalance with a preset maximum acceptable value to determine a malfunctioning of the brakes.

88. The method of claim 85 including the steps of releasing the wheel brakes after the wheel brakes have been applied, and measuring the brake effort imbalance when the first to disengage brake has disengaged.

89. The method of claim 88 including the step of comparing the brake effort imbalance when the first to disengage brake has disengaged with a preset maximum acceptable value to detect a malfunctioning of the brakes.

90. The method of claim 80 wherein the measured value of brake effort imbalance is the gross brake effort imbalance and including the steps of:

measuring the rolling resistance imbalance between the wheels when the brakes are released;

obtaining the difference between the gross brake effort imbalance and the rolling resistance imbalance when the first to disengage brake disengages;

comparing the difference between the gross brake effort imbalance and the rolling resistance imbalance with a preset maximum acceptable value to detect a malfunctioning of the brakes.

91. The method of analyzing the braking performance of a wheeled vehicle having wheel brakes individually associated with at least two wheels comprising the steps of:

rotating the wheels;

applying the brakes to provide a first predetermined moderate level of brake effort from at least one of the wheel brakes;

measuring the brake effort imbalance during the first application of the brakes;

comparing the brake effort imbalance obtained during the first application of the brakes with a preset maximum acceptable imbalance to detect a malfunctioning of the brakes;

applying the brakes to provide a second predetermined high level of brake effort from at least one of the wheel brakes for several seconds;

measuring the brake effort imbalance during the second application of the brakes; and comparing the brake effort imbalance during the second application of the brakes with a preset maximum acceptable imbalance to detect a malfunctioning of the brakes.

92. The method of claim 91 wherein the brakes are applied at a rate in excess of twenty five pounds of brake effort per second.

93. The method of analyzing the braking performance of a wheeled vehicle having wheel brakes individually associated with at least two wheels and a brake actuator for simultaneously applying the wheel brakes comprising the steps of:

rotating the wheels;

applying the brake actuator to provide a predetermined high level of brake effort of at least 0.3 to 0.5 of the vehicle axle weight on the wheels being tested;

maintaining the application of the brake actuator substantially constant for a predetermined period of time;

measuring the brake effort in each of said wheel brakes;

comparing the measured values of brake effort with preset acceptable values to detect a malfunctioning of the brakes; and continuously measuring the brake effort imbalance during said predetermined period of time, and comparing the maximum brake effort imbalance measured during said predetermined time period with a preset maximum acceptable imbalance to detect a malfunctioning of the brakes.

94. The method of claim 93 including the steps of:

storing the values of brake effort exerted on each of the wheels when the brake effort initially reaches said high level;

continuously monitoring the current brake effort of each wheel brake during said predetermined period of time;

measuring the difference between the monitored current value and the stored initial value of the brake effort of each wheel brake; and wherein the comparing step comprises comparing the difference between the monitored and stored value of the brake effort of each wheel brake with a preset maximum acceptable value to detect a malfunctioning of the brakes.

95. The method of claim 94 including the steps of continuously comparing the difference between the monitored and stored value of the brake effort of each wheel brake with a preset value to detect whether said difference value exceeds and then subsequently falls below said preset value during the test period.

96. The method of claim 93 including the steps of:

storing the values of brake effort exerted on each of the wheels when the brake effort initially reaches said high level;

measuring the brake effort of each wheel brake at the end of said predetermined period of time;

measuring the difference between the stored initial value of the brake effort and the measured value of the brake effort at the end of said predetermined period of each wheel brake; and wherein the comparing step comprises comparing the difference between the measured and stored value of the brake effort of each wheel brake with a preset maximum acceptable value to detect a malfunctioning of the brakes.

97. The method of claim 93 wherein said predetermined period of time is sufficient to absorb an amount of energy substantially equivalent to that required to stop the vehicle from a speed of at least 60 miles per hour at a rate of at least 0.5 g average deceleration.

98. In an apparatus for analyzing the braking performance of a wheeled vehicle having a brake individually associated with at least two wheels, the combination which comprises;

test means for rotating said two wheels of the vehicle for a test period;

rolling resistance signal generating means including the test means for producing a separate rolling resistance signal proportional to the rolling resistance of each wheel without the application of the wheel brakes;

means responsive to the rolling resistance signals for producing a satisfactory rolling resistance signal when each of said rolling resistance signals is less than a preset maximum acceptable rolling resistance value of a fail rolling resistance signal when either of the rolling resistance signals exceeds the preset maximum acceptable rolling resistance value.

99. The combination as defined in claim 98 including indicating means responsive to the satisfactory or fail rolling resistance signal for providing a recorded indication thereof which has a time duration in excess of the test period.

100. The combination as defined in claim 99 including means responsive to the rolling resistance signals for producing a highest rolling resistance identification signal to identify the particular wheel brake which has the largest or smallest rolling resistance.

101. The combination as defined in claim 100 including means responsive to the rolling resistance signals for producing a marginal rolling resistance signal when either of said rolling resistance signals falls within a preset range of marginal values.

102. In an apparatus for analyzing the braking performance of a wheeled vehicle having a brake individually associated with at least two wheels, the combination which comprises:

test means for rotating said two wheels of the vehicle for a test period;

signal generating means including the test means for producing a separate rolling resistance signal proportional to the rolling resistance of each wheel without the application of the wheel brakes;

means responsive to the rolling resistance signals for producing a rolling resistance imbalance signal representative of the difference between the rolling resistance signals;

means responsive to the rolling resistance imbalance signal for producing a satisfactory or fail rolling resistance imbalance signal when the rolling resistance imbalance signal is less than or exceeds a preset maximum acceptable rolling resistance imbalance value.

103. The combination as defined in claim 102 including indicating means responsive to the satisfactory or fail rolling resistance imbalance signal for providing a recorded indication thereof which has a duration in excess of the test period.

104. The combination as defined in claim 103 including means responsive to the rolling resistance imbalance signal for producing a rolling resistance imbalance identification signal identifying the particular wheel brake which is providing the largest or smallest rolling resistance.

105. The combination as defined in claim 104 including means responsive to the rolling resistance imbalance signal for producing a marginal rolling resistance signal when the rolling resistance imbalance signal falls within a preset range of marginal values.

106. The combination as defined in claim 102 including means for storing the rolling resistance imbalance signal.

107. In an apparatus for analyzing the braking performance of a wheeled vehicle having wheel brakes individually associated with at least two wheels and a brake actuator for simultaneously applying the brakes of said wheels, the combination which comprises:

test means for rotating said wheels of the vehicle;
brake effort signal generating means including the test means for producing a separate brake effort signal for each wheel, the brake effort signals being proportional to the brake effort of the respective wheel while the wheel brakes are being applied;
means responsive to the brake effort signals for producing a brake engagement lag signal when the last to engage brake has engaged after operation of the brake actuator to apply the brakes; and
means responsive to the brake effort signals and the brake engagement lag signal for producing a brake engagement lag imbalance signal representative of the difference between said brake effort signals upon the occurrence of the brake engagement lag signal.

108. The combination as defined in claim 107 including means responsive to the brake effort signals for producing a signal identifying the brake which engages last.

109. The combination as defined in claim 107 including means responsive to a brake engagement lag imbalance signal for producing a satisfactory or fail brake engagement lag imbalance signal when the brake engagement lag imbalance signal is less than or exceeds a preset maximum acceptable imbalance value.

110. The combination as defined in claim 109 including means responsive to the brake engagement lag imbalance signal for producing a marginal brake engagement lag imbalance signal when the brake engagement lag imbalance signal falls within a preset range of marginal imbalance values.

111. The combination as defined in claim 109 including indicating means responsive to the satisfactory or fail brake engagement lag imbalance signal for providing a recorded indication thereof.

112. The combination as defined in claim 107 wherein the brake effort signal generating means produces a separate gross brake effort signal for each wheel, the gross brake effort signal being proportional to the sum of the braking effort and rolling resistance of each respective wheel, and further including:
means responsive to the gross brake effort signals for producing a gross brake effort imbalance signal proportional to the difference between the gross braking efforts of said two wheels;
rolling resistance imbalance signal generating means for producing and storing a rolling resistance imbalance signal representative of the difference between the rolling resistance of said two wheels when the brakes are releasaed; and
means responsive to the gross brake effort imbalance signal and the rolling resistance imbalance signal for producing a net brake effort imbalance signal proportional to the difference between the gross braking effort imbalance and the rolling resistance imbalance of said two wheels.

113. In an apparatus for analyzing the braking performance of a wheeled vehicle having wheel brakes individually associated with at least two wheels and a brake actuator for simultaneously applying the brakes of the wheels, the combination which comprises:
test means for rotating said wheels of the vehicle;
means including the test means for producing a separate brake effort signal for each wheel, the brake effort signals being proportional to the braking effort of the respective wheel while the wheel brakes are being applied;
means responsive to the brake effort signals for producing a brake disengagement lag signal when the first to disengage brake has disengaged after operation of the brake actuator to release the brakes; and
means responsive to the brake effort signals and the brake disengagement lag signal representative of the difference between said brake effort signals upon the occurrence of the brake disengagement lag signal.

114. The combination as defined in claim 113 including means responsive to the brake disengagement lag imbalance signal for producing a satisfactory or fail brake disengagement lag imbalance signal when the brake disengagement lag imbalance signal is less than or exceeds a preset maximum acceptable imbalance value.

115. The combination as defined in claim 114 including means responsive to the brake disengagement lag imbalance signal for producing a marginal brake disengagement lag imbalance signal when the brake disengagement lag imbalance signal falls within a preset range of marginal imbalance values.

116. The combination as defined in claim 114 including indicating means responsive to the satisfactory or fail brake disengagement lag imbalance signal for providing a recorded indication thereof.

117. The combination as defined in claim 114 including means responsive to the brake effort signals for producing a highest brake effort identification signal for identifying the brake which is last to disengage.

118. In an apparatus for analyzing the braking performance of a wheeled vehicle having wheel brakes individually associated with at least two wheels and a brake actuator for simultaneously applying the brakes to said wheels, the combination which comprises:
test means for rotating said wheels of the vehicle;
brake effort signal generating means including the test means for producing a separate brake effort signal for each wheel, the brake effort signal being proportional to the brake effort of the respective wheel while the wheel brakes are being applied;
means responsive to the brake effort signals and to the operation of the brake actuator for producing a brake system response signal proportional to the time delay between the operation of the brake actuator and the engagement of the first brake to engage.

119. The combination as defined in claim 118 including means responsive to the system response signal for producing a satisfactory or fail brake system response signal when the system response signal is less than or exceeds a signal representing a preset maximum acceptable value.

120. The combination as defined in claim 119 including means responsive to the brake system response signal for producing a marginal system response signal when the system response signal falls within a preset range of values.

121. In an apparatus for analyzing the braking performance of a wheeled vehicle having wheel brakes individually associated with at least two wheels, the combination which comprises:
test means for rotating said wheels of the vehicle;

brake effort imbalance signal generating means including the test means for producing a brake effort imbalance signal proportional to the difference in braking effort of the wheels while the wheel brakes are being applied;

fluid restriction test signal generating means responsive to the brake effort signals for producing a fluid restriction test signal when at least one brake effort signal reaches a signal representative of a preset brake effort; and means responsive to the brake effort imbalance signal and the fluid restriction test signal for producing a fluid restriction imbalance signal representative of the difference between said brake effort signals.

122. The combination as defined in claim 121 wherein the fluid restriction test signal generating means produces the fluid restriction test signal when the largest brake effort signal reaches a signal representative of a preset brake effort.

123. The combination as defined in claim 121 wherein the fluid restriction test signal generating means produces the fluid restriction test signal when the sum of the brake effort signals reaches a preset value.

124. The combination as defined in claim 121 including means for producing a satisfactory or fail fluid restriction signal when the fluid restriction imbalance signal is less than or exceeds a preset maximum acceptable value.

125. The combination as defined in claim 124 including means for producing a highest brake effort identification signal identifying the particular wheel brake which is providing the largest and smallest brake effort upon the occurrence of the fluid restriction test signal.

126. The combination as defined in claim 124 wherein the vehicle is provided with a manually controlled, force or position responsive brake actuator for providing a braking effort which varies in accordance with the force applied to or the position of the brake actuator, and further including:

brake actuator control means for controlling the force applied to or the position of the brake actuator to apply the brakes at a rapid rate in excess of 25 pounds of brake effort per second.

127. The combination as defined in claim 124 wherein the brake effort imbalance signal generating means is arranged to produce the gross brake effort imbalance and wherein the means for producing the fluid restriction imbalance signal includes:

means for producing and storing a mechanical and rolling resistance imbalance signal representative of the brake effort imbalance between the wheels when the brakes are applied for a predetermined period at a precalculated brake effort; and means for deriving the difference between the gross brake effort imbalance signal and the mechanical and rolling resistance imbalance signal upon the occurrence of the fluid restriction test signal.

128. The combination as defined in claim 127 including means responsive to the fluid restriction imbalance signal for producing a satisfactory or fail fluid restriction imbalance signal when said imbalance signal is less than or exceeds a preset maximum acceptable value, respectively.

129. The combination as defined in claim 128 including means responsive to the fluid restriction imbalance signal for producing a marginal fluid restriction imbalance signal when the fluid restriction imbalance signal falls within a preset range of values.

130. In an apparatus for analyzing the braking performance of a wheeled vehicle having wheel brakes individually associated with at least two wheels and a manually controlled, force responsive brake actuator including a brake pedal for simultaneously applying the brakes of said wheels, the combination which comprises:

test means for rotating said wheels of the vehicle;

brake effort signal generating means for producing a separate brake effort signal for each wheel, the brake effort signals being proportional to the brake effort of the respective wheel while the wheel brakes are being applied;

pedal force signal generating means coupled to the brake pedal for producing a pedal force signal proportional to the force being applied to the brake pedal when at least one brake effort signal reaches a pre-established brake effort;

means responsive to the pedal force signal for producing a satisfactory or fail pedal force signal when the pedal force is less than or exceeds a signal representing a maximum acceptable deviation from a preset value.

131. The combination as defined in claim 130 including indicating means responsive to the satisfactory or fail pedal force signal for providing a recorded indication thereof.

132. The combination as defined in claim 131 including means responsive to the pedal force signal for producing a marginal pedal force signal when the pedal force signal falls within a predetermined range.

133. In an apparatus for analyzing the braking performance of a wheeled vehicle having wheel brakes individually associated with at least two wheels and a manually controlled, force responsive brake actuator including a brake pedal for simultaneously applying the brakes of said wheels, the combination which comprises:

pedal position signal generating means coupled to the brake pedal for producing a pedal position signal representative of the position of the brake pedal; and means responsive to the pedal position signal for producing a satisfactory or fail static pedal position signal when the movement of the brake pedal is less than or exceeds a preset value, with substantially constant force applied to the brake pedal.

134. In an apparatus for analyzing the braking performance of a wheeled vehicle having wheel brakes individually associated with at least two wheels and a manually controlled, force responsive brake actuator including a brake pedal movably mounted above the vehicle floor board for simultaneously applying the brakes of said wheels, the combination which comprises:

means coupled to the brake pedal for providing an output signal when the distance between the pedal and vehicle floor board falls below a preset value; and means responsive to the output signal for producing a satisfactory or fail pedal to floor signal when the distance between the pedal and floor board remains above or falls below a preset value.

135. In an apparatus for analyzing the braking performance of a wheeled vehicle having wheel brakes individually associated with at least two wheels, the combination which comprises:

test means for rotating said wheels of the vehicle for a pre-determined test period;

brake effort signal generating means including the test means for producing separate brake effort signals for each wheel, each brake effort signal being proportional to the brake effort of the respective wheel while the wheel brakes are being applied;

means for storing the initial values of each of the brake effort signals when at least one of the brake effort signals reaches a signal representative of a pre-determined brake effort;

means for monitoring the current brake effort signals during the test period;

means responsive to the stored and current brake effort signals for each wheel brake for producing a separate difference brake effort signal for each wheel brake during the test period, the difference brake effort signal being representative of the difference between the stored and current values of the brake effort for the respective wheel brake.

136. The combination as defined in claim 135 including means for producing a satisfactory or fail excursion signal when each difference brake effort signal remains below a preset maximum acceptable value or one of the difference brake effort signals exceeds the preset maximum acceptable value during the test period, respectively.

137. The combination as defined in claim 135 wherein the vehicle is provided with a manually controlled force responsive brake actuator for simultaneously applying the wheel brakes and including:

means for applying force to the brake actuator until said predetermined high level of brake effort is reached and for maintaining the force required to reach said predetermined level of brake effort substantially constant for said predetermined period of time.

138. The combination as defined in claim 136 including means for producing a marginal excursion signal when each of the brake effort signals remains below said preset maximum acceptable value and one of the brake effort difference signals exceeds a preset marginal value during the test period.

139. The combination as defined in claim 136 including means responsive to the difference brake effort signals for producing a fail brake effort reversal signal when either of the current brake effort signals exceeds the initial stored value of the respective brake effort by a value greater than a preset value and subsequently decreases below said preset value during the test period.

140. The combination as defined in claim 136 including means responsive to the difference brake effort signals for producing a fail brake effort fade signal when either of the brake effort signals falls below the initial stored value of the respective brake effort by an amount greater than a preset maximum acceptable value.

141. The combination as defined in claim 140 including means responsive to the difference brake effort signals for producing a marginal brake effort fade signal when either of the brake effort signals falls below the initial stored value of the respective stored brake effort by an amount greater than a preset marginal value.

142. The combination as defined in claim 136 including means responsive to the difference brake effort signal for producing a satisfactory brake effort fade signal when either of the brake effort signals remains greater than the remainder of the initial stored value of the respective stored brake effort minus a preset acceptable value.

143. In an apparatus for analyzing the braking performance of a wheeled vehicle having wheel brakes individually associated with at least two wheels and a force responsive brake actuator for simultaneously applying the wheel brakes, the combination which comprises:

test means for rotating said wheels;

brake effort signal generating means for producing a separate brake effort signal for each wheel brake while the wheels are rotated and the brakes applied, each brake effort signal being representative of the braking effort of the respective wheel;

brake actuator control means for applying an increasing force to the brake actuator until at least one brake effort signal reaches a predetermined value; and output signal generating means for producing an output signal when the brake effort signals fall within or outside of a predetermined range.

144. The combination as defined in claim 143 wherein the brake actuator control means is arranged to maintain the force applied to the brake actuator substantially constant for a predetermined period of time after the predetermined value of brake effort is reached.

145. The combination as defined in claim 144 including brake effort imbalance signal generating means for producing a brake effort imbalance signal representative of the difference between the braking effort of said wheel brakes.

146. The combination as defined in claim 145 including means for producing an output signal when the brake effort imbalance signal is less than or exceeds a preset maximum acceptable value.

147. The combination as defined in claim 146 wherein the brake actuator control means is arranged to apply a force to the brake actuator to provide a brake effort of about .3 to .5 of the vehicle axle weight on the wheels being tested.

\* \* \* \* \*

UNITED STATES PATENT AND TRADEMARK OFFICE
CERTIFICATE OF CORRECTION

PATENT NO. : 3,899,916

DATED : August 19, 1975

INVENTOR(S) : Edwin Lee Cline

It is certified that error appears in the above-identified patent and that said Letters Patent are hereby corrected as shown below:

Column 1, line 36, delete "decelration" and insert --deceleration--;
          line 52, delete "produces" and insert --produced--.
Column 2, line 49, delete "identity" and insert --identify--;
          line 50, delete "subjet" and insert --subject--.
Column 3, line 33, delete "overlap" and insert --overlay--.
Column 9, line 32, delete "charg" and insert --chart--.
Column 13, line 58, delete "hydrualic" and insert --hydraulic--.
Column 16, line 48, after "brake lining" insert --or lining--.
Column 17, line 53, delete "patters" and insert --patterns--.
Column 21, line 35, after "separate" insert --brake--.
Column 27, line 29, delete "mixture" and insert --maximum--.
Column 28, line 12, delete "445" and insert --455--.
Column 37, line 46, after "(1)" insert --a fail--.
Column 42, line 23, delete "578" and insert --758--.
Column 43, line 55, delete "558" and insert --588--;
          line 65, delete "curcuit" and insert --circuit--.
Column 44, line 17, delete "P" and insert --F--;
          line 23, delete "panel" and insert --signal--.
Column 46, line 32, delete "stndard" and insert --standard--;
          line 49, delete "recoring" and insert --recording--.
Column 48, line 8, delete "grdually" and insert --gradually--;
          line 64, after "wherein" insert --when--.
Column 49, line 53, delete "folling" and insert --rolling--.
Column 53, line 17, delete "ate" and insert --at--;
          line 59, delete "compirses" and insert --comprises--.
Column 54, line 13, delete "let" and insert --put--.
Column 55, lines 1 through 9 are to be deleted and insert --means for deriving the difference between the gross brake effort imbalance and the rolling resistance imbalance between the wheels.--;
          line 33, after "put" delete "of".

UNITED STATES PATENT AND TRADEMARK OFFICE
CERTIFICATE OF CORRECTION

PATENT NO. : 3,899,916
DATED : August 19, 1975
INVENTOR(S) : Edwin Lee Cline

It is certified that error appears in the above-identified patent and that said Letters Patent are hereby corrected as shown below:

Column 60, line 41, delete "supply" and insert --apply--.
Column 63, line 14, delete "incuding" and insert --including--.
Column 67, line 52, delete "releasaed" and insert --released--.

Signed and Sealed this first Day of June 1976

[SEAL]

Attest:

RUTH C. MASON
Attesting Officer

C. MARSHALL DANN
Commissioner of Patents and Trademarks